United States Patent
Nashimoto et al.

[11] Patent Number: 6,078,717
[45] Date of Patent: Jun. 20, 2000

[54] OPICAL WAVEGUIDE DEVICE

[75] Inventors: Keiichi Nashimoto; Masao Watanabe; Hiroaki Moriyama; Shigetoshi Nakamura; Eisuke Osakabe; Takashi Morikawa, all of Nakai-machi, Japan

[73] Assignee: Fuji Xerox Co., Ltd., Tokyo, Japan

[21] Appl. No.: 09/119,044

[22] Filed: Jul. 20, 1998

[30] Foreign Application Priority Data

| Jul. 22, 1997 | [JP] | Japan | 9-212505 |
| Oct. 18, 1997 | [JP] | Japan | 9-303435 |
| Oct. 18, 1997 | [JP] | Japan | 9-303436 |
| May 29, 1998 | [JP] | Japan | 10-149928 |
| May 29, 1998 | [JP] | Japan | 10-149929 |
| Jun. 5, 1998 | [JP] | Japan | 10-157609 |
| Jun. 5, 1998 | [JP] | Japan | 10-157610 |

[51] Int. Cl.$^7$ ............................................. G02B 6/10
[52] U.S. Cl. ................. 385/130; 2/8; 2/131; 2/14
[58] Field of Search ........................... 385/130, 129, 385/131, 132, 122, 123, 124, 125, 126, 43, 1–8, 14, 15, 16

[56] References Cited

U.S. PATENT DOCUMENTS

| 5,007,696 | 4/1991 | Thackara et al. | 385/130 |
| 5,414,791 | 5/1995 | Ermer et al. | 385/143 |

FOREIGN PATENT DOCUMENTS

| 1-248141 | 10/1989 | Japan . |
| 9-5797 | 1/1997 | Japan . |

OTHER PUBLICATIONS

A. Yariv, *Optical Electronics*, New York, Rinehart and Winston, $4^{TH}$ Ed., pp. 336–339, 1991.

Q. Chen, et al., "Guided–Wave Electro–Optic Beam Deflector Using Domain Reversal in $LiTaO_3$", Journal of Lightwave Technology, vol. 12, No. 8, pp. 1401–1403, 1994.

K. Hamamoto et al., "First 8×8 Semiconductor Optical Matrix Switches using GaAs/AlGaAs Electro–Optic Guided Wave Directional Couplers", Electronics Letters, vol. 28, No. 5, pp. 441–443, 1992.

*Primary Examiner*—Phan T. H. Palmer
*Attorney, Agent, or Firm*—Oliff & Berridge, PLC

[57] ABSTRACT

The invention intends to provides an optical waveguide device having a structure that satisfies the low drive voltage characteristic and the low propagation loss characteristic at the same time. The optical waveguide device contains a conductive or semiconductive lower electrode, an epitaxial or single orientational buffer layer provided on the lower electrode, an epitaxial or single orientational optical waveguide provided on the buffer layer, and an upper electrode of a conductive thin film or a semiconductive thin film, provided on the optical waveguide. The optical waveguide device is able to modulate, switch, or deflect incident light beams guided into the optical waveguide by applying a voltage between the upper electrode and the lower electrode.

47 Claims, 11 Drawing Sheets

OPICAL WAVEGUIDE DEVICE

BACKGROUND OF THE INVENTION

1. Field of the Invention

The present invention relates to an optical waveguide, and an optical waveguide device provided with electrodes for deflecting, switching, or modulating laser beams guided into the optical waveguide by the electo-optic effect. The invention relates especially to a light beam deflection device for a laser printer, digital copying machine, and facsimile, an optical switch and optical waveguide modulation device for an optical transmission or optical computer, and an optical waveguide device applicable generally to the opto-electronics including a pickup for an optical disk.

2. Description of the Related Art

As a laser beam deflection device used in a laser beam printer, digital copying machine, and facsimile, there is a device constructed by the so-called rotary polygon mirror to deflect laser beams from a gas laser or a semiconductor laser and an fθ lens that condenses the laser beams reflected by the rotary polygon mirror in the state of the linear uniform motion on an image-formation plane of an electrophotographic photoreceptor or the like, which has been generally used. This type of the light beam deflection device using the polygon mirror has a problem in durability, because the polygon mirror is rotated in a high speed by a motor, and a problem that the high speed rotation generates noises and the light scanning speed is limited by the number of revolutions of the motor.

On the other hand, as a solid state laser beam deflection device, there is a light beam deflection device that utilizes the acousto-optic effect, and above all the optical waveguide device is noticed with expectations. This optical waveguide device is examined as a laser beam scanning device to solve the disadvantage of the laser beam scanning device using the polygon mirror, as to whether it can be applied to a printer and the like. The light beam deflection device of this optical waveguide type possesses an optical waveguide composed of $LiNbO_3$ and ZnO, and a coupling unit to guide laser beams into this optical waveguide; and further contains a comb-type electrode to excite a surface acoustic wave that deflects the light beams in the optical waveguide on the basis of the acousto-optic effect, and a unit to output the deflected light beams from inside the optical waveguide. In addition to this, a thin film lens and the like are attached to the device as needed. However, the light beam deflection device employing the acousto-optic effect generally has the problem of the upper limit of laser beam deflection speed due to the deflection speed limit, which leads to a limit of the application to an image formation device such as a laser printer, digital copying machine, facsimile, and the like.

In contrast to this, there is a prism-type light beam deflection device employing an oxide ferroelectric material capable of displaying the electo-optic effect of which modulation speed is higher than the acousto-optic effect, which is described in, for example, 'Optical Electronics, 4th ed. by A. Yariv (New York, Rinehart and Winston, 1991), page 336~339'. This type of device includes a bulk device using ceramics or single crystals, and it has a large size and requires a considerably high drive voltage, so that a practical deflection angle cannot have been obtained. And, 'Q. Chen, et al., J. Lightwave Tech. vol. 12 (1994) page 14011' (reference 1) and the Japanese Published Unexamined Patent Application No. Hei 1-248141 disclose a prism-type domain inversion light beam deflection device or a prism-type electrode light beam deflection device having prisms arrayed in cascade by using a $LiNbO_3$ single crystal wafer which a Ti diffusion-type optical waveguide and a proton exchange-type optical waveguide are made of. However, the thickness of the $LiNbO_3$ single crystal wafer, about 0.5 mm, is needed for the electrode gap. Accordingly, the drive voltage is still high, and the foregoing reference 1 discloses that the deflection angle of 0.2 is barely obtained with the drive voltage 600 V applied, which poses a problem that this type of device does not produce a practical deflection angle.

The inventors of this invention have invented a prism-type light beam deflection device to solve the problem of the drive voltage by using a thin film optical waveguide which is provided with an oxide optical waveguide displaying the electo-optic effect disposed on a conductive substrate, a light source to emit light beams into this optical waveguide, and an electrode for deflecting the light beams in the optical waveguide by means of the electo-optic effect. This is disclosed in the Japanese Published Unexamined Patent Application No. Hei 9-5797.

However, the distribution of the electromagnetic field by the laser beams propagating through the optical waveguide permeates into the substrate. The absorption coefficient of a substrate having a practical resistivity is high, and in most cases, the permeating component is strongly absorbed by the carrier inside the conductive substrate. Therefore, the propagation loss in the thin film optical waveguide amounts to some 10 dB/cm due to the absorption, in addition to the loss due to the scattering of the optical waveguide itself, which is insufficient for a practical use.

Further, when the upper electrode employs an oxide, the transparency is not sufficient, thereby the propagation loss is increased, and the micro fabrication is not easy as compared to a metal, which is also a problem.

Generally, in the device having a coplanar electrode configuration, a cladding layer of $SiO_2$ is interpolated between a metal electrode on an optical waveguide and the optical waveguide, which prevents an electromagnetic field from permeating into the metal electrode, thus avoiding the absorption of the propagating light. However, the relative dielectric constant of an oxide optical waveguide material displaying the electo-optic effect amounts to several tens to several thousands, which is extremely large compared to the relative dielectric constant 3.9 of $SiO_2$. Further, the foregoing thin film optical waveguide structure on the conductive substrate forms a series capacitor as the equivalent circuit, and therefore, the effective voltage applied to the thin film optical waveguide goes down to less than several percent of the voltage applied, which results in a great increase of the drive voltage.

SUMMARY OF THE INVENTION

The present invention has been made in view of the foregoing problems, and an object of the invention is to provide a structure of the optical waveguide device that satisfies both the low drive voltage characteristic and the low propagation loss characteristic at the same time. Also, an object of the invention is to make the optical waveguide device applicable to various types of deflection devices, switching devices, and modulation devices.

In order to accomplish the foregoing object, an optical waveguide device according to the invention comprises: a conductive or semiconductive lower electrode, an epitaxial or a single orientational buffer layer formed on the lower electrode, an epitaxial or a single orientational thin film optical waveguide formed on the buffer layer, and an upper electrode of a conductive thin film or a semiconductive thin film formed on the optical waveguide. The optical waveguide device of this invention is able to modulate, switch, or deflect light beams coming into the optical waveguide by applying a voltage between the upper electrode and the lower electrode.

Another optical waveguide device according to the invention comprises: a single crystal substrate served as a conductive or semiconductive lower electrode, an epitaxial or a single orientational buffer layer formed on the plane of the single crystal substrate, an epitaxial or a single orientational ferroelectric thin film optical waveguide formed on the buffer layer, a cladding layer formed on the optical waveguide, and a metal thin film served as an upper electrode formed on the cladding layer.

A third optical waveguide device according to the invention comprises: an epitaxial or high-orientational optical waveguide displaying the elector-optic effect, which is fabricated on a conductive or semiconductive single crystal substrate, or fabricated on a single crystal substrate having a conductive or semiconductive epitaxial or high-orientational thin film on the plane; a cladding layer formed on the optical waveguide; and an upper electrode of a metal thin film formed on the cladding layer.

A fourth optical waveguide device according to the invention comprises: an $SrTiO_3$ single crystal substrate served as a conductive or semiconductive lower electrode, which an impurity element of 0.01 wt. % to 5.0 wt. % is doped into; an epitaxial or a single orientational oxide buffer layer formed on the plane of the single crystal substrate; an epitaxial or a single orientational oxide thin film optical waveguide formed on the buffer layer; an upper electrode of a conductive or semiconductive thin film, formed on the optical waveguide.

Here, the 'single orientational' indicates a state in which the strength of a specific crystal plane is less than 1% of the strength of the other crystal planes in the X-ray diffraction pattern of a thin film; and the 'epitaxial' indicates a state in which a single orientational thin film possesses the single orientational property also in the in-plane direction of the substrate.

In the optical waveguide device of the invention, a conductive or semiconductive single crystal substrate, or a conductive or semiconductive epitaxial or single orientational thin film formed on the substrate can be used for the lower electrode. The material to be used for these includes: oxides such as Nb-doped $SrTiO_3$, Al-doped ZnO, $In_2O_3$, $RuO_2$, $BaPbO_3$, $SrRuO_3$, $YBa_2Cu_3O_{7-X}$, $SrVO_3$, $LaNiO_3$, $La_{0.5}Sr_{0.5}CoO_3$, $ZnGa_2O_4$, $CdGa_2O_4$, $CdGa_2O_4$, $Mg_2TiO_4$, $MgTi_2O_4$; simple substance semiconductors such as Si, Ge, diamond; III–V system compound semiconductors such as AlAs, AlSb, AlP, GaAs, GaSb, InP, InAs, InSb, AlGaP, AlLnP, AlGaAs, AlInAs, AlAsSb, GaInAs, GaInSb, GaAsSb, InAsSb; II–VI system compound semiconductors such as ZnS, ZnSe, ZnTe, CaSe, CdTe, HgSe, HgTe, CdS; and metals such as Pd, Pt, Al, Au, Ag.

Considering the film quality of the oxide thin film optical waveguide disposed on the lower electrode, the oxide is preferably used for the lower electrode. It is preferable that these materials for the lower electrode are selected on the basis of the crystal structure of a ferroelectric thin film and the carrier mobility required for the deflection speed, switching speed, or modulation speed. The resistivity of the lower electrode should be less than $10^8$ Ω·cm, preferably less than $10^6$ Ω·cm, which is effective from the RC time constant. However, as long as the resistivity is within a range such that the voltage drop can be neglected, the material can be used for the lower electrode.

In the optical waveguide device of the invention, when the lower electrode employs an impurity-doped $SrTiO_3$ single crystal semiconductor substrate, or epitaxial or single orientational impurity-doped $SrTiO_3$ semiconductor thin film, the element that can be used as the impurity dopant needs to have an ionic radius whereby the element can substitute the Sr or Ti at the Sr-site or Ti-site of $SrTiO_3$, and needs to have a valence different from that of Sr or Ti. Preferably, the element to substitute the Sr at the site can take on 12-configuration to oxygen ion, which includes: Sc, Lu, Yb, Tm, Er, Ho, Y, Dy, Tb, Bi, Gd, Na, Eu, Sm, Zn, Nd, Pr, Ce, La, In, K, Tl, Rb, Cs, etc.; and the element to substitute the Ti at the site can take on 6-configuration to oxygen ion, which includes: Al, As, V, Ni, Ga, Sb, Co, Fe, Ta, Rh, Nb, Cr, Mn, Bi, Ru, In, Sc, Sn, Pu, Np, Lu, Yb, U, Tm, Er, Pa, Ho, Y, Dy, Tb, Tl, Gd, Eu, Sm, Pm, Am, Nd, Pr, Ce, La, Th, Ac, etc. Further, it is preferable to select from the III-group element on the periodic table: Sc, Y, La, Ce, Pr, Nd, Pm, Sm, Eu, Gd, Tb, Dy, Ho, Er, Tm, Yb, Lu, Ac, Al, Ga, In, or from the V-group element: V, Nb, Ta, Pa, As, Sb, Bi. Further, preferably La or Nb can be used.

The resistivity of a $SrTiO_3$ semiconductor having the doping applied should be less than $10^4$ Ω·cm, preferably less than $10^2$ Ω·cm, which is effective from the RC time constant and the voltage drop. Accordingly, the doped quantity of the impurity dopant should be 0.01 wt. % to 5.0 wt. %, preferably 0.01 wt. % to 1.0 wt. % is effective. It is difficult to reduce to less than $10^4$ Ω·cm the resistivity of a $SrTiO_3$ single crystal substrate having a dopant less than 0.01 wt. % doped, and the use of a $SrTiO_3$ single crystal substrate having a dopant more than 5.0 wt. % doped involves difficulties in the quality of crystal and the uniformity of dopant.

When a conductive or semiconductive, epitaxial or single orientational thin film is formed on a substrate to serve as a lower electrode, the material that can be used for the substrate includes: oxides such as $SrTiO_3$, $BaTiO_3$, $BaZrO_3$, $LaAlO_3$, $ZrO_2$, $Y_2O_3$ 8%-$ZrO_2$, MgO, $MgAl_2O_4$, $LiNbO_3$, $LiTaO_3$, $Al_2O_3$, ZnO; simple substance semiconductors such as Si, Ge, diamond; III–V system compound semiconductors such as AlAs, AlSb, AlP, GaAs, GaSb, InP, InAs, InSb, AlGaP, AlLnP, AlGaAs, AlInAs, AlAsSb, GaInAs, GaInSb, GaAsSb, InAsSb; II–VI system compound semiconductors such as ZnS, ZnSe, ZnTe, CaSe, CdTe, HgSe, HgTe, CdS. Among the foregoing materials, the oxides are effective for the film quality of the oxide thin film optical waveguide disposed on the substrate.

When an $SrTiO_3$ semiconductor thin film is formed on the substrate to serve as a lower electrode, the material that can be used for the substrate includes: oxides such as $SrTiO_3$, $BaTiO_3$, $BaZrO_3$, $LaAlO_3$, $ZrO_2$, $Y_2O_3$ 8%-$ZrO_2$, MgO, $MgAl_2O_4$; simple substance semiconductors such as Si, Ge, diamond; III–V system compound semiconductors such as AlAs, AlSb, AlP, GaAs, GaSb, InP, InAs, InSb, AlGaP, AlLnP, AlGaAs, AlInAs, AlAsSb, GaInAs, GaInSb, GaAsSb, InAsSb; II–VI system compound semiconductors such as ZnS, ZnSe, ZnTe, CaSe, CdTe, HgSe, HgTe, CdS. However, to use $SrTiO_3$ is effective in most cases for the film quality of the oxide thin film optical waveguide disposed on the substrate.

The material for the buffer layer is selected from materials satisfying the condition such that the refractive index of the buffer layer is smaller than that of the thin film optical waveguide, the ratio of the relative dielectric constant of the buffer layer against the relative dielectric constant of the optical waveguide is more than 0.002, preferably more than 0.006, and the relative dielectric constant of the buffer layer is more than 8. The material for the buffer layer is needed to be able to hold the epitaxial relation with the material for the conductive substrate and the material for the optical waveguide. As the condition under which the material is able to hold this epitaxial relation, it is preferable that the crystal structure of the material for the buffer layer is similar to those of the material for the conductive substrate and the material for the optical waveguide, and further the difference in the lattice constant is less than 10%. However, the epitaxial relation is only needed to hold, in case this condition is not satisfied.

Concretely, the material for the buffer layer is selected from: $SrTiO_3$, $BaTiO_3$, $(Sr_{1-x}Ba_x)TiO_3$ (0<x<1.0), $PbTiO_3$, $Pb_{1-x}La_x(Zr_yTi_{1-y})_{1-x/4}O_3$ (0<x<0.3, 0<y<1.0, PZT, PLT, PLZT depending on the value of x and y), $Pb(Mg_{1/3}Nb_{2/3})O_3$, $KNbO_3$, etc., as the tetragonal system, rhombohedral system, orthorhombic system, or pseudocubic system of the $ABO_3$ perovskite-type oxide, and $LiNbO_3$, $LiTaO_3$, etc., being typical ferroelectrics, as the hexagonal system; $Sr_xBa_{1-x}Nb_2O_6$, $Pb_xBa_{1-x}Nb_2O_6$, etc., of the tungsten bronze-type oxide; $Bi_4Ti_3O_{12}$, $Pb_2KNb_5O_{15}$, $K_3Li_2Nb_5O_{15}$, ZnO; and the substitution derivatives of the above materials. The ratio of the thickness of the buffer layer against the film thickness of the optical waveguide should be more than 0.1, preferably more than 0.5, and effectively the thickness of the buffer layer is more than 10 nm.

When a doped $SrTiO_3$ single crystal semiconductor substrate or a doped $SrTiO_3$ semiconductor thin film is served as the lower electrode, it is most preferable to use $Pb_{1-x}La_x(Zr_yTi_{1-y})_{1-x/4}O_3$ for the buffer layer, which has the same perovskite structure as $SrTiO_3$, has a small difference of the lattice constant against these, and has a larger refractive index than the refractive index 2.339 of these.

The material for the thin film optical waveguide is selected from oxides demonstrating the electo-optic effect, concretely, from: $BaTiO_3$, $PbTiO_3$, $Pb_{1-x}La_x(Zr_yTi_{1-y})_{1-x/4}O_3$ (PZT, PLT, PLZT depending on the value of x and y), $Pb(Mg_{1/3}Nb_{2/3})O_3$, $KNbO_3$, etc., for example, as the tetragonal system, rhombohedral system, orthorhombic system, or pseudocubic system of the $ABO_3$ perovskite-type oxide, and $LiNbO_3$, $LiTaO_3$ being typical ferroelectrics, for example, as the hexagonal system of the perovskite-type oxide; $Sr_xBa_{1-x}Nb_2O_6$, $Pb_xBa_{1-x}Nb_2O_6$, etc., of the tungsten bronze-type oxide; $Bi_4Ti_3O_{12}$, $Pb_2KNb_5O_{15}$, $K_3Li_2Nb_5O_{15}$; and the substitution derivatives of the above materials. The thickness of the thin film optical waveguide is usually set to 0.1 μm to 10 μm, which can appropriately be selected in accordance with the purpose.

As the combination of materials for the buffer layer and the thin film optical waveguide layer, various materials that satisfy the foregoing conditions can be used. When a doped $SrTiO_3$ single crystal semiconductor substrate or a doped $SrTiO_3$ semiconductor thin film is served as the lower electrode, it is most preferable to use $Pb_{1-x}La_x(Zr_yTi_{1-y})_{1-x/4}O_3$ which has the same perovskite structure as those, has a small difference of the lattice constant against these, and has a larger refractive index than the refractive index 2.339 of these, and has a high electo-optic coefficient, which can be used for each of the layers only by varying the composition, namely, the ratio of Pb, La, Zr, and Ti.

The cladding layer can employ the same material as the buffer layer. That is, the material for the cladding layer is selected from materials satisfying the condition such that the refractive index of the cladding layer is smaller than that of the thin film optical waveguide, the ratio of the relative dielectric constant of the cladding layer against the relative dielectric constant of the optical waveguide is more than 0.002, preferably more than 0.006, and the relative dielectric constant of the cladding layer is more than 8. The material for the cladding layer is not necessarily needed to be able to hold the epitaxial relation with the optical waveguide. The material can be a polycrystal thin film, however, when a uniform interface is needed to obtain, the material for the cladding layer is necessary to hold the epitaxial relation with the material for the optical waveguide. As the condition under which the material is able to hold this epitaxial relation, it is preferable that the crystal structure of the material for the cladding layer is similar to that of the material for the thin film optical waveguide, and the difference of the lattice constant is less than 10%. However, the epitaxial relation is only needed to hold, although this condition is not complied with. The ratio of the thickness of the cladding layer against the film thickness of the optical waveguide should be more than 0.1, preferably more than 0.5, and the thickness of the cladding layer is effectively more than 10 nm.

The upper electrode can employ various metals and their alloys such as: Al, Ti, Cr, Ni, Cu, Pd, Ag, In, Sn, Ta, W, Ir, Pt, Au, etc.; and oxides such as Al-doped ZnO, $In_2O_3$, $RuO_2$, $BaPbO_3$, $SrRuO_3$, $YBa_2Cu_3O_{7-x}$, $SrVO_3$, $LaNiO_3$, $La_{0.5}Sr_{0.5}CoO_3$, $ZnGa_2O_4$, $CdGa_2O_4$, $CdGa_2O_4$, $Mg_2TiO_4$, $MgTi_2O_4$. However, preferably the upper electrode employs a transparent oxide such as ITO or Al-doped ZnO in order to reduce the propagation loss. Further, when a fatigue or DC drift occurs accompanied with the operation time, the oxide is effectively used.

Further, when a cladding layer having a smaller refractive index than the optical waveguide is provided between the optical waveguide and the upper electrode, the upper electrode can employ an arbitrary material. The metal electrode can use various metals such as Al, Ti, Cr, Ni, Cu, Pd, Ag, In, Sn, Ta, W, Ir, Pt, Au, etc.

The buffer layer, cladding layer, and thin film optical waveguide layer are fabricated by the vapor phase epitaxy method selected from the electron-beam heating evaporation, flash evaporation, ion plating, Rf-magnetron spattering, ion beam spattering, laser ablation, MBE, CVD, prasma CVD, MOCVD, etc., and by the solid phase epitaxy method of fabricating a thin film though the wet process such as the sol-gel method, MOD method and the like.

The optical waveguide device provided with the structure as mentioned above applies a voltage between the lower electrode formed of a conductive or semicondcutive substrate or a thin film and the upper electrode to thereby generate a part having different refractive indexes that deflects, switches, and modulates laser beams in accordance with the voltage. More concretely, such a device can be applied to all the optical waveguide devices using the EO effect such as the prism-type deflection device, Mach-Zehender interference switch, directional coupling switch, total reflection-type switch, Bragg reflection-type switch, digital-type switch, phase modulation device, mode transformation device, wavelength filter device. The application of this invention to these devices will provides an optical waveguide device that satisfies the low drive voltage characteristic and the low propagation loss characteristic at the same time.

BRIEF DESCRIPTION OF THE DRAWINGS

The present invention will become more fully understood from the detailed description given hereinbelow and the accompanying drawings which are given by way of illustration only, and thus are not limitative of the present invention, wherein.

DETAILED DESCRIPTION OF THE INVENTION

Next, the basic theory of the optical waveguide device according to the invention will be described in detail with reference to FIG. 1~FIG. 13.

Figure 1:
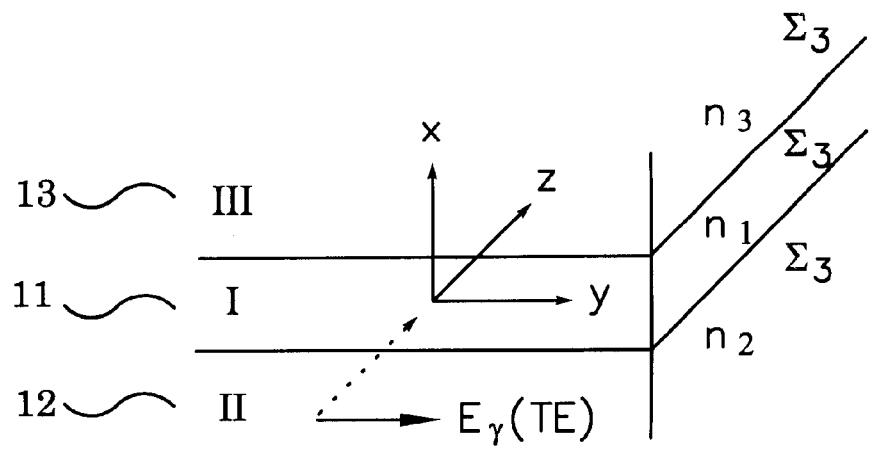
FIG. 1 is a chart to explain the principle of the optical waveguide device of the present invention.
Figure 2:
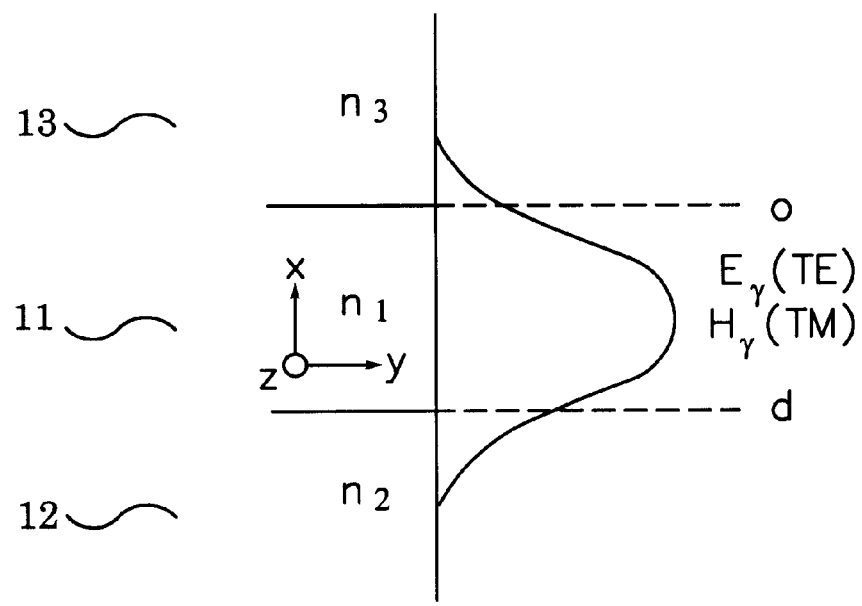
FIG. 2 is a chart to illustrate an electromagnetic distribution in the optical waveguide device of the present invention.

FIG. 1 and FIG. 2 illustrate a general form of a slab optical waveguide used in the optical waveguide device of the invention. Here, a light travels in an optical waveguide 11 along the z-direction. The optical waveguide 11 has a refractive index and a relative dielectric constant represented by $n_1$ and $\epsilon_1$, and is put between a medium 12 having a refractive index and a relative dielectric constant represented by $n_2$ and $\epsilon_2$ and a medium 13 having a refractive index and a relative dielectric constant represented by $n_3$ and $\epsilon_3$. And, in FIG. 1, the x-direction is defined as a direction perpendicular to the surfaces of these media 12, 13 and the optical waveguide 11, and the y-direction is defined as a direction perpendicular to the x-direction and z-direction. As shown in FIG. 2, the coordinate of the boundary between the medium 13 and the optical waveguide 11 is premised as x=0, and the thickness of the optical waveguide 11 is given by d.

Here, the wave equation of a light wave propagating with expj $[\overline{\omega}t - \beta z]$ in the z-direction is given by the following.

$$\delta^2(E_z, H_z)/\delta_x^2 + \delta^2(E_z, H_z)/\delta_y^2 + \chi_i^2(E_z, H_z)/\delta_z^2 = 0 \quad [1]$$

$$(\delta_i^2 = k_i^2 - \beta^2,\ k_i^2 = \overline{\omega}^2 \mu_0 \epsilon_i = k_0^2 n_i^2,\ i=1,2,3)$$

Here, $\overline{\omega}$ represents the angular frequency of the light wave, $\mu_0$ the permeability of the vacuum, j the imaginary number, $\beta$ the propagation constant.

Assuming that the electromagnetic field is uniform, by omitting expj $[(\overline{\omega}t - \beta z)]$ and regarding $E_z$, $H_z$ as being linear to $F(x)$, the equation [1] is reduced to the following wave equation.

$$d^2 F(x)/d_y^2 + \chi_i^2 F(x) = 0 \quad [2]$$

Therefore, all the electromagnetic components are represented by the exponential function or the trigonometric function, the electromagnetic field being uniform to one direction can be represented as the TE mode ($E_z=0$) and TM mode ($H_z=0$), and the electromagnetic components are reduced to the following.

TE: $E_z=0$, $E_x=H_y=0$
$\delta E_y/\delta_z = j\overline{\omega}\mu_0 H_x$
$\delta E_y/\delta_x = -j\overline{\omega}\mu_0 H_z$ TM: $H_z=0$, $H_x=E_y=0$ $\delta H_y/\delta_z = -j\overline{\omega}\epsilon_r E_x$ $\delta H_y/\delta_y = j\overline{\omega}\epsilon_r E_z$ Here, in the TE mode, the electromagnetic fields in the region (hereunder, referred to as II region) of the medium 12 and in the region (hereunder, referred to as III region) of the medium 13 must be 0 at $|X|=\infty$; and therefore, they are given by the following.

III region: $E_{y3}=E_3\exp(-\gamma_3 x)$, $x>0$     [3]

I region: $E_{y1}=E_1\cos(k_x x+\Phi_3)$, $-d<x<0$     [4]

II region: $E_{y2}=E_2\exp\{\gamma 2(x+d)\}$, $x<-d$     [5]

These equations show that the electromagnetic filed permeates into the substrate. Here, I region represents the region of the optical waveguide 11. Here, $\gamma_3 = k_0(N^2-n_3^2)^{0.5}$     [6]

$k_x = k_0(n_1^2-N^2)^{0.5}$     [7]

$\gamma^2 = k^0(N^2-n_2^2)^{0.5}$     [8]

And, from the boundary condition that the electric component Ey and the magnetic component $H_z$ are continuous at x=0, $E_3 = E_1\cos\Phi_3$     [9]

$\tan\Phi_3 = \gamma_3/k_x$     [10]

since the foregoing boundary condition is met at x=−d, $E_2 = E_1\cos(k_x d-\Phi 3)$     [11]

$\tan(k_x d-\Phi 3) = \gamma_2/k_x$     [12]

From these relations, $k_x d = (m+1)\pi - \tan^{-1}(k_x/\gamma_2) - \tan^{-1}(k_x/\gamma_3)$     [13]

Here, m represents the mode number (m=0, 1, 2, ...).

In stead of using such an analytic method, the electromagnetic distribution can also be calculated by the FDM (Finite Difference Method).

Figure 3:
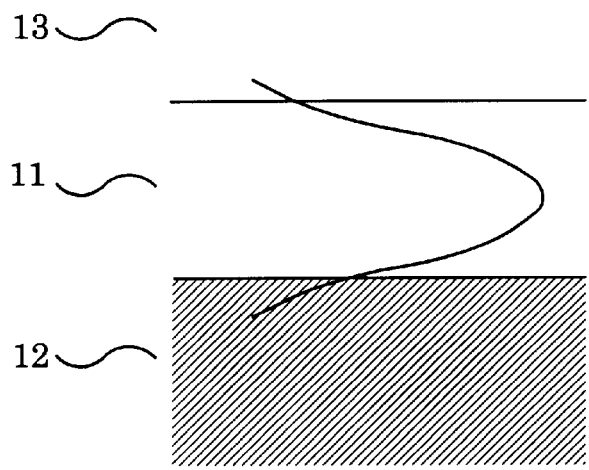
FIG. 3 is a chart to illustrate an electric distribution in the optical waveguide device of the present invention.

FIG. 3 is a typical chart to illustrate the intensity distribution in the $TE_0$ mode at the wavelength 633 nm, in a structure that a PZT (52/48) thin film optical waveguide ($n_1$=2.56) of 600 nm thickness is formed on a Nb-doped $SrTiO_3$ conductive substrate ($n_2$=2.40) having a resistivity 0.05 Ω·cm and an absorption coefficient α=174. The calculated value finds that 3.6% of the total light intensity permeates into the substrate (corresponding to the medium 12 in FIG. 1). Here, the light propagation in the optical waveguide accompanies the light absorption by the substrate, and the component permeated into the substrate becomes a propagation loss. The light intensity is the square of the amplitude expressed by the equations [3], [4], [5].

The rate $I_s/I_0$ of the intensity in the substrate is expressed as the integrated value of II region against the sum of the integrated values of each of I, II, III regions, as follows.
[Equation 1]

The propagation loss is expressed as follows, which results from the light scattering generated on the plane of the optical waveguide and on the grain boundaries in the optical waveguide, the loss by the absorption of the optical waveguide itself, and the absorption by the substrate.

$-10\cdot\log(I/I_{in}) = (10^{-\alpha\cdot\delta\cdot z})$     [15]

Figure 4:
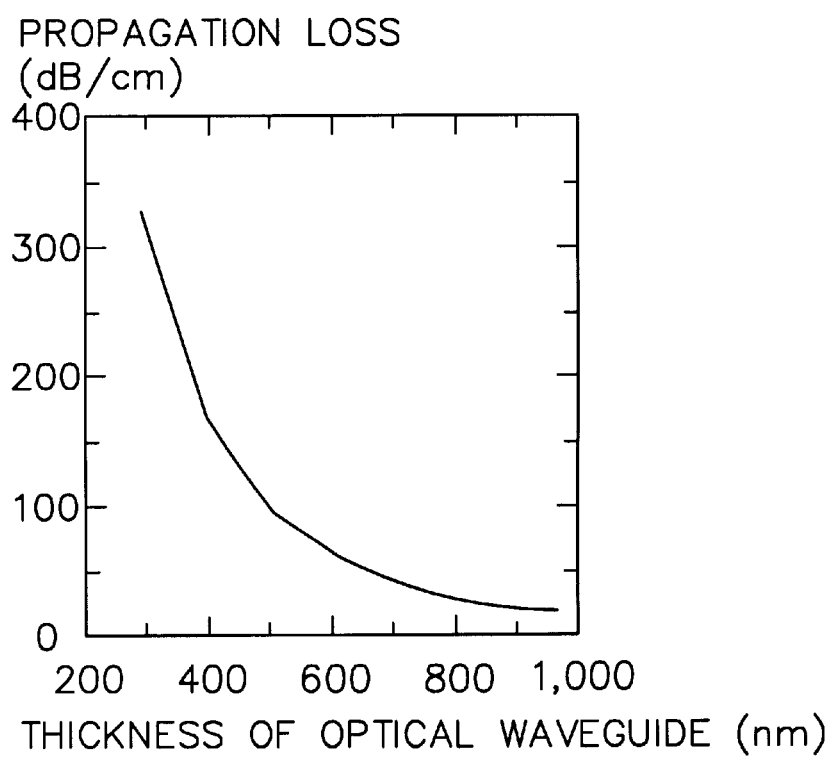
FIG. 4 is a chart to illustrate a relation between the propagation loss and the film thickness of the PZT optical waveguide overlying a $SrTiO_3$ substrate having the absorption coefficient 174.

The propagation loss depends upon the film thickness of the optical waveguide. The thicker the optical waveguide film becomes, the more intensely the electric field is confined in the optical waveguide, and the permeation rate into the substrate is decreased. Accordingly, the propagation loss is decreased as shown in FIG. 4.

Figure 5:
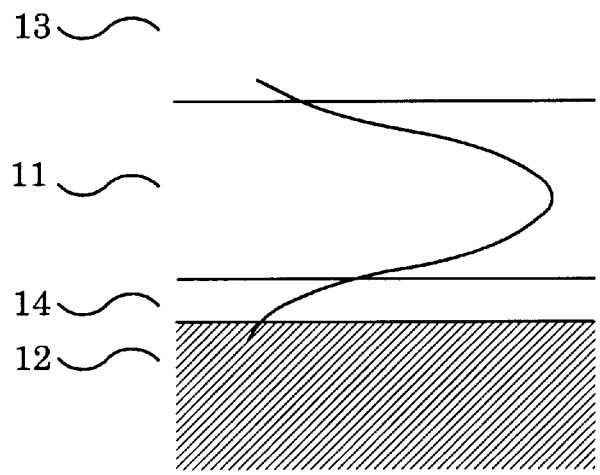
FIG. 5 is a chart to illustrate an electromagnetic distribution in the optical waveguide having a buffer layer.

The principle of this invention will now be described qualitatively with reference to FIG. 5. As shown in FIG. 5, to substitute the thickness of a region in the substrate where the permeation is generated by a non-doped $SrTiO_3$ buffer layer 14 not having absorption will eliminate the absorption by the Nb-doped $SrTiO_3$ conductive substrate, which makes it possible to decrease the propagation loss. Table 1 presents the material, the physical properties, and the film thickness of the optical waveguide 11, the buffer layer 14, and the substrate 12 in the above construction.
[Table I]

In order that the buffer layer functions as a separating layer between the thin film optical waveguide and the conductive substrate, it is generally necessary that the refractive index of the material for the buffer layer is smaller than the refractive index of the material for the thin film optical waveguide. Further, the material for the buffer layer is needed to be able to hold the epitaxial relation with the material for the conductive substrate and the material for the optical waveguide. As the condition under which the material can hold this epitaxial relation, it is preferable that the crystal structure of the material for the buffer layer is similar to those of the material for the conductive substrate and the material for the optical waveguide, and further the difference of the lattice constant is less than 10%. This epitaxial relation can be held although this relation is not necessarily complied with. And, the optical waveguide material preferably possesses a higher electo-optic coefficient, and the conductive substrate material preferably possesses a lower resistivity.

In Table 1, the non-doped $SrTiO_3$ buffer layer possesses the same perovskite structure as the Nb-doped $SrTiO_3$ conductive substrate and the PZT (52/48) thin film optical waveguide, and the difference of the lattice constant of 0% against the Nb-doped $SrTiO_3$ conductive substrate and 3% against the PZT (52/48) thin film optical waveguide.

A great many diligent researches and examinations have been made in pursuit of the most appropriate combination of the materials for the buffer layer, optical waveguide, and conductive substrate, that satisfy these relations. The researches find that the $Pb_{1-x}La_x(Zr_yTi_{1-y})_{1-x/4}O_3$ is most appropriate as the material for the buffer layer and the optical waveguide, and a $SrTiO_3$ single crystal substrate transformed into a conductive or semiconductive by doping an impurity element is most appropriate as the substrate. The $SrTiO_3$ possesses the perovskite structure as an oxide material displaying the electo-optic effect, and it is transformed into a semiconductor by doping an impurity and is able to form a better single crystal.

The $Pb_{1-x}La_x(Zr_yTi_{1-y})_{1-x/4}O_3$ possesses the same perovskite structure as an impurity-doped $SrTiO_3$ single crystal semiconductor substrate or an impurity-doped $SrTiO_3$ semiconductor thin film. It possesses a small difference of the lattice constant against these, a larger refractive index than the refractive index 2.339 of these, and a higher electo-optic coefficient. The difference of the lattice constant between the impurity-doped $SrTiO_3$ conductive substrate and the PZT (52/48), for example, is 3%, which is extremely small.

Figure 6:
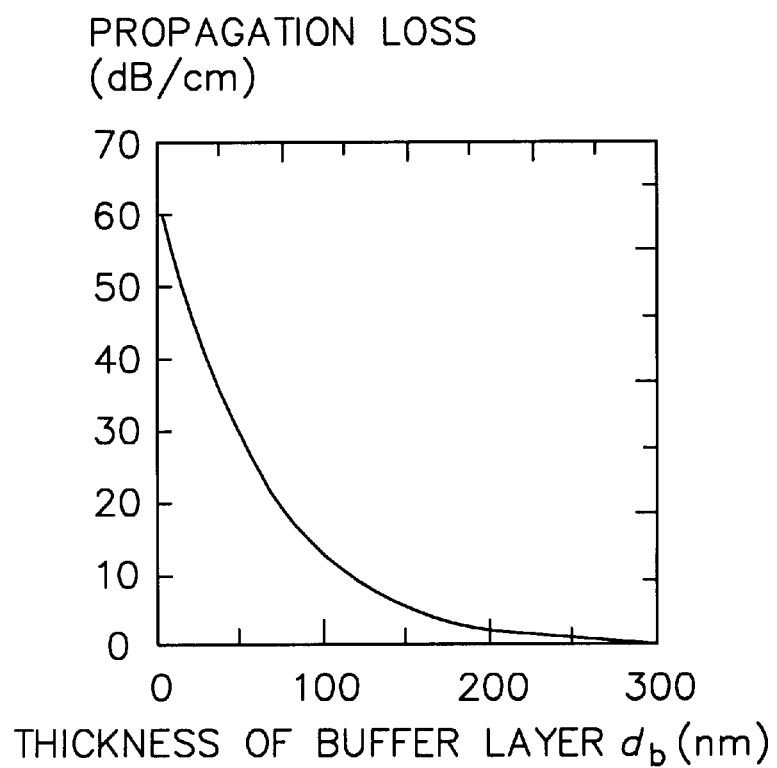
FIG. 6 is a chart to illustrate a relation between the propagation loss of the PZT optical waveguide with the film thickness of 600 nm overlying a $SrTiO_3$ substrate having the absorption coefficient 174 and the film thickness of a $SrTiO_3$ buffer layer.

FIG. 6 illustrates a relation between the propagation loss by the absorption of the substrate and the thickness of the buffer layer in the structure shown in FIG. 5 and Table 1. According to FIG. 6, the propagation loss when the thickness of the buffer layer is zero (namely, the buffer layer is not provided) amounts to 62.9 dB/cm; however, the insertion of a buffer layer having the film thickness 300 nm will reduce the propagation loss to only 0.6 dB/cm.

Figure 7:
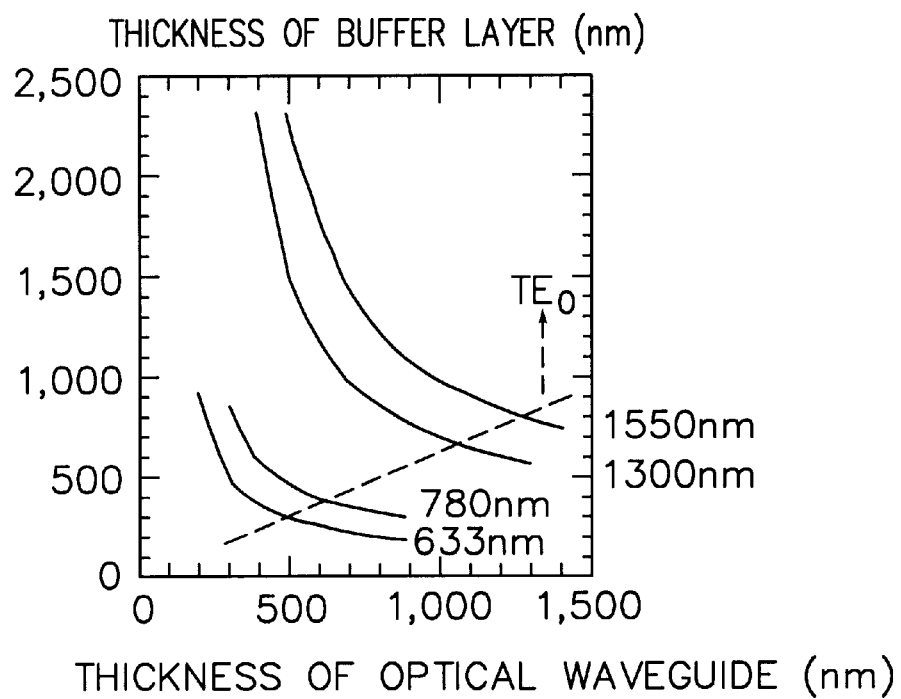
FIG. 7 is a chart to illustrate a relation between the film thickness of the PZT optical waveguide that effects the propagation loss of 1 dB/cm by the absorption of the $SrTiO_3$ substrate having the absorption coefficient 174 and the film thickness of the $SrTiO_3$ buffer layer.

FIG. 7 illustrates a relation between the optical waveguide film thickness and the buffer layer thickness which gives the propagation loss of 1 dB/cm by the absorption of the substrate at each of the wavelengths, in the structure formed of the PZT (52/48) thin film optical waveguide/non-doped $SrTiO_3$ buffer layer/Nb-doped $SrTiO_3$ substrate. FIG. 7 shows that generally a longer wavelength weakens the confinement of the electric field in the optical waveguide due to the lowering of the refractive index by the wavelength dispersion and the lowering of the effective refractive index, and increases the permeation of the electric field into the substrate.

The ration of the film thickness of the buffer layer against that of the optical waveguide is needed to be at least more than 0.1 in order to reduce the propagation loss to less than 1 dB/cm. And, when the $TE_0$ single mode operation is assumed, the ration should be more than 0.5. The upper limit of the film thickness ratio of the buffer layer against that of the optical waveguide becomes maximum at the cut-off film thickness in the $TE_0$ mode of the optical waveguide, and generally it reaches about 10. These can be applied to the buffer layer and the cladding layer.

Figure 8:
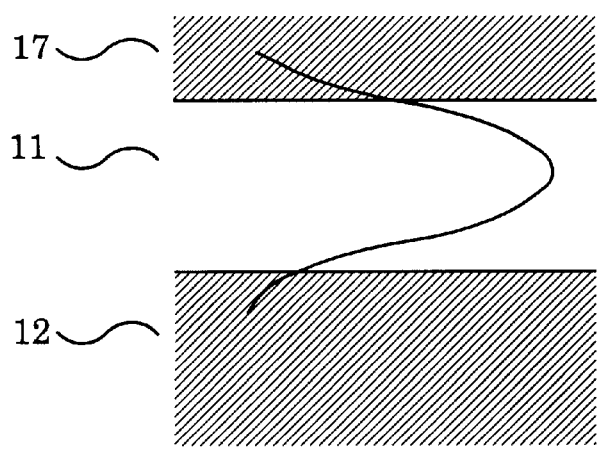
FIG. 8 is a chart to illustrate the principle of an electric distribution in the optical waveguide having an Al electrode on the surface.
Figure 9:
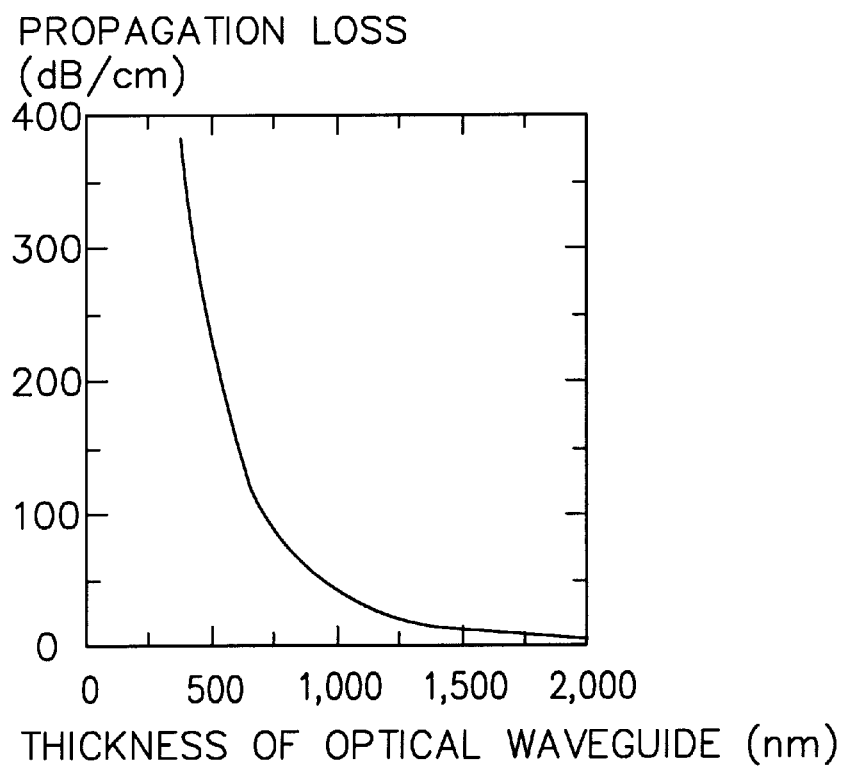
FIG. 9 is a chart to illustrate a relation between the propagation loss and the film thickness of the PZT optical waveguide having an Al electrode on the surface.

Next, FIG. 8 is a typical chart to illustrate the intensity distribution in the $TE_0$ mode at the wavelength 633 nm, in a structure that a PZT (52/48) thin film optical waveguide 11 (n1=2.56) of 600 nm thickness is formed on a Nb0.005%-doped $SrTiO_3$ transparent conductive substrate 12 (n2= 2.40), and further an upper Al electrode 17 is formed on the thin film optical waveguide 11. When a light frequency in the thin film optical waveguide 11 exceeds a plasma frequency in the Al electrode 17, the component permeated into the Al electrode 17 is absorbed, as the light propagates, strongly by the carrier in the Al, which results in a propagation loss. The propagation loss is created by the light scattering produced on the plane of the optical waveguide and on the grain boundaries in the optical waveguide, the loss by the absorption of the optical waveguide itself, and the absorption by the metal electrode, which depends upon the film thickness of the optical waveguide 11. The thicker the optical waveguide film becomes, the more intensely the electric field is confined in the optical waveguide, and the permeation rate into the substrate is decreased. Accordingly, the propagation loss is decreased as shown in FIG. 9.

Figure 10:
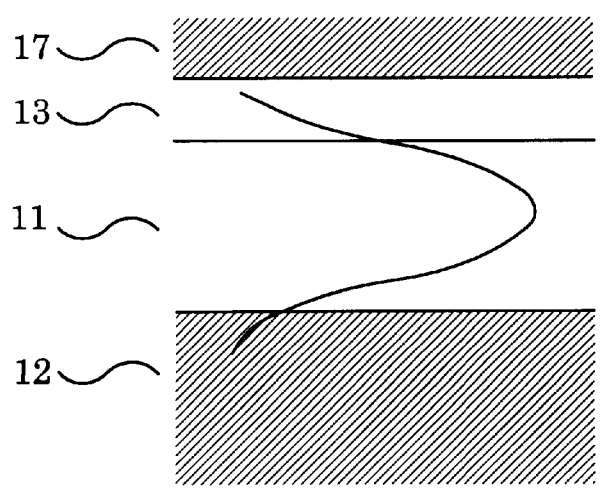
FIG. 10 is a chart to illustrate the principle of an electric distribution in the optical waveguide having a cladding layer.
Figure 11:
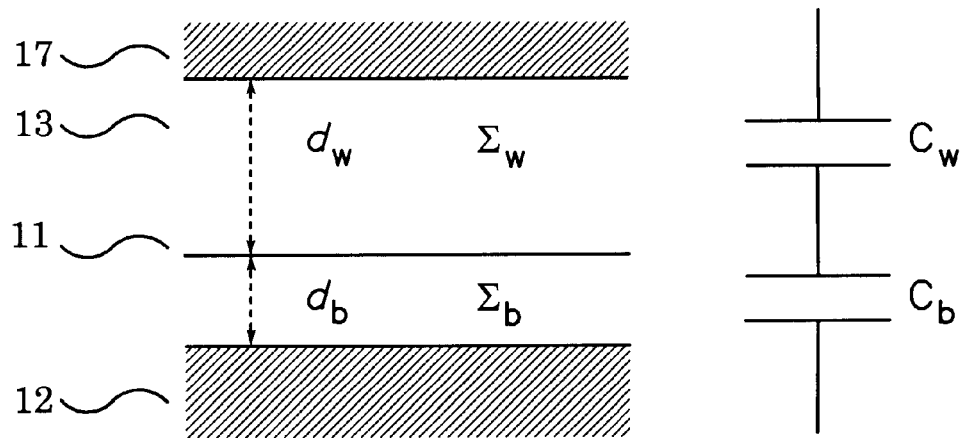
FIG. 11(a) illustrates an equivalent circuit for a structure of an optical waveguide/buffer layer/substrate.
FIG. 11(b) illustrates an equivalent circuit for a structure of a cladding layer/optical waveguide/substrate.
Figure 11:
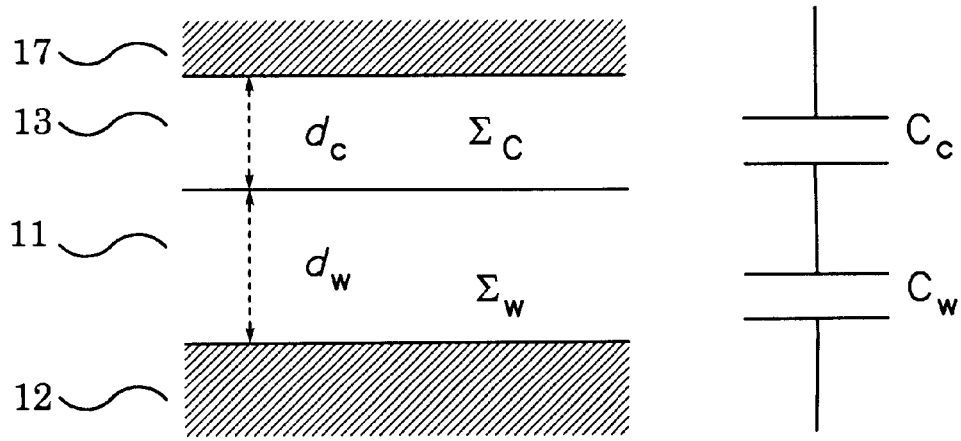

However, as shown in FIG. 10 and Table II, to substitute a region where the permeation is generated by a $SrTiO_3$ cladding layer 13 not having absorption will eliminate the absorption by the upper Al electrode 17, which makes it possible to decrease the propagation loss. In order that the cladding layer 13 functions as a separating layer between the thin film optical waveguide 11 and the metal electrode 17, it is generally necessary that the refractive index of the material for the cladding layer is smaller than the refractive index of the material for the thin film optical waveguide.

[Table II]

On the other hand, if there is a buffer layer between the conductive substrate and the thin film optical waveguide, the voltage applied between the upper and lower electrodes is divided in accordance with each of the capacitances of the thin film optical waveguide and the buffer layer, and the effective voltage actually applied across the thin film optical waveguide is lowered. FIG. 11(a), (b) each illustrate equivalent circuits of the optical waveguide/buffer layer/substrate, and the cladding layer/optical waveguide/substrate. The equivalent circuit is expressed by a series circuit of a capacitance $C_w$ of the thin film optical waveguide and a capacitance $C_b$ of the buffer layer. The relation between these capacitances and a total capacitance $C_0$ of the equivalent circuit is given as follows.

$$1/C_0 = 1/C_w + 1/C_b = (C_w + C_b)/(C_w \cdot C_b) \qquad [16]$$

since the charge Q does not vary, $$Q = C_0 V_0 = C_w V_w \qquad [17]$$

$$\{(C_w \cdot C_b)/(C_w + C_b)\} V_0 C_w V_w \qquad [18]$$

Therefore, provided that the relative dielectric constant of the thin film optical waveguide is represented by $\epsilon_w$, the film thickness by $d_w$, the relative dielectric constant of the buffer layer by $\epsilon_b$, and the film thickness by $d_b$, the effective voltage $V_w$ applied across the thin film optical waveguide is given by the following equation.

$$V_w = \{C_b/(C_w+C_b)\} V_0 = \{\epsilon_b d_w/(\epsilon_w d_b + \epsilon_b d_w)\} V_0 \qquad [19]$$

When a PZT thin film optical waveguide ($\epsilon_w$=900) of 600 nm thick is provided on a Nb-doped $SrTiO_3$ substrate ($\epsilon_s$=300), and a $SrTiO_3$ buffer layer ($\epsilon_b$=300) of 300 nm thick having the same refractive index and relative dielectric constant as the substrate is provided between the optical waveguide and the substrate, $$V_w = \epsilon_b d_w/(\epsilon_w d_b + \epsilon_b d_w) \cdot V_0 = 300 \times 600/(900 \times 300 + 300 \times 600) \cdot V_0 = 0.40 V_0$$

That is, 40% of the applied voltage $V_0$ can be applied to the optical waveguide as the effective voltage.

The equation [19] can be reduced to the following.

$$V_w/V_0 = (\epsilon_b/\epsilon_w)/\{(d_b/d_w)+(\epsilon_b/\epsilon_w)\} = 1/\{(d_b/d_w)/(\epsilon_b/\epsilon_w)+1\}$$

$$1/(V_w/V_0) = (d_b/d_w)/(\epsilon_b/\epsilon_w)+1$$

$$\epsilon_b/\epsilon_w = (d_b/d_w)/\{1/(V_w/V_0)-1\} \qquad [20]$$

Figure 12:
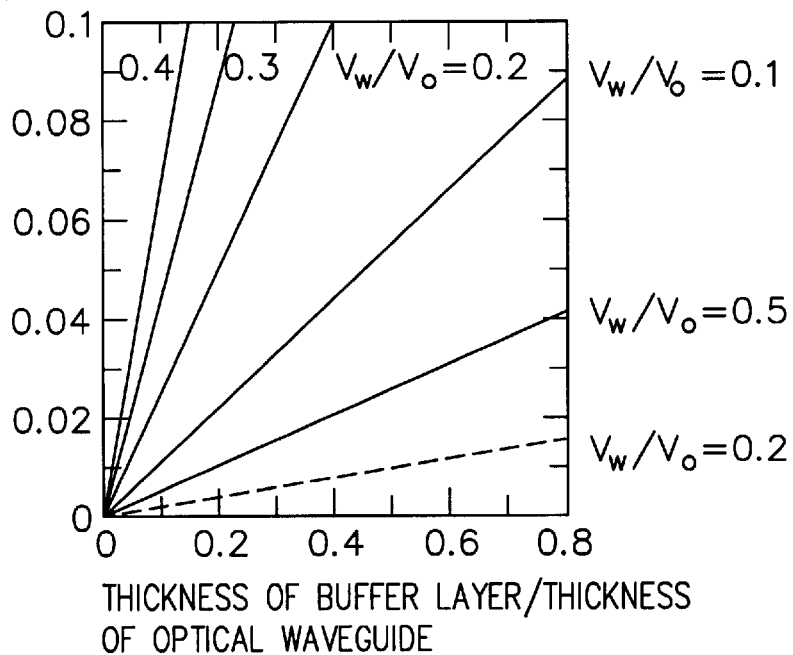
FIG. 12(a) illustrates a relation between the film thickness of the buffer layer/film thickness of the optical waveguide and the dielectric constant of the buffer layer/dielectric constant of the optical waveguide, where the ratio of the effective voltage against the applied voltage is within 0.02 to 0.4.
FIG. 12(b) illustrates a relation between the film thickness of the cladding layer/film thickness of the optical waveguide and the dielectric constant of the cladding layer/dielectric constant of the optical waveguide, where the ratio of the effective voltage against the applied voltage is within 0.02 to 0.4.
Figure 13:
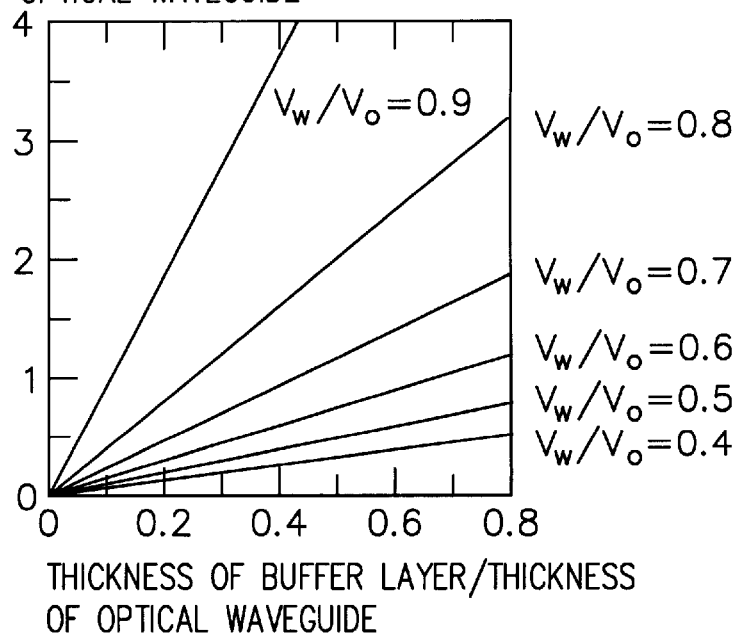
FIG. 13(a) illustrates a relation between the film thickness of the buffer layer/film thickness of the optical waveguide and the dielectric constant of the buffer layer/dielectric constant of the optical waveguide, where the ratio of the effective voltage against the applied voltage is within 0.4 to 0.9.
FIG. 13(b) illustrates a relation between the film thickness of the cladding layer/film thickness of the optical waveguide and the dielectric constant of the cladding layer/dielectric constant of the optical waveguide, where the ratio of the effective voltage against the applied voltage is within 0.4 to 0.9.
Figure 12:
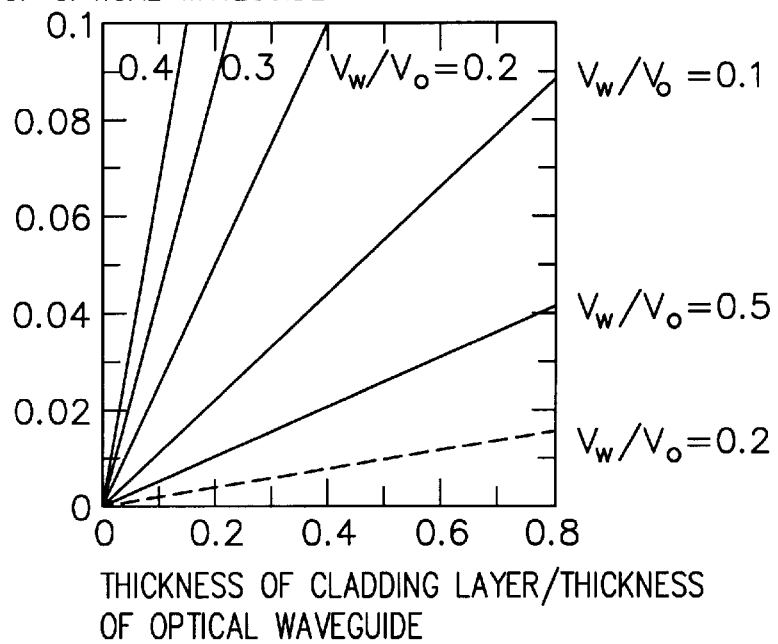
Figure 13:
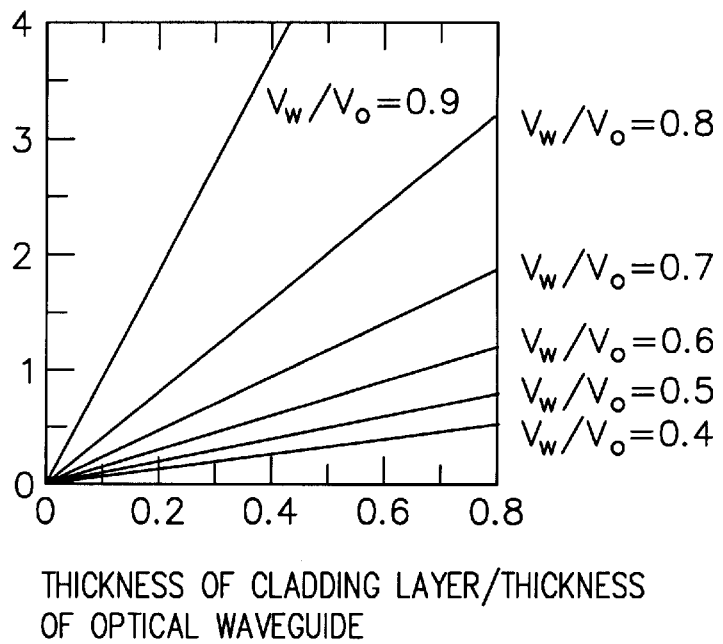

FIG. 12(a) and FIG. 13(a) illustrate the relation between $d_b/d_w$ and $\epsilon_b/\epsilon_w$ as to $0.02 \leq V_w/V_0 \leq 0.4$ and $0.45 \leq V_w/V_0 \leq 0.9$, respectively. In this invention, since $d_b/d_w$ is more than 0.1, $\epsilon_b/\epsilon_w$ where $V_w/V_0$ becomes more than 0.02 is more than 0.002 from FIG. 12. And, if it is preferable that $V_w/V_0$ becomes more than 0.1, $\epsilon_b/\epsilon_w$ is preferred to be more than 0.006. The upper limit of $\epsilon_b/\epsilon_w$ depends on the combination of materials that can be used for the buffer layer and the thin film optical waveguide, which is about 10. There is a material constituting the optical waveguide of which relative dielectric constant reaches 4000, and considering that $\epsilon_b/\epsilon_w$ of more than 0.002 is a condition to be provided, preferably the relative dielectric constant $\epsilon_b$ of the buffer layer is more than 8.

The combination of materials that can be used for the buffer layer and the thin film optical waveguide does not work effectively in the condition that the effective voltage is less than 1% of the applied voltage, in regard to the purpose to greatly reduce the drive voltage by forming an epitaxial optical waveguide demonstrating the electo-optic effect on a conductive substrate. That is, in the condition that the effective voltage is less than 2%, the voltage applied to an optical waveguide device of a film thickness 1.0 μm having a buffer layer is equal to the voltage applied to a wafer device of a thickness 50.0 μm not having a buffer layer and having a diffusion optical waveguide. Such a wafer of a thickness up to 50 μm can be processed by polishing or the like, and there is not a merit for providing an epitaxial optical waveguide displaying the electo-optic effect on a conductive substrate.

The principle mentioned above can completely be applied to the case shown in FIG. 11(b); and FIG. 12(b) and FIG. 13(b) illustrate the relation between $d_c/d_w$ and $\epsilon_c/\epsilon_w$ as to $0.02 \leq V_w/V_0 \leq 0.4$ and $0.4 \leq V_w/V_0 \leq 0.9$, respectively. That is, the condition can be determined by only substituting the capacitance, relative dielectric constant, and film thickness of the buffer layer by the capacitance $C_c$, relative dielectric constant $\epsilon_c$, and film thickness $d_c$ of the cladding layer.

Further, the deflection speed, switching speed, or modulation speed in a structure that a thin film optical waveguide device is put between a substrate and an upper electrode will be evaluated on the basis of a 3 db point frequency on a frequency response determined by the following equation and an RC time constant; and further the tolerance of the resistivity of a substrate will be examined from the frequency. Incidentally, the RC time constant still more increases in pratice, because the impedance of the driving system is added thereon.

$$f = 1/(2\pi \cdot R \cdot C)$$
$$= 1/(2\pi \cdot \rho d_s/S \times \epsilon_o \epsilon_r S/d_w)$$
$$= 1/(2\pi \cdot \rho \cdot \epsilon_0 \epsilon_r \times d_s/d_w) \quad [21]$$

Or, $$f = 1/(2\pi \cdot R \cdot C_0)$$
$$= 1/(2\pi \cdot \rho d_s/S(\epsilon_0 \epsilon_w \epsilon_b \cdot S)/(\epsilon_w d_b + \epsilon_b d_w)) \quad [21']$$

Figure 14:
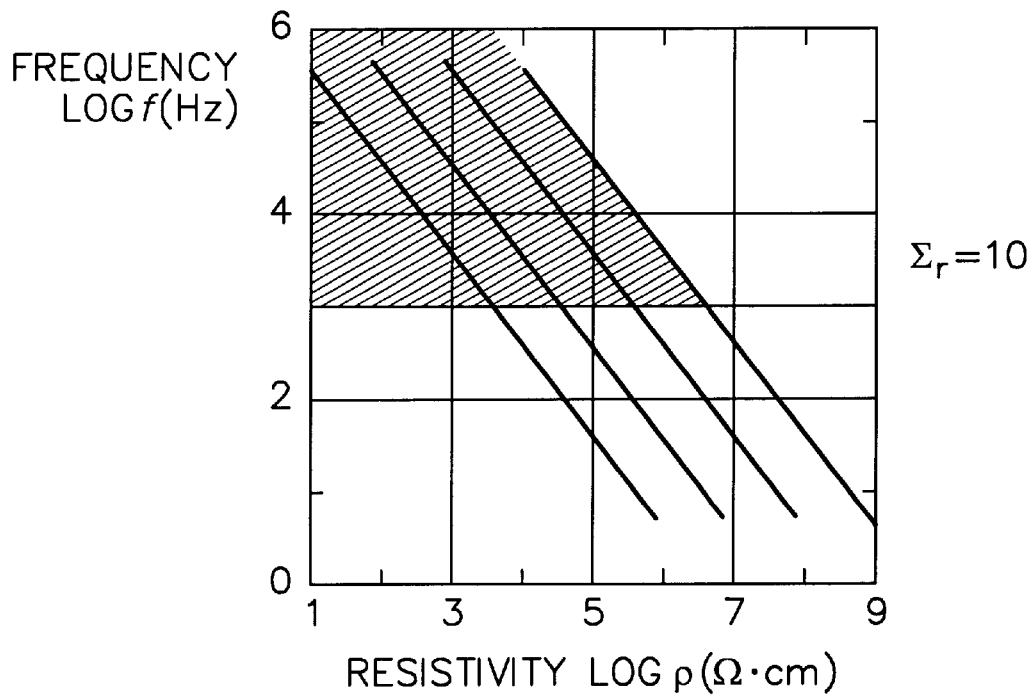
FIG. 14 is a chart to illustrate a relation between the resistivity of the substrate and the drive frequency by the RC time constant.

Here, R represents a resistance of the substrate, ρ a resistivity of the substrate, $d_s$ a thickness of the substrate, C a static capacitance of the optical waveguide, $\epsilon_r$ a relative dielectric constant, $d_w$ a thickness of the optical waveguide. FIG. 14 illustrates a relation between the resistivity and the frequency response when $d_s$ is set to 50 μm as the limit of thinness of the substrate is about 50 μm, and dw is set to 1 μm as the thickness of the optical waveguide is generally about 1 μm. The relative dielectric constant of the ferroelectic material ranges from some 10 to some 1000. Even an optical waveguide device formed of such a ferroelectric material needs a resistivity of the substrate less than $10^4$ Ω·cm in order to demonstrate a frequency response more than 1 kHz. When the response of the optical waveguide device is less than 1 kHz, the response speed is comparable to that of a mechanical device; and there is not a merit to employ a device demonstrating the electo-optic effect, which operates intrinsically in a high speed. The principle mentioned above can also be applied to a case with a cladding layer.

And, when a voltage for the deflection, switching, or modulation is applied across a structure that a thin film optical waveguide device is inserted between a substrate and an upper electrode, a leakage current more than $10^{-7}$ A/cm² flows through the thin film optical waveguide in most cases. Accordingly, if the substrate has a high a resistance, the voltage drop across the substrate remarkably increases, which reduces the voltage applied across the thin film optical waveguide. The voltage drop ΔV across the substrate will be examined by means of the following equation.

$$\Delta V = IR = j \cdot S \times \rho d_s/S = j \times \rho \cdot d_s \quad [22]$$

Figure 15:
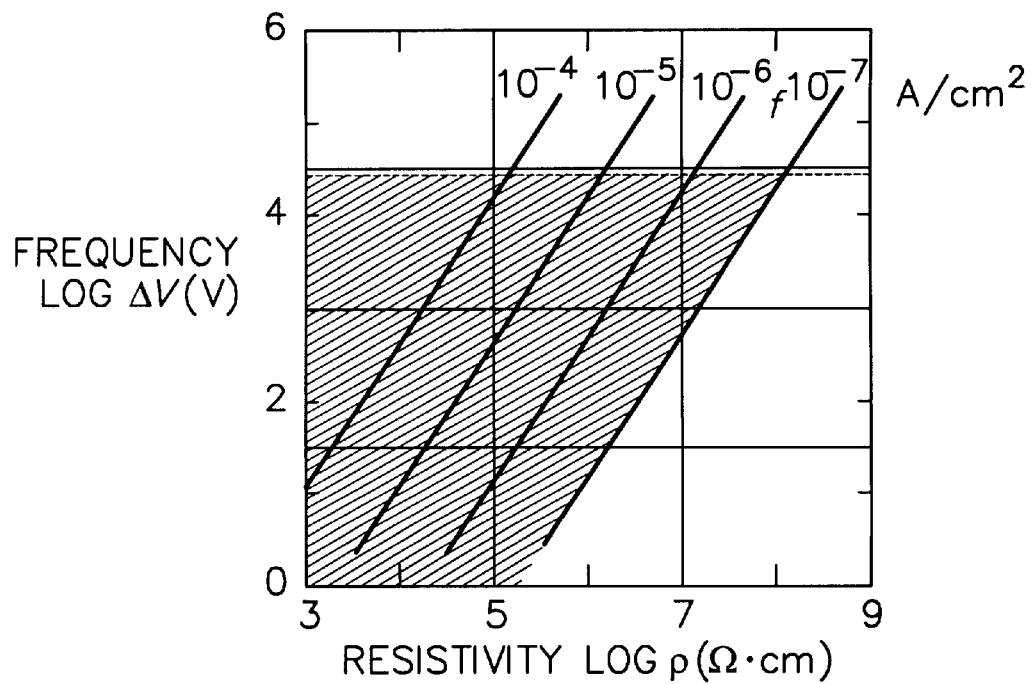
FIG. 15 is a chart to illustrate a relation between the resistivity of the substrate and the voltage drop.

Here, I represents a leakage current, j a leakage current density, R a resistance of the substrate, ρ a resistivity of the substrate, $d_s$ a thickness of the substrate, S an area of the electrode. FIG. 15 illustrates a relation between the resistivity and the voltage drop when $d_s$ is set to 500 μm, as the thickness of the substrate is less than about 500 μm. Since a low voltage drive is possible in a structure that a thin film optical waveguide is formed on a conductive substrate, the drive voltage becomes at least less than 100 V, mostly less than 10 V. When the ratio of the voltage drop ΔV across the substrate against such a drive voltage is less than 1%, the voltage drop ΔV can be considered negligible. That is, to reduce the voltage drop ΔV to less than 0.1 V in case of the drive voltage being 10 V and the leakage current density being about $10^{-4}$ A/cm², it is found that the resistivity of the substrate is required to be less than $10^4$ Ω·cm. However, this leakage current density is considered as a leakage current density in the steady state, and the leakage current density at the moment that the optical waveguide charges or discharges becomes still higher; and therefore, preferably the resistivity is needed to be less than $10^2$ Ω·cm.

The material to comply with such a requirement for the resistance is a $SrTiO_3$ transformed into a conductive or semiconductive by doping an impurity element of 0.01 wt. % to 5.0 wt. %. It is difficult to reduce to less than $10^4$ Ω·cm the resistivity of a $SrTiO_3$ having a dopant less than 0.01 wt. % doped, and the use of a $SrTiO_3$ having a dopant more than 5.0 wt. % doped involves difficulties in the quality of crystal and the uniformity of dopant.

DESCRIPTION OF THE PREFERRED EMBODIMENT

Embodiment 1-(1)

Figure 16:
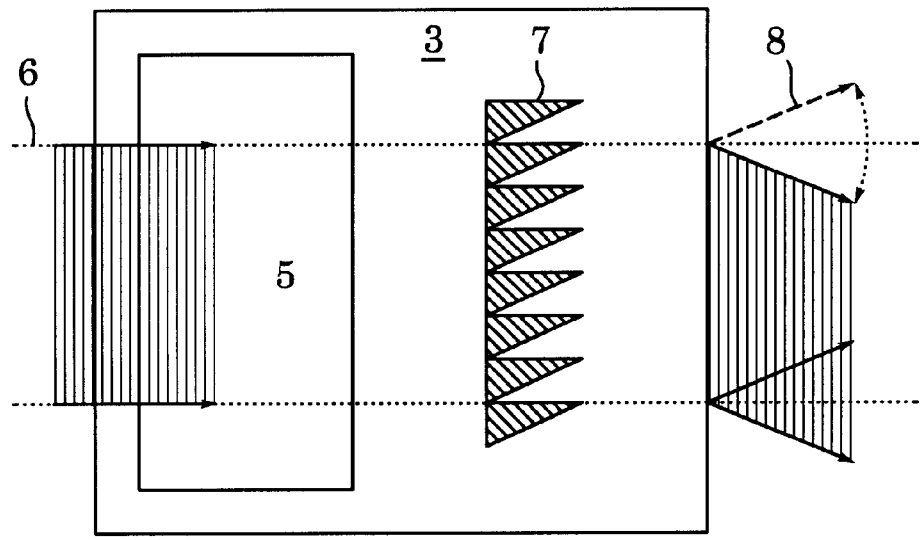
FIG. 16 is a top view of an EO prism-type deflection device of the optical waveguide device according to the embodiment of the present invention.
Figure 18:
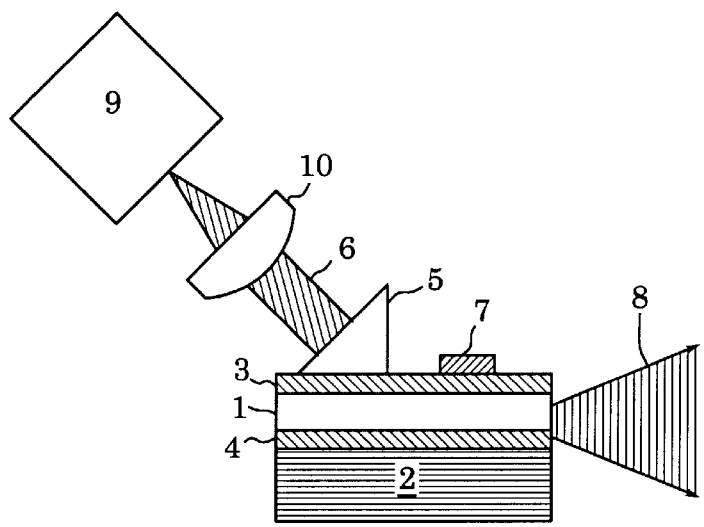
FIG. 18 is a side view of an EO prism-type deflection device of the optical waveguide device according to the embodiment of the present invention.

Preferred embodiments of the optical waveguide device according to the invention will hereafter be described with reference to FIG. 16 and FIG. 18. FIG. 16 is a top view of the optical waveguide device according to this embodiment, and FIG. 18 is a side view thereof. In this embodiment, as shown in Table II, an epitaxial $SrTiO_3$ buffer layer 4 of 130 nm thick was grown on a lower electrode substrate 2 of a single crystal conductive Nb-0.5% doped $SrTiO_3$ (100) having a resistivity 0.05 Ω·cm and an absorption coefficient 174, next an epitaxial PZT (52/48) thin film optical waveguide 1 of 900 nm thick was grown on the buffer layer 4, and further a prism-type electrode 7 was formed thereon, thus fabricating a prism-type deflection device.

[Table 1-(1)]

The $SrTiO_3$ buffer layer 4 was grown by means of the Rf spattering using a $SrTiO_3$ target of a stoichiometric composition. The growth condition was set such that Rf power was 50 W, ratio $O_2$/Ar=4/6, pressure=7.5 m Torr, target-substrate distance=50 mm, substrate temperature=450° C. After the $SrTiO_3$ buffer layer 4 of 130 nm thick was grown, the PZT (52/48) optical waveguide layer 1 was fabricated by the solid phase epitaxy method using the sol-gel method. First, a lead acetic anhydride $Pb(CH_3 COO)_2$, zirconium-isopropoxide $Zr(O-i-C_3H_7)_4$, and titanium-isopropoxide $Ti(O-i-C_3H_7)_4$ as a starting raw material were dissolved in a 2-methoxyethanol. After a 6-hour distillation was carried out, a 18-hour reflex was carried out, and a precursor solution for the PZT (52/48) of 0.6 M by Pb concentration was finally obtained. Further, this precursor solution was coated by the spin coating on the $SrTiO_3$ buffer layer overlying the Nb-doped $SrTiO_3$ substrate.

All the foregoing operations were performed in the $N_2$ atmosphere. Next, in the $O_2$ atmosphere with humidification, the temperature was controlled to rise by 20° C./sec and was held at 350° C., thereafter held at 650° C., and finally the power supply for the electric furnace was disconnected to cool. Thereby, a first layer PZT thin film of 100 nm thick was grown in a solid phase epitaxial state. By repeating this operation still eight times, an epitaxial PZT thin film of 900 nm thick in total was obtained. The crystallographical relation obtained a structure of a single orientational PZT (100)//SrTiO$_3$ (100)//Nb-SrTiO$_3$ (100), and an in-plane orientation PZT [001]//SrTiO$_3$ [001]//Nb-SrTiO$_3$ [001]. The full width at half maxmum (FWHM) of the rocking curve by the PZT (100) plane confirmed 2.05°. After the poling was carried out on this PZT thin film optical waveguide 1, a prism-type upper electrode array 7 of 15 pieces of prisms each of which base was 100 μm and height was 200 μm, made of the ITO thin film of 100 nm thick made by the Rf spattering method, was formed on the PZT thin film optical waveguide 1 by the lift-off method, thus fabricating a prism-type EO (electo-optic) deflection device. Further, ohmic contacts with the Nb-doped SrTiO$_3$ substrate were obtained by In.

Here, when an electric field is applied to a material displaying the electo-optic effect, generally the refractive index is varied by the electric field applied in a crystal structure not having the center of symmetry, and the variation of refractive index is given by the following equation.

$$\Delta n = n^o - n = -aE - bE^2 - \qquad [23]$$

The first order term of the foregoing is called the Pockels effect, which is generally expressed as follows.

$$\Delta n = -1/2 r n^3 E \qquad [24]$$

And, the second order term of the foregoing is called the Kerr effect, which is generally expressed as follows.

$$\Delta n = -1/2 R n^3 E^2 \qquad [25]$$

In practice, as the electric field is gradually increased, the refractive index is varied in a manner that the Kerr effect being the second order electo-optic effect is gradually superposed on the Pockels effect being the first order electo-optic effect. In case of applying the electo-optic effect, a ferroelectric material not having the center of symmetry and having a high coefficient is to be used, and the foregoing oxide ferroelectrics are generally used. To apply a local electric field to such a ferroelectic material produces a lowering of the refractive index on the part.

In this embodiment, the triangle prism-type electrode 7 is disposed at the position shown in FIG. 16 and FIG. 18. When a voltage V is applied between the ITO electrode as the upper electrode and the Nb-doped SrTiO$_3$ (100) substrate as the lower electrode displaced with a distance d therefrom, the variation of refractive index $$\Delta n = -1/2 \cdot r \cdot n^3 \cdot (v/d) \qquad [26]$$

is generated. Provided that the length of the prism is L, and the width is W, the deflection given by the following is generated.

$$\theta = -\Delta n \times L/W = 1/2 \cdot r \cdot n^3 \cdot (v/d) \cdot L/W \qquad [27]$$

Further, when a ferroelectric material displaying the Kerr effect being the second order electo-optic effect is employed for the prism-type light deflection device, the deflection is given as follows.

$$\theta = 1/2 \cdot R \cdot n^3 \cdot (v/d)^2 \cdot L/W \qquad [28]$$

Figure 19:
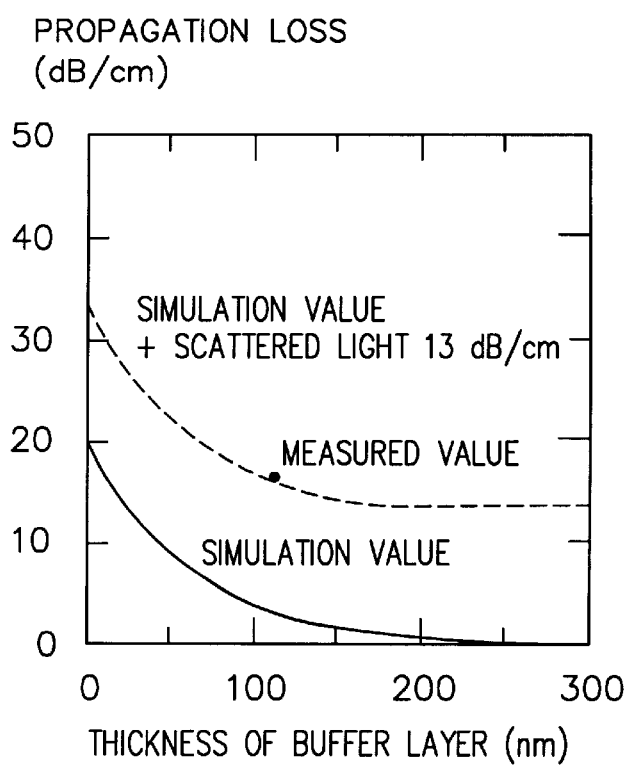
FIG. 19 is a chart to illustrate a relation between the propagation loss of the PZT optical waveguide with a film thickness of 900 nm overlying a $SrTiO_3$ substrate with an absorption coefficient of 174 and the film thickness of a $SrTiO_3$ buffer layer.

First, in order to evaluate the characteristic of the optical waveguide, the laser beams of the wavelength 633 nm were guided by means of a prism coupling into the PZT thin film optical waveguide 1 of the optical waveguide device according to this embodiment, and the scattered light intensity distribution of the TE$_0$ mode in the direction of the light propagation was measured through an optical fiber. From the gradient of the relation between the logarithm of scattered light intensity and the distance of light propagation, the light propagation loss was sought. The result found that the light propagation loss of the PZT optical waveguide 1 formed on the SrTiO$_3$ buffer layer 4 of 130 nm thick of the optical waveguide device according to this embodiment was 16 dB/cm, a level applicable to a practical use. On the other hand, by varying the growth condition onto the non-absorbing non-doped SrTiO$_3$ substrate, PZT thin film optical waveguides having the FWHM of rocking curve 0.54° and 2.01° were directly grown, and the light propagation loss by the scattering and absorption of the PZT thin film optical waveguide was sought. The propagation loss of the PZT thin film optical waveguide having the FWHM 0.54° was found to be 4 dB/cm, and that of the PZT thin film optical waveguide having the FWHM 2.01° to be 13 dB/cm. Therefore, the propagation loss by the scattering and absorption of the PZT thin film optical waveguide itself having the FWHM of rocking curve 2.05° of the optical waveguide device according to the third embodiment can be considered to be 13 dB/cm. To add this propagation loss to the propagation loss by the basic absorption obtained by the simulation based on the foregoing equations [14] and [15] results in that the light propagation loss of the PZT optical waveguide overlying the SrTiO$_3$ buffer layer of 130 nm thick of the optical waveguide device according to this embodiment amounts to 16 dB/cm. The measured value of the optical waveguide device according to this embodiment was found to coincide with the tendency of the propagation loss by the basic absorption obtained by the simulation, as shown in FIG. 19.

On the other hand, in the state that only the SrTiO$_3$ buffer layer of the optical waveguide device according to this embodiment was grown on the Nb-doped SrTiO$_3$ substrate, the relative dielectric constant of the SrTiO$_3$ buffer layer of 130 nm thick was measured. The measurement found that the relative dielectric constant was 65, which was lower than the estimated value 300. The composition was analyzed to examine the above discrepancy, which found that the Sr/Ti ratio was 0.6/1.0 being greatly deviated from the stoichiometric composition. On the other hand, the relative dielectric constant was measured in the PZT thin film optical waveguide directly grown on the Nb-doped SrTiO$_3$ substrate, which found 900. Accordingly, the effective voltage across the PZT thin film optical waveguide calculated by the equation [19] was 33% of the applied voltage. Further, the electo-optic coefficient and the refractive index were measured in the PZT thin film optical waveguide directly grown on the Nb-doped SrTiO$_3$ substrate. The result confirmed r=50 pm/V, and n=2.56.

In this embodiment, a laser beam source 9 generated laser beams 6 of the wavelength 633 nm, and a lens 10 collimated the laser beams 6 into parallel beams of 1 mm in width. The collimated laser beams were guided through an incident prism 5 into the PZT thin film optical waveguide 1 of the prism-type EO deflection device having the SrTiO$_3$ buffer layer of 130 nm thick. And in this state, applying a voltage between the Nb-doped SrTiO$_3$ lower substrate electrode 2 and the ITO prism-type upper electrode 7 generated different refractive indexes in the part under the prism-type electrode and the other parts, which deflected the incident laser beams 6. After being deflected, the deflected laser beams 6 went out from the end face as outgoing beams 8. The deflection angle was sought from a displacement of laser spots on the plane of projection, which confirmed a deflection angle of 1.70 degrees at the applied voltage of 100 V, namely, the effective voltage of 33 V. The deflection angle at the effective voltage of 33 V was reversely sought from r=50 pm/V and n=2.56 which were previously obtained, and d=900 nm, W=100 μm, L=200 μm being served as the design values, which found 1.76 being virtually the same as the measured.

Thus, in a range where the ratio of film thickness of the buffer layer against the optical waveguide exceeds 0.1, the propagation loss comes into a level applicable to a practical use, and the optical waveguide device according to this embodiment was proved to function effectively.

Next, a first comparison example to this embodiment will be described. In this comparison example, an epitaxial $SrTiO_3$ buffer layer of 12 nm thick was grown on a lower electrode substrate of a single crystal conductive Nb-0.5% doped $SrTiO_3$ (100) having a resistivity 0.05 Ω·cm and an absorption coefficient 174, in the same manner as the embodiment 1-(1). Next an epitaxial PZT (52/48) thin film optical waveguide of 900 nm thick was grown on the buffer layer. The thickness ratio of the buffer layer against the optical waveguide layer in this case was about 0.014.

The $SrTiO_3$ buffer layer 4 was grown by means of the Rf spattering at the substrate temperature 450° C., using a $SrTiO_3$ target of a stoichiometric composition. After the $SrTiO_3$ buffer layer of 12 nm thick was grown, the PZT (52/48) optical waveguide layer obtained, in the same manner as the embodiment 1-(1), an epitaxial PZT thin film of 900 nm thick in total grown by the solid phase epitaxy method using the sol-gel method. The crystallographical relation obtained a structure of a single orientational PZT (100)//$SrTiO_3$ (100)//Nb-$SrTiO_3$ (100), and an in-plane orientation PZT [001]//$SrTiO_3$ [001]//Nb-$SrTiO_3$ [001]. The FWHM of the rocking curve by the PZT (100) plane confirmed 1.69°.

The laser beams of the wavelength 633 nm were guided by means of the prism coupling into the PZT thin film optical waveguide of the optical waveguide device according to this comparison example, and the propagation loss of the $TE_0$ mode was measured, which found 42.0 dB/cm. There was not substantially any effect by the insertion of the buffer layer. On the other hand, the light propagation loss by the scattering and absorption of the PZT thin film optical waveguide having the FWHM of rocking curve 2.01° when the PZT thin film optical waveguide was directly grown on the non-absorbing non-doped $SrTiO_3$ substrate was about 16 dB/cm. Therefore, the propagation loss by the scattering and absorption of the PZT thin film optical waveguide itself having the FWHM of rocking curve 1.69° of the optical waveguide device according to this comparison example can also be considered to be about 13 dB/cm. To add this propagation loss to the propagation loss 22 dB/cm by the basic absorption of the PZT optical waveguide overlying the $SrTiO_3$ buffer layer of 12 nm thick obtained by the simulation results in that the light propagation loss of the PZT optical waveguide of this comparison example amounts to 35 dB/cm, which substantially coincides with the measured value. As expected from the foregoing simulation, in the range where the thickness ratio of the buffer layer against the optical waveguide layer is less than 0.1, it is found that the insertion of the buffer layer does not bring a propagation loss applicable to a practical use.

Next, a second comparison example to this embodiment will be described. In this comparison example, an epitaxial PZT (52/48) thin film optical waveguide of 900 nm thick was directly grown on a lower electrode substrate of a single crystal conductive Nb-0.5% doped $SrTiO_3$ (100) having an absorption coefficient 174, in the same manner as the embodiment 1-(1). As for the epitaxial PZT (52/48) optical waveguide layer, in the same manner as the embodiment 1-(1), the epitaxial PZT thin film of 900 nm thick in total was fabricated by the solid phase epitaxy method using the sol-gel method. The crystallographical relation obtained a structure of a single orientational PZT (100)//Nb-$SrTiO_3$ (100), and an in-plane orientation PZT [001]//Nb-$SrTiO_3$ [001]. The growth condition was adjusted in a manner that the FWHM of the rocking curve by the PZT (100) plane was brought to 1.960°.

The laser beams of the wavelength 633 nm were guided by means of the prism coupling into the PZT thin film optical waveguide of the optical waveguide device according to this comparison example, and the propagation loss of the $TE_0$ mode was measured; however, the attenuation was enormous so that the propagation loss could not be obtained. From the FWHM of the rocking curve being 1.960°, the light propagation loss of the PZT thin film optical waveguide itself can be considered as about 16 dB/cm. And, since the light propagation loss by the basic absorption is 22 dB/cm according to the simulation, the propagation loss of the PZT thin film optical waveguide of this comparison example can be considered to be more than 38 dB/cm.

Next, a third comparison example to this embodiment will be described. In this comparison example, an $SiO_2$ buffer layer of 300 nm thick having the refractive index 1.46 and relative dielectric constant 3.9 was grown on a lower electrode substrate of a single crystal conductive Nb-0.5% doped $SrTiO_3$ (100) having a resistivity 0.05 Ω·cm and an absorption coefficient 174, in the same manner as the embodiment 1-(1). Next an epitaxial PZT (52/48) thin film optical waveguide of 900 nm thick was grown on the buffer layer.

The $SiO_2$ buffer layer was formed using the sol-gel method. After the $SiO_2$ buffer layer of 300 nm thick was grown, the PZT (52/48) thin film optical waveguide layer obtained the PZT thin film of 900 nm thick in total by using the sol-gel method, in the same manner as the embodiment 1-(1). Since the $SiO_2$ buffer layer is amorphous, the epitaxial relation with the conductive substrate and the optical waveguide could not be held, and the crystallographical relation was random.

The laser beams of the wavelength 633 nm were guided by means of the prism coupling into the PZT thin film optical waveguide of the optical waveguide device according to this comparison example, and the propagation loss was measured; however, the scattering was enormous so that the light propagation could not be seen at all. The effective voltage across the PZT thin film optical waveguide calculated by the equation [19] becomes only 1.3% of the applied voltage, from the film thickness 900 nm and relative dielectric constant 900 of the PZT (52/48) thin film optical waveguide, and the film thickness 300 nm and relative dielectric constant 3.9 of the $SiO_2$ buffer layer. Therefore, when 100 V is applied to this optical waveguide device, only 1.3 V is applied as the effective voltage, in the same manner as the optical waveguide device according to the embodiment 1-(1).

Embodiment 1-(2)

In this embodiment, in the same manner as the embodiment 1-(1), an epitaxial $SrTiO_3$ buffer layer of 300 nm thick was grown on a lower electrode substrate of a single crystal conductive Nb-0.5% doped $SrTiO_3$ (100) having a resistivity 0.05 Ω·cm and an absorption coefficient 174, next an epitaxial PZT (52/48) thin film optical waveguide of 900 nm thick was grown on the buffer layer, and further a prism-type electrode was formed thereon, thus fabricating a prism-type EO deflection device.

The SrTiO₃ buffer layer was grown by means of the Rf spattering using an SrTiO₃ target with the Sr/Ti ratio of more than 1.0, at the substrate temperature of 600° C. After the SrTiO₃ buffer layer of 300 nm thick was grown, the epitaxial PZT thin film of 900 nm thick in total was obtained by the solid phase epitaxy method using the sol-gel method, in the same manner as the embodiment 1-(1). The crystallographical relation obtained a structure of a single orientational PZT (100)//SrTiO₃ (100)//Nb-SrTiO₃ (100), and an in-plane orientation PZT [001]//SrTiO₃ [001]//Nb-SrTiO₃ [001]. The FWHM of the rocking curve by the PZT (100) plane became 0.51°.

After the poling was carried out on this PZT thin film optical waveguide, a prism-type upper electrode array of 15 pieces of prisms each of which base was 100 μm and height was 1000 μm, made of the ITO thin film of 100 nm thick, was formed on the PZT thin film optical waveguide, thus fabricating a prism-type EO deflection device. Further, ohmic contacts with the Nb-doped SrTiO₃ substrate were obtained by In.

The laser beams of the wavelength 633 nm were guided by means of the prism coupling into the PZT thin film optical waveguide of the optical waveguide device according to this embodiment, and the propagation loss of the $TE_0$ mode was measured to show 3.8 dB/cm, which was a satisfactory value. On the other hand, the light propagation loss by the scattering and absorption of the PZT thin film optical waveguide having the FWHM of rocking curve 0.54° when the PZT thin film optical waveguide was directly grown on the non-absorbing non-doped SrTiO₃ substrate was about 4 dB/cm. Therefore, the propagation loss by the scattering and absorption of the PZT thin film optical waveguide itself having the FWHM of rocking curve 0.51° of the optical waveguide device according to this embodiment can also be considered to be about 4 dB/cm. To add this propagation loss to the propagation loss 0.15 dB/cm by the basic absorption of the PZT optical waveguide overlying the SrTiO₃ buffer layer of 300 nm thick obtained by the simulation in FIG. 19 results in that the light propagation loss of the PZT optical waveguide according to this embodiment amounts to 4.15 dB/cm, which substantially coincides with the measured value.

On the other hand, in the state that only the SrTiO₃ buffer layer of the optical waveguide device according to this embodiment was grown on the Nb-doped SrTiO₃ substrate, the relative dielectric constant of the SrTiO₃ buffer layer of 300 nm thick was measured. The measurement found that the relative dielectric constant was 300, as expected. On the other hand, in the same manner as the embodiment 1-(1), the relative dielectric constant was measured in the PZT thin film optical waveguide directly grown on the Nb-doped SrTiO₃ substrate, which found 900. Accordingly, the effective voltage across the PZT thin film optical waveguide calculated by the equation [19] was 50% of the applied voltage. Further, the electo-optic coefficient and the refractive index were measured in the PZT thin film optical waveguide directly grown on the Nb-doped SrTiO₃ substrate. The result confirmed r=50 pm/V, and n=2.56.

In the same manner as the embodiment 1-(1), after the laser beams of the wavelength 633 nm were collimated into beams of 1 mm in width, and the collimated beams were guided through a prism into the PZT thin film optical waveguide of the prism-type EO deflection device according to this embodiment; and in this state, applying a voltage between the lower Nb-doped SrTiO₃ substrate electrode and the ITO upper prism electrode deflected the incident laser beams. After being deflected, the deflected laser beams went out from the end face. The deflection angle was sought from a displacement of laser spots on the plane of projection, which confirmed a deflection angle of 2.61 degrees at the applied voltage of 20 V, namely, the effective voltage of 10 V. The deflection angle at the effective voltage of 10 V was reversely sought from r=50 pm/V and n=2.56 which were previously sought, and d=900 nm, W=100 μm, L=1000 μm being served as the design values, which found 2.67 being virtually the same as the measured.

Embodiment 1-(3)

In this embodiment, in almost the same manner as the embodiment 1-(1), an epitaxial SrTiO₃ buffer layer of 300 nm thick was grown on a lower electrode substrate of a single crystal conductive Nb-0.5% doped SrTiO₃ (100) having a resistivity 0.05 Ω·cm and an absorption coefficient 174, next an epitaxial PLZT (9/65/35) thin film optical waveguide of 900 nm thick was grown on the buffer layer, and further a prism-type electrode was formed thereon, thus fabricating a prism-type EO deflection device.

[Table 1-(2)]

The SrTiO₃ buffer layer was grown by means of the Rf spattering using a SrTiO₃ target with the Sr/Ti ratio of more than 1.0, at the substrate temperature of 600° C. After the SrTiO₃ buffer layer of 300 nm thick was grown, the epitaxial PZT thin film of 900 nm thick in total was obtained by the solid phase epitaxy method using the sol-gel method, in the same manner as the embodiment 1-(1). The crystallographical relation obtained a structure of a single orientational PLZT (100)//SrTiO₃ (100)//Nb-SrTiO₃ (100), and an in-plane orientation PLZT [001]//SrTiO₃ [001]//Nb-SrTiO₃ [001]. A prism-type upper electrode array of 15 pieces of prisms each of which base was 100 μm and height was 1000 μm, made of the ITO thin film of 100 nm thick, was formed on the PLZT thin film optical waveguide, thus fabricating a prism-type EO deflection device. Further, ohmic contacts with the Nb-doped SrTiO₃ substrate were obtained by In.

The laser beams of the wavelength 780 nm were guided by means of the prism coupling into the PLZT thin film optical waveguide of the optical waveguide device according to this embodiment, and the propagation loss of the $TE_0$ mode was measured to show 1.78 dB/cm, which was a satisfactory value. And, from a measured value 300 of the relative dielectric constant of the SrTiO₃ buffer layer and a measured value 1900 of the relative dielectric constant of the PLZT thin film optical waveguide, the effective voltage across the PLZT thin film optical waveguide was calculated by the equation [19], which found 32% of the applied voltage. Further, the electo-optic coefficient and the refractive index of the PLZT thin film optical waveguide were measured, which confirmed the second order coefficient R=3×10⁻¹⁶ m²/V², and n=2.49.

In the same manner as the embodiment 1-(1), after the laser beams of the wavelength 633 nm were collimated into beams of 1 mm in width, and the collimated beams were guided through a prism into the PLZT thin film optical waveguide of the prism-type EO deflection device according to this embodiment; and in this state, applying a voltage between the lower Nb-doped SrTiO₃ substrate electrode and the ITO upper prism electrode deflected the incident laser beams. After being deflected, the deflected laser beams went out from the end face. The deflection angle was sought from a displacement of laser spots on the plane of projection, which confirmed a deflection angle of 4.23 degrees at the applied voltage of 5 V, namely, the effective voltage of 1.6 V. The deflection angle at the effective voltage of 1.6 V was reversely sought from R=3×10⁻¹⁶ m²/V² and n=2.49 which were previously sought, and d=900 nm, W=100 μm, L=1000

μm being served as the design values, which found 4.19 degrees being virtually the same as the measured.

Embodiment 1-(4)

In this embodiment, in almost the same manner as the embodiment 1-(1), as shown in Table 1-(3), an epitaxial PLZT (9/65/35) buffer layer of 500 nm thick was grown on a lower electrode substrate of a single crystal conductive Nb-0.5% doped $SrTiO_3$ (100) having a resistivity 0.05 Ω·cm and an absorption coefficient 174, next an epitaxial PZT (52/48) thin film optical waveguide of 1000 nm thick was grown on the buffer layer, and further a prism-type electrode was formed thereon, thus fabricating a prism-type EO deflection device.

[Table 1-(3)]

The PLZT (9/65/35) buffer layer and the PZT (52/48) thin film optical waveguide were obtained by the solid phase epitaxy method using the sol-gel method, in the same manner as the embodiment 1-(1), by stacking the PLZT (9/65/35) buffer layer, and thereafter stacking the PZT (52/48) thin film optical waveguide thereon. The crystallographical relation obtained a structure of a single orientational PZT (100)//PLZT (100)//Nb-$SrTiO_3$ (100), and an in-plane orientation PZT [001]//PLZT [001]//Nb-$SrTiO_3$ [001]. A prism-type upper electrode array of 15 pieces of prisms each of which base was 100 μm and height was 1000 μm, made of the ITO thin film of 100 nm thick, was formed on the PZT thin film optical waveguide, thus fabricating a prism-type EO deflection device. Further, ohmic contacts with the Nb-doped $SrTiO_3$ substrate were obtained by In.

The laser beams of the wavelength 633 nm were guided by means of the prism coupling into the PZT thin film optical waveguide of the optical waveguide device according to this embodiment, and the propagation loss of the $TE_0$ mode was measured to show 5.5 dB/cm, which was a satisfactory value. And, from a measured value 1900 of the relative dielectric constant of the PLZT buffer layer and a measured value 900 of the relative dielectric constant of the PZT thin film optical waveguide, the effective voltage across the PZT thin film optical waveguide was calculated by the equation [19], which found 81% of the applied voltage. Further, the electo-optic coefficient and the refractive index of the PZT thin film optical waveguide were measured, which confirmed r=50 pm/V, and n=2.56.

In the same manner as the embodiment 1-(1), after the laser beams of the wavelength 633 nm were collimated into beams of 1 mm in width, and the collimated beams were guided into the PLZT thin film optical waveguide through a prism of the prism-type EO deflection device according to this embodiment; and in this state, applying a voltage between the Nb-doped $SrTiO_3$ lower electrode substrate and the ITO prism-type upper electrode deflected the incident laser beams. After being deflected, the deflected laser beams went out from the end face. The deflection angle was sought from a displacement of laser spots on the plane of projection, which confirmed a deflection angle of 0.96 degrees at the applied voltage of 5 V, namely, the effective voltage of 4.5 V. The deflection angle at the effective voltage of 4.5 V was reversely sought from r=50 pm/V and n=2.56 which were previously obtained, and d=1000 nm, W=100 μm, L=1000 μm being served as the design values, which found 1.08 degrees being virtually the same as the measured.

Embodiment 1-(5)

In this embodiment, in the same manner as the embodiment 1-(1), as shown in Table 1-(4), an epitaxial $Sr_{0.60}Ba_{0.40}Nb_2O_6$ buffer layer of 500 nm thick was grown on a lower electrode substrate of a single crystal conductive La-1.0% doped $SrTiO_3$ (100), and next an epitaxial $Sr_{0.75}Ba_{0.25}Nb_2O_6$ thin film optical waveguide of 1000 nm thick was grown on the buffer layer.

[Table 1-(4)]

The $Sr_{0.06}Ba_{0.40}Nb_2O_6$ buffer layer and the epitaxial $Sr_{0.75}Ba_{0.25}Nb_2O_6$ thin film optical waveguide were grown under the $O_2$ atmosphere and the substrate temperature of 700° C. by the eximer laser deposition method that instantaneously heats a target surface by the UV laser pulse to deposit. The crystallographical relation obtained a structure of a single orientational $Sr_{0.75}Ba_{0.25}Nb_2O_6$ (100)// $Sr_{0.06}Ba_{0.40}Nb_2O_6$ (100)//La-$SrTiO_3$ (100). The laser beams of the wavelength 633 nm were guided by means of the prism coupling into the $Sr_{0.75}Ba_{0.25}Nb_2O_6$ thin film optical waveguide of the optical waveguide device according to this embodiment, and the propagation loss of the $TE_0$ mode was measured to show 6.6 dB/cm, which was a satisfactory value.

Table 1-(5) through Table 1-(10) illustrate the optical waveguides, buffer layers, materials for the conductive substrates, and values of the physical properties of the optical waveguide devices according to the other embodiments each having a structure that the buffer layer is disposed on the oxide conductive substrate and the thin film optical waveguide is provided thereon, in the same manner as the optical waveguide devices according to the foregoing embodiments 1-(1) through 1-(5).

[Table 1-(5)]
[Table 1-(6)]
[Table 1-(7)]
[Table 1-(8)]
[Table 1-(9)]
[Table 1-(10)]

Further, naturally the structure of the optical waveguide device of this invention is not limited to these. In the foregoing embodiments, the prism-type EO deflection device was dealt with as an example. However, naturally the invention is equally applicable to all the optical waveguide devices employing the EO effect, such as Bragg reflection-type switch, total reflection-type switch, directional coupling switch, Mach-Zehender interference switch, digital-type switch, phase modulation device, mode transformation device, wavelength filter device, etc. The application of this invention to these thin film optical waveguide devices will provide a structure that satisfies the low drive voltage characteristic and the low propagation loss characteristic at the same time.

Embodiment 1-(6)

In this embodiment, as shown in Table 1-(11), an epitaxial MgO buffer layer of 1000 nm thick was grown on a lower electrode substrate of a single crystal semiconductive n-type GaAs (100) of a low resistance, and next an epitaxial PZT thin film optical waveguide of 1000 nm thick was grown on the buffer layer.

[Table 1-(11)]

The formation of the epitaxial layer onto the GaAs substrate was carried out by the eximer laser deposition method that instantaneously heats a target surface by the UV laser pulse to deposit. The XeCl eximer laser (wavelength 308 nm) was used, with the condition of the pulse frequency 4 $H_z$, pulse length 17 ns, and energy 130 mJ (energy density on the target surface 1.3 $J/cm^2$). The distance between the target and the substrate was 50 mm.

Since $BaTiO_3$ and MgO do not have an absorption at the wavelength 308 nm, a metal Mg was used for the target. Since MgO has a bond energy higher than 10 eV, the Mg is oxidized easily by introducing $O_2$ during the film formation.

After the GaAs substrate was cleaned by a solvent, the etching was carried out by a solution of $H_2SO_4$ system.

Further, this substrate was rinsed by a deionized water and an ethanol, and finally the spin-drying by an ethanol was carried out under a nitrogen flow. After the spin-drying, the substrate was immediately brought into the deposition chamber, and was heated at a constant temperature and the background pressure $3\times10^{-7}$ Torr to remove (sublimate) fixed substances on the GaAs plane, and next, the film formation of MgO was carried out at the temperature of 350° C. The crystallographical relation between the MgO and GaAs, although the lattice irregularity was 25.5%, found that the crystal orientational relation between the MgO and GaAs was MgO (100) //GaAs (100), and the in-plane orientation was MgO [001]//GaAs [001]. To observe the interface between the MgO and the semiconductor by means of a high resolution transmission electron microscope confirmed a formation of a two-dimensional superlattice by a lattice matching of MgO:GaAs=4:3 on the MgO-GaAs interface. The interface did not have a secondary layer formed thereon, and had a steep face. Further, an epitaxial $BaTiO_3$ layer was grown at 700° C., and an optical waveguide structure was obtained, being $BaTiO_3$ (100)// MgO (100)//GaAs (100), $BaTiO_3$ [001]//MgO [001]//GaAs [001].

Table 1-(12) illustrates the optical waveguide, buffer layer, material for the conductive substrate, and values of the physical properties of the optical waveguide device according to the other embodiment having a structure that the $SrTiO_3$ buffer layer is disposed on the Silicon conductive substrate and the PZT thin film optical waveguide is provided thereon, in the same manner as the optical waveguide device according to this embodiment.

[Table 1-(13)]
Embodiment 1-(7)

In this embodiment, as shown in Table 1-(13), an epitaxial Pt conductive layer of 100 nm thick was grown on a MgO single crystal substrate, next a $SrTiO_3$ buffer layer of 300 nm thick was grown on the substrate, and further an epitaxial PZT (52/48) thin film optical waveguide of 1000 nm thick was grown thereon.

[Table 1-(12)]

The Pt conductive layer and the $SrTiO_3$ buffer layer were grown by means of the Rf spattering. After the Pt conductive layer was grown in epitaxy using a Pt target under the Ar atmosphere and the substrate temperature of 400° C., the $SrTiO_3$ buffer layer was grown in epitaxy using a $SrTiO_3$ target with the Sr/Ti ratio of more than 1.0, under the $O_2$/Ar atmosphere and the substrate temperature of 500° C. The PZT thin film optical waveguide was obtained by the solid phase epitaxy method using the sol-gel method, in the same manner as the embodiment 1-(1). The crystallographical relation obtained an optical waveguide structure of a single orientational PZT (100)//$SrTiO_3$ (100)//Pt (100)//MgO (100), and an in-plane orientation PZT [001]//$SrTiO_3$ [001]// Pt [001]//MgO [001].

Embodiment 1-(8)

In this embodiment, as shown in Table 1-(14), an epitaxial $SrRuO_3$ conductive layer of 100 nm thick was grown on an $SrTiO_3$ single crystal substrate as a lower electrode, next a PLZT (9/65/35) buffer layer of 500 nm thick was grown thereon, and further an epitaxial PZT (52/48) thin film optical waveguide of 1000 nm thick was grown thereon.

[Table 1-(14)]

The $SrRuO_3$ conductive layer was grown by means of the Rf spattering. After the $SrRuO_3$ conductive layer was grown in epitaxy using a $SrRuO_3$ target under the Ar and $O_2$ mixed atmosphere and the substrate temperature of 600° C., the PLZT buffer layer and the PZT thin film optical waveguide were obtained by the solid phase epitaxy method using the sol-gel method, in the same manner as the fourth embodiment. The crystallographical relation obtained a structure of a single orientational PZT (100)//PLZT (100)//$SrRuO_3$ (100)//$SrTiO_3$ (100). The laser beams of the wavelength 633 nm were guided by means of the prism coupling into the PZT (52/48) thin film optical waveguide according to this embodiment, and the propagation loss of the $TE_0$ mode was measured to show 3.7 dB/cm, which was a satisfactory value.

Embodiment 1-(9)

In this embodiment, as shown in Table 1-(15), a $SrRuO_3$ conductive layer of 100 nm thick was grown on a $SrTiO_3$ single crystal substrate as a lower electrode, next an epitaxial $Sr_{0.60}Ba_{0.40}Nb_2O_6$ buffer layer of 500 nm thick was grown thereon, and further an epitaxial $Sr_{0.75}Ba_{0.25}Nb_2O_6$ thin film optical waveguide of 1000 nm thick was grown thereon.

[Table 1-(15)]

The $SrRuO_3$ conductive layer, $Sr_{0.06}Ba_{0.40}Nb_2O_6$ buffer layer, and $Sr_{0.75}Ba_{0.25}Nb_2O_6$ thin film optical waveguide each were grown by means of the Rf spattering. After the $SrRuO_3$ conductive layer was grown in epitaxy using a $SrRuO_3$ target under the Ar and $O_2$ mixed atmosphere and the substrate temperature of 600° C., the $Sr_{0.60}Ba_{0.40}Nb_2O_6$ buffer layer and the $Sr_{0.75}Ba_{0.25}Nb_2O_6$ thin film optical waveguide were grown under the $O_2$ atmosphere and the substrate temperature of 700° C. The crystallographical relation obtained a structure of a single orientational $Sr_{0.75}Ba_{0.25}Nb_2O_6$ (100)//$Sr_{0.60}Ba_{0.40}Nb_2O_6$ (100)//$SrRuO_3$ (100)//$SrTiO_3$ (100). The laser beams of the wavelength 633 nm were guided by means of the prism coupling into the $Sr_{0.75}Ba_{0.25}Nb_2O_6$ thin film optical waveguide according to this embodiment, and the propagation loss of the $TE_0$ mode was measured to show 6.6 dB/cm, which was a satisfactory value.

Table 1-(16) through Table 1-(23) illustrate the optical waveguides, buffer layers, materials for the conductive substrates, and values of the physical properties of the optical waveguide devices according to the other embodiments each having a structure that a buffer layer is disposed on a substrate and a thin film optical waveguide is provided thereon, in the same manner as the optical waveguide devices according to the foregoing embodiments.

[Table 1-(16)]
[Table 1-(17)]
[Table 1-(18)]
[Table 1-(19)]
[Table 1-(20)]
[Table 1-(21)]
[Table 1-(22)]
[Table 1-(23)]

Embodiment 2-(1)

The embodiments of the optical waveguide device according to the invention will be described with reference to FIG. 16 and FIG. 18. FIG. 16 is a top view of the optical waveguide device according to this embodiment, and FIG. 18 is a side view thereof. In this embodiment, as shown in Table 2-(1), an epitaxial $SrTiO_3$ buffer layer 4 of 300 nm thick was grown on a lower electrode substrate 2 of a single crystal conductive Nb-0.5% doped $SrTiO_3$ (100) having a resistivity 0.05 Ω·cm and an absorption coefficient 174, next an epitaxial PZT (52/48) thin film optical waveguide 1 of 900 nm thick was grown on the buffer layer 4, next a $SrTiO_3$ cladding layer 3 of 300 nm thick was grown thereon, and further a prism-type electrode 7 was formed thereon, thus fabricating a prism-type deflection device.

[Table 2-(1)]

The SrTiO$_3$ buffer layer 4 was grown by means of the Rf spattering using a SrTiO$_3$ target with the Sr/Ti ratio of more than 1.0. The growth condition was set such that Rf power was 50 W, ratio O$_2$/Ar=4/6, pressure=7.5 m Torr, target-substrate distance=50 mm, substrate temperature=550° C. After the SrTiO$_3$ buffer layer 4 of 300 nm thick was grown, the PZT (52/48) optical waveguide layer 1 was fabricated by the solid phase epitaxy method using the sol-gel method. First, a lead acetic anhydride Pb(CH$_3$COO)$_2$, zirconium-isopropoxide Zr(O-i-C$_3$H$_7$)$_4$, and titanium-isopropoxide Ti(O-i-C$_3$H$_7$)$_4$ as a starting raw material were dissolved in a 2-methoxyethanol. After a 6-hour distillation was carried out, an 18-hour reflux was carried out, and a precursor solution for the PZT (52/48) of 0.6 M by Pb concentration was finally obtained. Further, this precursor solution was coated by the spin coating on the SrTiO$_3$ buffer layer overlying the Nb-doped SrTiO$_3$ substrate.

All the foregoing operations were performed in the N$_2$ atmosphere. Next, in the O$_2$ atmosphere with humidification, the temperature was controlled to rise by 20° C./sec and was held at 350° C., thereafter held at 650° C., and finally the power supply for the electric furnace was disconnected for cooling. Thereby, a first layer PZT thin film of 100 nm thick was grown in a solid phase epitaxial state. By repeating this operation still eight times, an epitaxial PZT thin film of 900 nm thick in total was obtained. The crystallographical relation obtained a structure of a single orientational PZT (100)//SrTiO$_3$ (100)//Nb-SrTiO$_3$ (100), and an in-plane orientation PZT [001]//SrTiO$_3$ [001]//Nb-SrTiO$_3$ [001].

After the poling was carried out on this PZT thin film optical waveguide 1, the SrTiO$_3$ cladding layer was formed by the sol-gel method. First, a Sr(OC$_2$H$_5$)$_2$ and Ti(O-i-C$_3$H$_7$)$_4$ were dissolved in a 2-methoxyethanol. while stirring this solution, a 2-hour distillation was carried out, further a 22-hour reflux was carried out, and a solution of a composite metal alcoxide SrTi(OC$_2$H$_4$OC$_2$H$_5$)$_6$ was obtained. In a part of this solution were added a water to make the mole ratio with Sr or Ti 1:2, and an ammonia catalyst to make the mole ratio 1:0.2. After stirring for 3 hours at 100° C., these solutions were mixed to make the mole ratio 0.6. This solution was coated by the spin coating on the PZT thin film optical waveguide grown to overlie the Nb-doped SrTiO$_3$ substrate, next heated with the temperature rising speed 20° C./sec, and then it was kept at 350° C. for two minutes and at 550° C. This coating and heat treatment operation was repeated for three times, and the SrTiO$_3$ cladding layer of about 300 nm thick was obtained. A prism-type upper electrode array of 15 pieces of prisms was formed on the SrTiO$_3$ cladding layer by the lift-off method, each of which base was 200 μm and height was 1000 μm, made of the Al thin film of 100 nm thick formed by the Rf spattering method, thus fabricating a prism-type EO deflection device. Further, ohmic contacts with the Nb-doped SrTiO$_3$ substrate were obtained by In.

First, in order to evaluate the characteristic of the optical waveguide, the laser beams of the wavelength 633 nm were guided by means of the prism coupling into the PZT thin film optical waveguide 1 of the optical waveguide device according to this embodiment, and the scattered light intensity distribution of the TE$_0$ mode in the direction of the light propagation was measured through an optical fiber. From the gradient of the relation between the logarithm of scattered light intensity and the distance of light propagation, the light propagation loss was sought. The result found that the light propagation loss of the PZT optical waveguide 1 having the SrTiO$_3$ cladding layer 3 of 300 nm thick of the optical waveguide device according to this embodiment was 4.1 dB/cm, a level applicable to a practical use.

On the other hand, in the state that only the SrTiO$_3$ buffer layer of the optical waveguide device according to this embodiment was grown on the Nb-doped SrTiO$_3$ substrate, the relative dielectric constant of the SrTiO$_3$ buffer layer of 300 nm thick was measured. The measurement found that the relative dielectric constant was 250, which was slightly lower than the estimated value. And, in the state that only the SrTiO$_3$ cladding layer was directly formed on the Nb-doped SrTiO$_3$ substrate, the relative dielectric constant of the SrTiO$_3$ buffer layer of 300 nm thick was measured, which also found 250. On the other hand, the relative dielectric constant was measured in the PZT thin film optical waveguide directly grown on the Nb-doped SrTiO$_3$ substrate, which found 900. Accordingly, the effective voltage across the PZT thin film optical waveguide calculated by the equation [19] was 33% of the applied voltage. Further, the electo-optic coefficient and the refractive index were measured in the PZT thin film optical waveguide directly grown on the Nb-doped SrTiO$_3$ substrate. The result confirmed r=50 pm/V, and n=2.56.

In this embodiment, a laser beam source 9 generated laser beams 6 of the wavelength 633 nm, and a lens 10 collimated the laser beams 6 into parallel beams of 1 mm in width. And, then the collimated beams were guided through an incident prism 5 into the PZT thin film optical waveguide 1 of the prism-type EO deflection device having the SrTiO$_3$ buffer layer 4 of 300 nm thick and the SrTiO$_3$ cladding layer 3 of 300 nm thick. And in this state, applying a voltage between the Nb-doped SrTiO$_3$ lower substrate electrode 2 and the Al prism-type upper electrode 7 generated different refractive indexes in the part under the prism electrode and the other parts, which deflected the incident laser beams 6. After being deflected, the deflected laser beams 6 went out from the end face as outgoing beams 8. The deflection angle was sought from a displacement of laser spots on the plane of projection, which confirmed a deflection angle of 2.15 degrees at the applied voltage of 50 V, namely, the effective voltage of 16.5 V. The deflection angle at the effective voltage of 16.5 V was reversely sought from r=50 pm/V and n=2.56 which were previously obtained, and d=900 nm, W=200 μm, L=1000 μm being served as the design values, which found 2.20 degrees being virtually the same as the measured.

Thus, in a range where the ratio of film thickness of the buffer layer against the optical waveguide exceeds 0.1, the propagation loss comes into a level applicable to a practical use, and the optical waveguide device according to this embodiment was proved to function effectively.

Next, a first comparison example to this embodiment will be described. In this comparison example, in the same manner as the embodiment 2-(1), an epitaxial PZT (52/48) thin film optical waveguide of 900 nm thick was grown directly on a lower electrode substrate of a single crystal conductive Nb-0.5% doped SrTiO$_3$ (100) having an absorption coefficient 174.

The PZT (52/48) optical waveguide layer obtained, in the same manner as the embodiment 2-(1), the epitaxial PZT thin film of 900 nm thick in total fabricated by the solid phase epitaxy method using the sol-gel method. The crystallographical relation obtained a structure of a single orientational PZT (100)//Nb-SrTiO$_3$ (100), and an in-plane orientation PZT [001]//Nb-SrTiO$_3$ [001]. The laser beams of the wavelength 633 nm were guided into the PZT thin film optical waveguide of this comparison example, and the propagation loss was measured. However, when the laser beams of the wavelength 633 nm were guided by means of the prism coupling into the PZT thin film optical wave guide of this comparison example to measure the propagation loss of the $TE_0$ mode, the attenuation was enormous and the propagation loss could not be obtained.

Next, a second comparison example to this embodiment will be described. In this comparison example, in the same manner as the embodiment 2-(1), an epitaxial $SrTiO_3$ buffer layer of 12 nm thick was grown on a lower electrode substrate of a single crystal conductive Nb-0.5% doped $SrTiO_3$ (100) having a resistivity 0.05 Ω·cm and an absorption coefficient 174, and then the epitaxial PZT (52/48) thin film optical waveguide of 900 nm thick in total was grown thereon.

The $SrTiO_3$ buffer layer was grown by means of the Rf spattering using a $SrTiO_3$ target of a stoichiometric composition, at the substrate temperature of 450° C. After the $SrTiO_3$ buffer layer of 12 nm thick was grown, the PZT (52/48) optical waveguide layer obtained, in the same manner as the embodiment 2-(1), the epitaxial PZT thin film of 900 nm thick in total grown by the solid phase epitaxy method using the sol-gel method. The crystallographical relation obtained a structure of a single orientational PZT (100)//$SrTiO_3$ (100)//Nb-$SrTiO_3$ (100), and an in-plane orientation PZT [001]//$SrTiO_3$ [001]//Nb-$SrTiO_3$ [001]. The laser beams of the wavelength 633 nm were guided by means of the prism coupling into the PZT thin film optical waveguide of this comparison example, and the propagation loss of the $TE_0$ mode was measured, which found 42.0 dB/cm. There was not substantially any effect by the insertion of the buffer layer. As expected from the foregoing simulation, in the range where the thickness ratio of the buffer layer against the optical waveguide layer is less than 0.1, it is found that the insertion of the buffer layer does not bring a propagation loss applicable to a practical use.

Next, a third comparison example to this embodiment will be described. In this comparison example, an epitaxial PZT (52/48) thin film optical waveguide of 900 nm thick was grown on a lower electrode substrate of a transparent single crystal conductive Nb-0.005% doped $SrTiO_3$ (100), and further an Al prism-type upper electrode was formed in the same manner as the foregoing embodiment 2-(1), thus fabricating the prism-type EO deflection device.

The PZT (52/48) optical waveguide layer obtained, in the same manner as the embodiment 2-(1), the epitaxial PZT thin film of 900 nm thick in total fabricated by the solid phase epitaxy method using the sol-gel method. A prism-type upper electrode array of 15 pieces of prisms was formed on the PZT thin film optical waveguide, each of which base was 200 μm and height was 1000 μm, made of the Al thin film of 100 nm thick, thus fabricating a prism-type EO deflection device. Further, ohmic contacts with the Nb-doped $SrTiO_3$ substrate were obtained by In. The laser beams of the wavelength 633 nm were guided by means of the prism coupling into the PZT thin film optical waveguide of this comparison example, and the propagation loss of the $TE_0$ mode was measured. The result showed that, in addition to the loss generated by the scattering of the optical waveguide, the absorption by the Al upper electrode affected the propagation loss to increase up to 11.2 dB/cm, which was comparably large.

Next, a fourth comparison example to this embodiment will be described. In this comparison example, in the same manner as the embodiment 2-(1), an epitaxial PZT (52/48) thin film optical waveguide of 900 nm thick was grown on a lower electrode substrate of a transparent single crystal conductive Nb-0.005% doped $SrTiO_3$ (100), a $SiO_2$ cladding layer of 300 nm thick, having a refractive index 1.46 and a relative dielectric constant 3.9, was grown on the PZT (52/48) optical waveguide, and further an Al prism-type upper electrode was formed in the same manner as the foregoing embodiment 2-(1), thus fabricating the prism-type EO deflection device.

The PZT (52/48) optical waveguide layer obtained, in the same manner as the embodiment 2-(1), the epitaxial PZT thin film of 900 nm thick in total fabricated by the solid phase epitaxy method using the sol-gel method. Thereafter, the $SiO_2$ cladding layer was formed by means of the sol-gel method. The laser beams of the wavelength 633 nm were guided by means of the prism coupling into the PZT thin film optical waveguide of this comparison example, and the propagation loss of the $TE_0$ mode was measured. In this case, the influence of absorption by the Al upper electrode was reduced, and the propagation loss became 4.8 dB/cm, which was a satisfactory value. However, the effective voltage across the PZT thin film optical waveguide calculated by the equation [19] becomes only 1.3% of the applied voltage, from the film thickness 900 nm and relative dielectric constant 900 of the PZT (52/48) thin film optical waveguide, and the film thickness 300 nm and relative dielectric constant 3.9 of the $SiO_2$ buffer layer. It shows that the effective voltage is greatly reduced to 1.3 V when the applied voltage is 100 V.

Embodiment 2-(2)

In this embodiment, in virtually the same manner as the foregoing embodiment 2-(1), as shown in Table 2-(2), an epitaxial PLZT (9/65/35) buffer layer of 500 nm thick was grown on a lower electrode substrate of a single crystal conductive Nb-0.5% doped $SrTiO_3$ (100) having a resistivity 0.05 Ω·cm and an absorption coefficient 174, next an epitaxial PZT (52/48) thin film optical waveguide of 1000 nm thick was grown on the buffer layer, next an epitaxial PLZT (9/65/35) cladding layer of 500 nm thick was grown thereon, and further an Au prism-type upper electrode was formed thereon, thus fabricating a prism-type EO deflection device.

[Table 2-(2)]

The PLZT (9/65/35) buffer layer, the PZT (52/48) thin film optical waveguide, and the PLZT (9/65/35) cladding layer were obtained by the solid phase epitaxy method using the sol-gel method, in the same manner as the embodiment 2-(1), by stacking the PLZT (9/65/35) buffer layer, and stacking the PZT (52/48) thin film optical waveguide thereon, and then stacking the PLZT cladding layer thereon. The crystallographical relation obtained a structure of a single orientational PLZT (100)//PZT (100)//PLZT(100)//Nb-$SrTiO_3$ (100), and an in-plane orientation PLZT [001]//PLZT[001]//PLZT [001]//Nb-$SrTiO_3$ [001]. A prism-type upper electrode array of 15 pieces of prisms each of which base was 100 μm and height was 1000 μm, made of the Au thin film, was formed on the PZT thin film optical waveguide, thus fabricating a prism-type EO deflection device. Further, ohmic contacts with the Nb-doped $SrTiO_3$ substrate were obtained by In.

The laser beams of the wavelength 633 nm were guided by means of the prism coupling into the PZT thin film optical waveguide of this embodiment, and the propagation loss of the $TE_0$ mode was measured to show 3.8 dB/cm, which was a satisfactory value. And, from the measured value 1900 of the relative dielectric constant of the PLZT buffer layer and the measured value 900 of the relative dielectric constant of the PZT thin film optical waveguide, the effective voltage across the PZT thin film optical waveguide calculated by the equation [19] was given 68% of the applied voltage. Further, the electo-optic coefficient and the refractive index of the PZT thin film optical waveguide were measured, which resulted in r=50 pm/V, and n=2.56. After the laser beams of the wavelength 633 nm were collimated into beams of 1 mm in width, and the collimated laser beams were guided through a prism into the PZT thin film optical waveguide of the prism-type EO deflection device of this embodiment, in the same manner as the embodiment 2-(1); and in this state, applying a voltage between the Nb-doped $SrTiO_3$ lower electrode substrate and the Au prism-type upper electrode deflected the incident laser beams. After being deflected, the deflected laser beams went out from the end face. The deflection angle was sought from a displacement of laser spots on the plane of projection, which confirmed a deflection angle of 0.83 degrees at the applied voltage of 5 V, namely, the effective voltage of 3.4 V. The deflection angle at the effective voltage of 3.4 V was reversely sought from r=50 pm/V and n=2.56 which were previously sought, and d=1000 nm, W=100 $\mu$m, L=1000 $\mu$m being served as the design values, which found 0.82 degrees being virtually the same as the measured.

Embodiment 2-(3)

In this embodiment, in the same manner as the foregoing embodiment 2-(1), as shown in Table 2-(3), an epitaxial $Sr_{0.60}Ba_{0.40}Nb_2O_6$ buffer layer of 500 nm thick was grown on a lower electrode substrate of a single crystal conductive La-1.0% doped $SrTiO_3$ (100), next an epitaxial $Sr_{0.75}Ba_{0.25}Nb_2O_6$ thin film optical waveguide of 1000 nm thick was grown on the buffer layer, and further an epitaxial $Sr_{0.60}Ba_{0.40}Nb_2O_6$ buffer layer of 500 nm thick was grown thereon.

[Table 2-(3)]

The $Sr_{0.60}Ba_{0.40}Nb_2O_6$ buffer layer, the epitaxial $Sr_{0.75}Ba_{0.25}Nb_2O_6$ thin film optical waveguide, and the $Sr_{0.60}Ba_{0.40}Nb_2O_6$ cladding layer were grown under the $O_2$ atmosphere and the substrate temperature of 700° C. by the eximer laser deposition method that instantaneously heats a target surface by the UV laser pulse to deposit. The crystallographical relation obtained a structure of a single orientational $Sr_{0.60}Ba_{0.40}Nb_2O_6$ (100)//$Sr_{0.75}Ba_{0.25}Nb_2O_6$ (100)//$Sr_{0.60}Ba_{0.40}Nb_2O_6$ (100)//La-$SrTiO_3$ (100). The laser beams of the wavelength 633 nm were guided by means of the prism coupling into the $Sr_{0.75}Ba_{0.25}Nb_2O_6$ thin film optical waveguide according to this embodiment, and the propagation loss of the $TE_0$ mode was measured to show 5.2 dB/cm, which was a satisfactory value.

Table 2-(4) through Table 2-(10) illustrate the other embodiments each having a structure that a buffer layer is formed on an oxide conductive substrate as needed and a thin film optical waveguide and a cladding layer are provided thereon, in the same manner as the foregoing embodiments 2-(1) through 2-(3). Such a structure is not limited to these. The foregoing embodiments deal with the prism-type EO device, however naturally the invention is equally applicable to all the optical waveguide devices employing the EO effect, such as the Bragg reflection-type switch, total reflection-type switch, directional coupling switch, Mach-Zehender interference switch, digital-type switch, phase modulation device, mode transformation device, wavelength filter device, etc. The application of this invention to these thin film optical waveguide devices will provide a structure that satisfies the low drive voltage characteristic and the low propagation loss characteristic at the same time.

[Table 2-(4)]
[Table 2-(5)]
[Table 2-(6)]
[Table 2-(7)]
[Table 2-(8)]
[Table 2-(9)]
[Table 2-(10)]

Embodiment 2-(4)

In this embodiment, as shown in Table 2-(11), an epitaxial MgO buffer layer of 1000 nm thick was grown on a lower electrode substrate of a single crystal semiconductive n-type GaAs (100) of a low resistance, next an epitaxial PZT thin film optical waveguide of 1000 nm thick was grown on the buffer layer, and further an MgO cladding layer was grown thereon.

[Table 2-(11)]

The formation of the epitaxial layer onto the GaAs substrate was carried out by the eximer laser deposition method that instantaneously heats a target surface by the UV laser pulse to deposit. The XeCl eximer laser (wavelength 308 nm) was used, with the condition of the pulse frequency 4 $H_z$, pulse length 17 ns, and energy 130 mJ (energy density on the target surface 1.3 J/cm$^2$). The distance between the target and the substrate was 50 mm. Since $BaTiO_3$ and MgO do not have an absorption of the wavelength 308 nm, a metal Mg was used for the target. Since MgO has a bond energy higher than 10 eV, the Mg is oxidized easily by introducing $O_2$ during the film formation.

After the GaAs substrate was cleaned by a solvent, the etching was carried out by a solution of $H_2SO_4$ system. Further, this substrate was rinsed by a deionized water and an ethanol, and finally the spin-drying by an ethanol was carried out under a nitrogen flow. After the spin-drying, the substrate was immediately brought into the deposition chamber, and was heated at a constant temperature and the background pressure 3×10$^{-7}$ Torr to remove (sublimate) fixed substances on the GaAs plane, and next, the film formation of MgO was carried out at the temperature of 350° C. The crystallographical relation between the MgO and GaAs, although the lattice irregularity was 25.5%, found that the crystal orientational relation between the MgO and GaAs was MgO (100)//GaAs (100), and the in-plane orientation was MgO [001]//GaAs [001]. To observe the interface between the MgO and the semiconductor by means of a high resolution transmission electron microscope confirmed a formation of a two-dimensional superlattice by a lattice matching of MgO:GaAs=4:3 on the MgO-GaAs interface. The interface did not have a secondary layer formed thereon, and had a steep face. Further, an epitaxial $BaTiO_3$ layer was grown at 700° C., and an optical waveguide structure was obtained, being $BaTiO_3$ (100)//MgO (100)//GaAs (100), $BaTiO_3$ [001]//MgO [001]//GaAs [001].

Table 2-(12) illustrates the other embodiment having a structure that the $SrTiO_3$ buffer layer and the $SrTiO_3$ cladding layer are disposed on the Silicon semiconductive substrate and the PZT thin film optical waveguide is provided thereon, in the same manner as the optical waveguide device according to this embodiment.

[Table 2-(12)]

Embodiment 2-(5)

In this embodiment, as shown in Table 2-(13), an epitaxial Pt conductive layer of 100 nm thick was grown on an MgO single crystal substrate, next a $SrTiO_3$ buffer layer of 300 nm thick was grown on the substrate, and an epitaxial PZT (52/48) thin film optical waveguide of 1000 nm thick was grown thereon, and further an $SrTiO_3$ cladding layer of 300 nm thick was grown thereon.

[Table 2-(13)]

The Pt conductive layer and the $SrTiO_3$ buffer layer were grown by means of the Rf spattering. After the Pt conductive layer was grown in epitaxy using a Pt target under the Ar atmosphere and the substrate temperature of 400° C., the SrTiO$_3$ buffer layer was grown in epitaxy using a SrTiO$_3$ target with the Sr/Ti ratio of more than 1.0, under the O$_2$/Ar atmosphere and the substrate temperature of 500° C. The PZT thin film optical waveguide was obtained by the solid phase epitaxy method using the sol-gel method, in the same manner as the embodiment 2-(1). The crystallographical relation obtained an optical waveguide structure of a single orientational PZT (100)//SrTiO$_3$ (100)//Pt (100)//MgO (100), and an in-plane orientation PZT [001]//SrTiO$_3$ [001]// Pt [001]//MgO [001].

Embodiment 2-(6)

In this embodiment, as shown in Table 2-(14), an epitaxial SrRuO$_3$ conductive layer of 100 nm thick was grown on a SrTiO$_3$ single crystal substrate as a lower electrode, next a PLZT (9/65/35) buffer layer of 500 nm thick was grown thereon, and an epitaxial PZT (52/48) thin film optical waveguide of 1000 nm thick was grown thereon, and further an epitaxial PLZT (9/65/35) cladding layer of 500 nm thick was grown thereon.

[Table 2-(14)]

The SrRuO$_3$ conductive layer was grown by means of the Rf spattering. After the SrRuO$_3$ conductive layer was grown in epitaxy using an SrRuO$_3$ target under the Ar and O$_2$ mixed atmosphere and the substrate temperature of 600° C., the PLZT buffer layer, the PZT thin film optical waveguide, and the PLZT cladding layer were obtained by the solid phase epitaxy method using the sol-gel method, in the same manner as the embodiment 2-(2). The crystallographical relation obtained a structure of a single orientational PLZT (100)//PZT (100)//PLZT (100)//SrRuO$_3$ (100)//SrTiO$_3$ (100). The laser beams of the wavelength 633 nm were guided by means of the prism coupling into the PZT (52/48) thin film optical waveguide according to this embodiment, and the propagation loss of the TE$_0$ mode was measured to show 3.3 dB/cm, which was a satisfactory value.

Embodiment 2-(7)

In this embodiment, as shown in Table 2-(15), a SrRuO$_3$ conductive layer of 100 nm thick was grown on a SrTiO$_3$ single crystal substrate as a lower electrode, next an epitaxial Sr$_{0.60}$Ba$_{0.04}$Nb$_2$O$_6$ buffer layer of 500 nm thick was grown thereon, and an epitaxial Sr$_{0.75}$Ba$_{0.25}$Nb$_2$O$_6$ thin film optical waveguide of 1000 nm thick was grown thereon, and further an epitaxial Sr$_{0.60}$Ba$_{0.40}$Nb$_2$O$_6$ cladding layer of 500 nm thick was grown thereon.

[Table 2-(15)]

The SrRuO$_3$ conductive layer, Sr$_{0.60}$Ba$_{0.40}$Nb$_2$O$_6$ buffer layer, Sr$_{0.75}$Ba$_{0.25}$Nb$_2$O$_6$ thin film optical waveguide, and Sr$_{0.60}$Ba$_{0.40}$Nb$_2$O$_6$ cladding layer each were grown by means of the Rf spattering. After the SrRuO$_3$ conductive layer was grown in epitaxy using a SrRuO$_3$ target under the Ar and O$_2$ mixed atmosphere and the substrate temperature of 600° C., the Sr$_{0.60}$Ba$_{0.40}$Nb$_2$O$_6$ buffer layer, the Sr$_{0.75}$Ba$_{0.25}$Nb$_2$O$_6$ thin film optical waveguide, and the Sr$_{0.60}$Ba$_{0.40}$Nb$_2$O$_6$ cladding layer were grown under the O$_2$ atmosphere and the substrate temperature of 700° C. The crystallographical relation obtained a structure of a single orientational Sr$_{0.60}$Ba$_{0.40}$Nb$_2$O$_6$ (100)//Sr$_{0.75}$Ba$_{0.25}$Nb$_2$O$_6$ (100)//Sr$_{0.60}$Ba$_{0.40}$ Nb$_2$O$_6$ (100)//SrRuO$_3$ (100)//SrTiO$_3$ (100). The laser beams of the wavelength 633 nm were guided by means of the prism coupling into the Sr$_{0.75}$Ba$_{0.25}$Nb$_2$O$_6$ thin film optical waveguide according to this embodiment, and the propagation loss of the TE$_0$ mode was measured to show 4.6 dB/cm, which was a satisfactory value.

Table 2-(16) through Table 2-(23) illustrate the optical waveguides, buffer layers, cladding layers, materials for the conductive substrates, and values of the physical properties of the optical waveguide devices according to the other embodiments each having a structure that a conductive layer and a buffer layer as needed are disposed on a substrate and a thin film optical waveguide and a cladding layer are provided thereon, in the same manner as the foregoing embodiments.

[Table 2-(16)]
[Table 2-(17)]
[Table 2-(18)]
[Table 2-(19)]
[Table 2-(20)]
[Table 2-(21)]
[Table 2-(22)]
[Table 2-(23)]

Embodiment 3-(1)

The optical waveguide device according to this embodiment will be described with reference to FIG. 16 and FIG. 18. FIG. 16 is a top view of the optical waveguide device according to this embodiment, and FIG. 18 is a side view thereof. In this embodiment, as shown in Table 3-(1), an epitaxial PZT (52/48) thin film optical waveguide 1 of 900 nm thick was grown on a lower electrode substrate 2 of a transparent single crystal conductive Nb-doped SrTiO$_3$ (100), next a SrTiO$_3$ cladding layer 3 of 300 nm thick was grown thereon, and further an Al prism-type upper electrode 7 was formed thereon, thus fabricating a prism-type EO deflection device.

[Table 3-(1)]

The PZT (52/48) optical waveguide layer 1 was fabricated by the solid phase epitaxy method using the sol-gel method. First, a lead acetic anhydride Pb(CH$_3$ COO)$_2$, zirconium-isopropoxide Zr(O-i-C$_3$H$_7$)$_4$, and titanium-isopropoxide Ti(O-i-C$_3$H$_7$)$_4$ as a starting raw material were dissolved in a 2-methoxyethanol. After a 6-hour distillation was carried out, a 18-hour reflux was carried out, and a precursor solution for the PZT (52/48) of 0.6 M by Pb concentration was finally obtained. Further, this precursor solution was coated by the spin coating on the SrTiO$_3$ buffer layer. All the foregoing operations were performed in the N$_2$ atmosphere. Next, in the O$_2$ atmosphere with humidification, the temperature was controlled to rise by 20° C./sec and was held at 350° C., thereafter held at 650° C., and finally the power supply for the electric furnace was disconnected for cooling. Thereby, a first layer PZT thin film of 100 nm thick was grown in a solid phase epitaxial state. By repeating this operation still eight times, an epitaxial PZT thin film of 900 nm thick in total was obtained. The crystallographical relation obtained a structure of a single orientational PZT (100)//Nb-SrTiO$_3$ (100), and an in-plane orientation PZT [001]//Nb-SrTiO$_3$ [001].

After the poling was carried out on this PZT thin film optical waveguide 1, the SrTiO$_3$ cladding layer 3 was formed by the sol-gel method. First, a Sr(OC$_2$H$_5$)$_2$ and Ti(O-i-C$_3$H$_7$)$_4$ were dissolved in a 2-methoxyethanol. while stirring this solution, a 2-hour distillation was carried out, further a 22-hour reflux was carried out, and a solution of a composite metal alcoxide SrTi(OC$_2$H$_4$ OC$_2$H$_5$)$_6$ was obtained. In a part of this solution were added a water to make the mole ratio with Sr or Ti 1:2, and an ammonia catalyst to make the mole ratio 1:0.2. After stirring for 3 hours at 100° C., these solutions were mixed to make the mole ratio 0.6. This solution was coated by the spin coating on the PZT thin film optical waveguide 1 grown to overlie the Nb-doped SrTiO$_3$ substrate, next heated with the temperature rising speed 20° C./sec, and then it was kept at 350° C. for two minutes and at 550° C. This coating and heat treatment operation was repeated for three times, and the SrTiO$_3$ cladding layer 3 of about 300 nm thick was obtained. A prism-type upper electrode array 7 of 15 pieces of prisms was formed on the SrTiO$_3$ cladding layer 3 by the lift-off method, each of which base was 200 μm and height was 1000 μm, made of the Al thin film of 100 nm thick formed by the Rf spattering method, thus fabricating a prism-type EO deflection device. Further, ohmic contacts with the Nb-doped SrTiO$_3$ substrate 2 were obtained by In.

First, in order to evaluate the characteristic of the optical waveguide, the laser beams of the wavelength 633 nm were guided by means of a prism coupling into the PZT thin film optical waveguide 1 of the optical waveguide device according to this embodiment, and the scattered light intensity distribution of the TE$_0$ mode in the direction of the light propagation was measured through an optical fiber. From the gradient of the relation between the logarithm of scattered light intensity and the distance of light propagation, the light propagation loss was sought. The result found that the light propagation loss of the PZT optical waveguide 1 having the SrTiO$_3$ cladding layer 3 of 300 nm thick of the optical waveguide device according to this embodiment was 4.1 dB/cm, a level applicable to a practical use.

On the other hand, in the state that only the SrTiO$_3$ cladding layer of the optical waveguide device according to this embodiment was grown on the Nb-doped SrTiO$_3$ substrate, the relative dielectric constant of the SrTiO$_3$ cladding layer of 300 nm thick was measured. The measurement found that the relative dielectric constant was 250, which was slightly lower than the estimated value 300. On the other hand, the relative dielectric constant was measured in the PZT thin film optical waveguide directly grown on the Nb-doped SrTiO$_3$ substrate, which found 900. Accordingly, the effective voltage across the PZT thin film optical waveguide calculated by the equation [19] was 45% of the applied voltage. Further, the electo-optic coefficient and the refractive index were measured in the PZT thin film optical waveguide directly grown on the Nb-doped SrTiO$_3$ substrate. The result confirmed r=50 pm/V, and n=2.56.

In this embodiment, a laser beam source 9 generated laser beams 6 of the wavelength 633 nm, and a lens 10 collimated the laser beams 6 into parallel beams of 1 mm in width, and the collimated beams were guided through an incident prism 5 into the PZT thin film optical waveguide 1 of the prism-type EO deflection device having the SrTiO$_3$ cladding layer of 300 nm thick. And in this state, applying a voltage between the Nb-doped SrTiO$_3$ lower substrate electrode 2 and the Al prism-type upper electrode 7 generated different refractive indexes in the part under the prism electrode 7 and the other parts, thereby deflecting the incident laser beams 6. After being deflected, the deflected laser beams 6 went out from the end face as outgoing beams 8. The deflection angle was sought from a displacement of laser spots on the plane of projection, which confirmed a deflection angle of 2.92 degrees at the applied voltage of 50 V, namely, the effective voltage of 22.5 V. The deflection angle at the effective voltage of 22.5 V was reversely sought from r=50 pm/V and n=2.56 which were previously obtained, and d=900 nm, W=200 μm, L=1000 μm being served as the design values, which found 3.00 being virtually the same as the measured.

Thus, in a range where the ratio of film thickness of the cladding layer against the optical waveguide exceeds 0.05, the propagation loss comes into a level applicable to a practical use, and the optical waveguide device according to this embodiment was proved to function effectively.

Next, a first comparison example to this embodiment will be described. In this comparison example, an epitaxial PZT (52/48) thin film optical waveguide of 900 nm thick was grown on a lower electrode substrate of a transparent single crystal conductive Nb-doped SrTiO$_3$ (100), and then an Al prism-type upper electrode was formed thereon, thus fabricating a prism-type EO deflection device. The PZT (52/48) optical waveguide layer obtained the epitaxial PZT thin film of 900 nm thick in total by the solid phase epitaxy method using the sol-gel method, in the same manner as this embodiment. A prism-type upper electrode array of 15 pieces of prisms was formed on the PZT thin film optical waveguide, each of which base was 200 μm and height was 1000 μm, made of the Al thin film of 100 nm thick, in the same manner as this embodiment, thus fabricating a prism-type EO deflection device. Further, ohmic contacts with the Nb-doped SrTiO$_3$ substrate 2 were obtained by In.

The laser beams of the wavelength 633 nm were guided by means of the prism coupling into the PZT thin film optical waveguide of this comparison example, and the propagation loss of the TE$_0$ mode was measured. The result showed that, in addition to the loss generated by the scattering of the optical waveguide, the absorption by the Al upper electrode affected the propagation loss to increase up to 11.2 dB/cm, which was comparably large.

Next, a second comparison example to this embodiment will be described. In this comparison example, in the same manner as this embodiment, an epitaxial PZT (52/48) thin film optical waveguide of 900 nm thick was grown on a lower electrode substrate of a transparent single crystal conductive Nb-doped SrTiO$_3$ (100), next a SiO$_2$ cladding layer of 300 nm thick having a refractive index 1.46 and a relative dielectric constant 3.9 was grown on the PZT (52/48) optical waveguide, and further an Al prism-type upper electrode of the same type as this embodiment was formed thereon, thus fabricating a prism-type EO deflection device. The PZT (52/48) optical waveguide layer obtained the epitaxial PZT thin film of 900 nm thick in total by the solid phase epitaxy method using the sol-gel method, in the same manner as this embodiment. Thereafter, the SiO$_2$ cladding layer was formed by using the sol-gel method.

The laser beams of the wavelength 633 nm were guided by means of the prism coupling into the PZT thin film optical waveguide of this comparison example, and the propagation loss of the TE$_0$ mode was measured. In this case, the influence of absorption by the Al upper electrode was reduced, and the propagation loss became 4.8 dB/cm, which was a satisfactory value. However, the effective voltage across the PZT thin film optical waveguide calculated by the equation [19] becomes only 1.3% of the applied voltage, from the film thickness 900 nm and relative dielectric constant 900 of the PZT (52/48) thin film optical waveguide, and the film thickness 300 nm and relative dielectric constant 3.9 of the SiO$_2$ buffer layer. It shows that the effective voltage is greatly reduced to 1.3 V when the applied voltage is 100 V.

Embodiment 3-(2)

In the optical waveguide device according to this embodiment, as shown in Table 3-(2), in virtually the same manner as the embodiment 3-(1), an epitaxial PZT (52/48) thin film optical waveguide 1 of 1000 nm thick was grown on a lower electrode substrate of a transparent single crystal conductive Nb-doped SrTiO$_3$ (100), next an epitaxial PLZT (9/65/35) cladding layer of 500 nm thick was grown thereon, and finally an Au prism-type upper electrode was formed thereon, thus fabricating a prism-type EO deflection device.

[Table 3-(2)]

The PZT (52/48) thin film optical waveguide and the PLZT (9/65/35) cladding layer were obtained by the solid phase epitaxy method using the sol-gel method, in the same manner as the embodiment 3-(1), by stacking the PZT (52/48) thin film optical waveguide and then stacking the PLZT cladding layer thereon. The crystallographical relation obtained a structure of a single orientational PLZT (100)//PZT (100)//Nb-SrTiO$_3$ (100), and an in-plane orientation PLZT [001]//Nb-SrTiO$_3$ [001]. A prism-type upper electrode array of 15 pieces of prisms, each of which base was 100 μm and height was 1000 μm, made of the Au thin film, was formed on the PZT thin film optical waveguide, thus fabricating a prism-type EO deflection device. Further, ohmic contacts with the Nb-doped SrTiO$_3$ substrate were obtained by In.

The laser beams of the wavelength 633 nm were guided by means of the prism coupling into the PZT thin film optical waveguide of the optical waveguide device according to this embodiment, and the propagation loss of the TE$_0$ mode was measured, which gave a satisfactory value. And, from the measured value 1900 of the relative dielectric constant of the PLZT buffer layer and the measured value 900 of the relative dielectric constant of the PZT thin film optical waveguide, the effective voltage across the PZT thin film optical waveguide calculated by the equation [19] was given 81% of the applied voltage. Further, the electo-optic coefficient and the refractive index of the PZT thin film optical waveguide were measured, which resulted in r=50 pm/V, and n=2.56.

In the same manner as the embodiment 3-(1), after the laser beams of the wavelength 633 nm were collimated into beams of 1 mm in width, and the collimated laser beams were guided through a prism into the PZT thin film optical waveguide of the prism-type EO deflection device according to this embodiment; and in this state, applying a voltage between the Nb-doped SrTiO$_3$ lower electrode substrate and the prism-type Au upper electrode deflected the incident laser beams. After being deflected, the deflected laser beams went out from the end face. The deflection angle was sought from a displacement of laser spots on the plane of projection, which confirmed a deflection angle of 0.96 at the applied voltage of 5 V, namely, the effective voltage of 4.1 V. The deflection angle at the effective voltage of 4.1 V was reversely sought from r=50 pm/V and n=2.56 which were previously sought, and d=1000 nm, W=100 μm, L=1000 μm being served as the design values, which found 0.99 being virtually the same as the measured.

Table 3-(3) and Table 3-(4) illustrate the optical waveguides, buffer layers, materials for the conductive substrates, and values of the physical properties of the optical waveguide devices according to the other embodiments each having a structure that a thin film optical waveguide and a cladding layer are provided on an oxide conductive substrate, in the same manner as the optical waveguide device according to the embodiments 3-(1) and 3-(2). However, such a structure is not limited to these. The foregoing embodiments deal with the prism-type EO device, however naturally the invention is equally applicable to all the optical waveguide devices employing the EO effect, such as the Bragg reflection-type switch, total reflection-type switch, directional coupling switch, Mach-Zehender interference switch, phase modulation device, mode transformation device, wavelength filter device, etc. The application of this invention to these thin film optical waveguide devices will provide a structure that satisfies the low drive voltage characteristic and the low propagation loss characteristic at the same time.

[Table 3-(3)]
[Table 3-(4)]
Embodiment 3-(3)

In this embodiment, as shown in Table 3-(5), first an epitaxial Al-doped ZnO conductive layer of 200 nm thick was grown on a sapphire single crystal substrate, next an epitaxial LiNbO$_3$ thin film optical waveguide of 1000 nm thick was grown on the conductive layer, and further a ZnO cladding layer of 300 nm thick was grown thereon.

All the layers were grown by the Rf spattering, and the crystallographical relation obtained an optical waveguide structure of a single orientational ZnO (001)//LiNbO$_3$ (001)//Al-ZnO (001)//AlO$_2$O$_3$ (001).

[Table 3-(5)]

Table 3-(6) illustrates the optical waveguide, buffer layer, material for the conductive substrate, and values of the physical properties of the optical waveguide device according to the other embodiment having a structure that a conductive layer is disposed on a substrate and a thin film optical waveguide and a cladding layer are provided thereon, in the same manner as the optical waveguide device according to the this embodiment. However, such a structure is not limited to this.

[Table 3-(6)]
Embodiment 4-(1)

Figure 17:
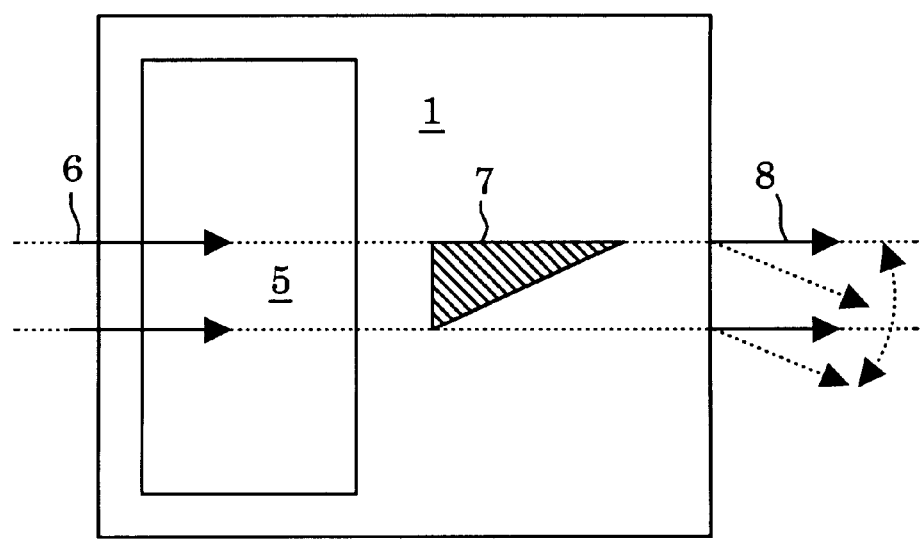
FIG. 17 is a side view of an EO prism-type deflection device of the optical waveguide device according to the embodiment of the present invention.

The optical waveguide device according to this embodiment will be described with reference to FIG. 17 and FIG. 18. FIG. 17 is a top view of the optical waveguide device according to this embodiment, and FIG. 18 is a side view thereof. In this embodiment, as shown in Table 4-(1), an epitaxial PlZT (9/65/35) buffer layer 4 of 500 nm thick was grown on a lower electrode substrate 2 of a single crystal conductive Nb-0.5% doped SrTiO$_3$ (100) having a resistivity 0.05 Ω·cm and an absorption coefficient 174, next an epitaxial PZT (52/48) thin film optical waveguide 1 of 1000 nm thick was grown thereon, and further a prism-type electrode 7 was formed thereon, thus fabricating a prism-type EO deflection device.

[Table 4-(1)]

The PLZT (9/65/35) buffer layer and the PZT (52/48) thin film optical waveguide were obtained by the solid phase epitaxy method using the sol-gel method, by stacking the PLZT (9/65/35) buffer layer, and thereafter stacking the PZT (52/48) thin film optical waveguide thereon. The crystallographical relation obtained a structure of a single orientational PZT (100)//PLZT (100)//Nb-SrTiO$_3$ (100), and an in-plane orientation PZT [001]//PLZT [001]//Nb-SrTiO$_3$ [001]. A prism-type upper electrode of which base was 100 μm and height was 1000 μm, made of the ITO thin film of 100 nm thick grown by the Rf spattering, was formed on the PZT thin film optical waveguide by the lift-off method, thus fabricating a prism-type EO deflection device. Further, ohmic contacts with the Nb-doped SrTiO$_3$ substrate were obtained by In.

First, in order to evaluate the characteristic of the optical waveguide, the laser beams of the wavelength 633 nm were guided by means of a prism coupling into the PZT thin film optical waveguide of the optical waveguide device according to this embodiment, and the intensity distribution of scattered light of the TE$_0$ mode in the light propagation direction was measured through an optical fiber. From the gradient of the relation between the logarithm of scattered light intensity and the distance of light propagation, the light propagation loss was sought, giving 5.2 dB/cm, which was a satisfactory value. From a measured value 1900 of the relative dielectric constant of the PLZT buffer layer directly grown on the Nb-doped SrTiO$_3$ substrate, and a measured value 900 of the relative dielectric constant of the PZT thin film optical waveguide directly grown on the same, the effective voltage across the PZT thin film optical waveguide was calculated by the equation [19], which gave 81% of the applied voltage. Further, the electo-optic coefficient and the refractive index were measured in the PZT thin film optical waveguide directly grown on the Nb-doped $SrTiO_3$ substrate. The result confirmed r=50 pm/V, and n=2.56.

In this embodiment, a laser beam source 9 generated laser beams 6 of the wavelength 633 nm, and a lens 10 collimated the laser beams 6 into parallel beams of 100 $\mu$m in width, and the collimated beams were guided through an incident prism 5 into the PZT thin film optical waveguide 1 of the prism-type EO deflection device. And in this state, a voltage was applied between the Nb-doped $SrTiO_3$ lower substrate electrode 2 and the Al prism-type upper electrode 7, and thereby the incident laser beams 6 were deflected. After being deflected, the deflected laser beams 6 went out from the end face as outgoing beams 1. The deflection angle was sought from a displacement of laser spots on the plane of projection, which confirmed a deflection angle of 1.08 degrees at the applied voltage of 5 V, namely, the effective voltage of 4.5 V. The deflection angle at the effective voltage of 4.5 V was reversely sought from r=50 pm/V and n=2.56 which were previously obtained, and d=1000 nm, W=100 $\mu$m, L=1000 $\mu$m being served as the design values, which found 1.08 being the same as the measured.

The measurement of the deflection speed gave 8.8 MHz in terms of the frequency response. From the measured value 1900 of the relative dielectric constant of the PLZT buffer layer grown on the Nb-doped $SrTiO_3$ substrate according to this embodiment and the measured value 900 of the relative dielectric constant of the PZT thin film optical waveguide, the combined capacitance was calculated by using the equation [16]; and further, considering the resistance 50 $\Omega$ of the measurement system as to the RC time constant, the frequency was calculated by using the equation [21'], which gave 9.0 MHz, being virtually equal to the measured. Further, the leakage current density was $1\times10^{-7}$ A/cm$^2$, and the voltage drop $\Delta V$ across the substrate calculated by the equation [22] was $3\times10^{-10}$ V, being a negligible level. Thus, this embodiment found to operate effectively.

Next, a first comparison example to this embodiment will be described. In this comparison example, in the same manner as the embodiment 4-(1), an epitaxial PlZT (9/65/35) buffer layer of 500 nm thick was grown on a lower electrode substrate of a single crystal conductive Nb-0.005% doped $SrTiO_3$ (100) having a resistivity $5\times10^4$ $\Omega$·cm and a thickness 500 $\mu$m, next an epitaxial PZT (52/48) thin film optical waveguide of 1000 nm thick was grown thereon, and further a prism-type electrode same as the one in the embodiment 4-(1) was formed thereon, thus fabricating a prism-type EO deflection device.

The light propagation loss was sought in the same manner as the embodiment 4-(1), and the light propagation loss of the PZT thin film optical waveguide of this comparison example was 5.1 dB/cm, showing a level applicable to a practical use. And, in the same manner as the embodiment 4-(1), the collimated laser beams of the wavelength 633 nm were guided through the prism into the PZT thin film optical waveguide of the prism-type EO deflection device of this comparison example; and in this state, a voltage was applied between the Nb-doped $SrTiO_3$ lower substrate electrode and the ITO prism-type upper electrode, and thereby the incident laser beams were deflected. The deflection angle was sought from a displacement of spots on the plane of projection by the laser beams emitted from the end face, which confirmed a deflection angle of 0.97 degrees at the applied voltage of 5 V.

On the other hand, the measurement of the deflection speed gave 100 Hz in terms of the frequency response, which was a very low value. From the measured value 1900 of the relative dielectric constant of the PLZT buffer layer grown on the Nb-doped $SrTiO_3$ substrate according to this embodiment and the measured value 900 of the relative dielectric constant of the PZT thin film optical waveguide, the combined capacitance was calculated; and further, considering the resistance 50 $\Omega$ of the measurement system as to the RC time constant, the frequency was calculated to be 99 Hz, which was virtually the same as the measured. Further, the voltage drop $\Delta v$ across the substrate calculated from the leakage current density $4\times10^{-7}$ A/cm$^2$ was $1\times10^{-3}$ V, which was a considerably high value as compared to the embodiment 4-(1).

Next, the optical waveguide device according to the embodiment 4-(2) of this invention will be described. In this embodiment, as shown in Table 4-(2), an epitaxial $SrTiO_3$ buffer layer of 300 nm thick was grown on a lower electrode substrate of a single crystal conductive Nb-0.5% doped $SrTiO_3$ (100) having a resistivity 0.05 $\Omega$·cm and an absorption coefficient 174, next an epitaxial PZT (52/48) thin film optical waveguide of 900 nm thick was grown thereon, and further a prism-type electrode same as the one in the embodiment 4-(1) was formed thereon, thus fabricating a prism-type EO deflection device.

[Table 4-(2)]

The $SrTiO_3$ buffer layer 4 was grown by means of the Rf spattering. After the $SrTiO_3$ buffer layer of 300 nm thick was grown, the epitaxial PZT thin film of 900 nm thick in total was obtained by the solid phase epitaxy method using the sol-gel method, in the same manner as the embodiment 4-(1). The crystallographical relation obtained a structure of a single orientational PZT (100)//$SrTiO_3$ (100)//Nb-$SrTiO_3$ (100), and an in-plane orientation PZT [001]//$SrTiO_3$ [001]//Nb-$SrTiO_3$ [0011]. On the PZT thin film optical waveguide was formed a prism-type upper electrode of the ITO thin film of 100 nm thick.

The laser beams of the wavelength 633 nm were guided by means of the prism coupling into the PZT thin film optical waveguide according to this embodiment, and the propagation loss of the $TE_0$ mode was measured to show 3.6 dB/cm, which was a satisfactory value. On the other hand, in the state that only the $SrTiO_3$ buffer layer according to this embodiment was grown on the Nb-doped $SrTiO_3$ substrate, the relative dielectric constant of the $SrTiO_3$ buffer layer of 300 nm thick was measured to exhibit 300. On the other hand, the relative dielectric constant of the PZT thin film optical waveguide directly grown on the Nb-doped $SrTiO_3$ substrate was measured to exhibit 900. Accordingly, the effective voltage across the PZT thin film optical waveguide was estimated as 50% of the applied voltage.

In the same manner as the embodiment 4-(1), the laser beams of the wavelength 633 nm were guided through a prism into the PZT thin film optical waveguide of the prism-type EO deflection device according to this embodiment. And in this state, a voltage was applied between the Nb-doped $SrTiO_3$ lower substrate electrode and the ITO prism-type upper electrode, and thereby the incident laser beams were deflected. The deflected laser beams went out from the end face, and the deflection angle was sought from a displacement of laser spots on the plane of projection, which confirmed a deflection angle of 2.58 degrees at the applied voltage of 20 V, namely, the effective voltage of 10 V. The deflection angle at the effective voltage of 10 V was reversely sought from r=50 pm/V and n=2.56 which were previously obtained, and d=900 nm, W=100 $\mu$m, L=1000 $\mu$m being served as the design values, which found 2.67 degrees being almost the same as the measured.

The measurement of the deflection speed found 12.0 MHz in terms of the frequency response. From the measured value 300 of the relative dielectric constant of the SrTiO$_3$ buffer layer grown on the Nb-doped SrTiO$_3$ substrate according to this embodiment and the measured value 900 of the relative dielectric constant of the PZT thin film optical waveguide, the combined capacitance was calculated; and further, considering the resistance 50 Ω of the measurement system as to the RC time constant, the frequency was calculated to be 13.1 MHz, which was virtually coincident with the measured. Further, from the leakage current density $2\times10^{-7}$ A/cm$^2$, the voltage drop ΔV across the substrate was calculated to be $5\times10^{-10}$ V, which showed a negligible level.

Next, a second comparison example to this embodiment Will be described. In this comparison example, in the same manner as the embodiment 4-(2), an epitaxial SrTiO$_3$ buffer layer of 12 nm thick was grown on a lower electrode substrate of a single crystal conductive Nb-0.5% doped SrTiO$_3$ (100) having a resistivity 0.05 Ω·cm and a an absorption coefficient 174, and next an epitaxial PZT (52/48) thin film optical waveguide of 900 nm thick was grown thereon.

The SrTiO$_3$ buffer layer 4 was grown by means of the Rf spattering. After the SrTiO$_3$ buffer layer of 12 nm thick was grown, the epitaxial PZT optical waveguide layer obtained the epitaxial PZT thin film of 900 nm thick in total by the solid phase epitaxy method using the sol-gel method, in the same manner as the embodiment 4-(1). The crystallographical relation obtained a structure of a single orientational PZT (100)//SrTiO$_3$ (100)//Nb-SrTiO$_3$ (100), and an in-plane orientation PZT [001]//SrTiO$_3$ [001]//Nb-SrTiO$_3$ [001].

The laser beams of the wavelength 633 nm were guided by means of the prism coupling into the PZT thin film optical waveguide of this comparison example, and the propagation loss of the TE$_0$ mode was measured to show 42 dB/cm, which did not find almost any effect of the buffer layer being inserted. As expected from the simulation, in the range where the thickness ratio of the buffer layer against the optical waveguide layer is less than 0.05, it is found that the insertion of the buffer layer does not effect a propagation loss applicable to a practical use.

Next, a third comparison example to this embodiment will be described. In this comparison example, in the same manner as the embodiment 4-(2), an epitaxial PZT (52/48) thin film optical waveguide of 900 nm thick was grown directly on a lower electrode substrate of a single crystal conductive Nb-0.5% doped SrTiO$_3$ (100) having a resistivity 0.05 Ω·cm and a an absorption coefficient 174.

The PZT (52/48) optical waveguide layer obtained the epitaxial PZT thin film of 900 nm thick in total by the solid phase epitaxy method using the sol-gel method, in the same manner as the embodiment 4-(1). The crystallographical relation obtained a structure of a single orientational PZT (100)//Nb-SrTiO$_3$ (100), and an in-plane orientation PZT [001]//Nb-SrTiO$_3$ [001].

The laser beams of the wavelength 633 nm were guided by means of the prism coupling into the PZT thin film optical waveguide of this comparison example, and the propagation loss of the TE$_0$ mode was measured; however, the attenuation by the absorption of the Nb-doped SrTiO$_3$ substrate was enormous so that the propagation loss could not be obtained.

Next, a fourth comparison example to this embodiment will be described. In this comparison example, in the same manner as the embodiment 4-(2), an SiO$_2$ buffer layer of 300 nm thick having the refractive index 1.46 and relative dielectric constant 3.9 was grown on a lower electrode substrate of a single crystal conductive Nb-0.5% doped SrTiO$_3$ (100) having a resistivity 0.05 Ω·cm and an absorption coefficient 174. Next an epitaxial PZT (52/48) thin film optical waveguide of 900 nm thick was grown on the buffer layer.

The SiO$_2$ buffer layer was formed using the sol-gel method. After the SiO$_2$ buffer layer of 300 nm thick was grown, the PZT (52/48) thin film optical waveguide layer obtained the PZT thin film of 900 nm thick in total by using the sol-gel method, in the same manner as the embodiment 4-(2). Since the SiO$_2$ buffer layer is amorphous, the epitaxial relation with the conductive substrate and the optical waveguide could not be held, and the crystallographical relation was random.

The laser beams of the wavelength 633 nm were guided by means of the prism coupling into the PZT thin film optical waveguide of this comparison example, and the propagation loss was measured; however, the scattering was enormous so that the light propagation could not be seen at all. The effective voltage across the PZT thin film optical waveguide becomes only 1.3% of the applied voltage, from the film thickness 900 nm and relative dielectric constant 900 of the PZT (52/48) thin film optical waveguide, and the film thickness 300 nm and relative dielectric constant 3.9 of the SiO$_2$ buffer layer. Therefore, in the same manner as the embodiment 4-(1), it shows that the application of 100 V gives only 1.3 V of the effective voltage.

Next, the optical waveguide device according to the embodiment 4-(3) of this invention will be described. In this embodiment, as shown in Table 4-(3), an epitaxial SrTiO$_3$ buffer layer of 300 nm thick was grown on a lower electrode substrate of a single crystal conductive Nb-0.05% doped SrTiO$_3$ (100) having a resistivity 30 Ωcm, next an epitaxial PLZT (9/65/35) thin film optical waveguide of 900 nm thick was grown thereon, and further a prism-type electrode same as the one in the embodiment 4-(1) was formed thereon, thus fabricating a prism-type EO deflection device.

[Table 4-(3)]

The SrTiO$_3$ buffer layer was grown by means of the Rf spattering. After the SrTiO$_3$ buffer layer of 300 nm thick was grown, the epitaxial PZT thin film of 900 nm thick in total was obtained by the solid phase epitaxy method using the sol-gel method, in the same manner as the embodiment 4-(1). The crystallographical relation obtained a structure of a single orientational PLZT (100)//SrTiO$_3$ (100)//Nb-SrTiO$_3$ (100), and an in-plane orientation PLZT [001]//SrTiO$_3$ [001]//Nb-SrTiO$_3$ [001]. On the PLZT thin film optical waveguide was formed a prism-type upper electrode of the ITO thin film of 200 nm thick.

The laser beams of the wavelength 780 nm were guided by means of the prism coupling into the PLZT thin film optical waveguide according to this embodiment, and the propagation loss of the TE$_0$ mode was measured to show 2.9 dB/cm, which was a satisfactory value. And, from a measured value 300 of the relative dielectric constant of the SrTiO$_3$ buffer layer and a measured value 1900 of the relative dielectric constant of the PLZT thin film optical waveguide, the effective voltage across the PLZT thin film optical waveguide was calculated to be 32% of the applied voltage. Further, the electo-optic coefficient and the refractive index of the PLZT thin film optical waveguide were measured, which confirmed the second order coefficient R=$3\times10^{-16}$ m$^2$/V$^2$, and n=2.49.

In the same manner as the embodiment 4-(1), the laser beams of the wavelength 633 nm were guided through a prism into the PLZT thin film optical waveguide of the prism-type EO deflection device according to this embodiment. And in this state, a voltage was applied between the Nb-doped SrTiO$_3$ lower substrate electrode and the ITO prism-type upper electrode, and thereby the incident laser beams were deflected. The deflected laser beams went out from the end face, and the deflection angle was sought from a displacement of laser spots on the plane of projection, which confirmed a deflection angle of 4.20 degrees at the applied voltage of 5 V, namely, the effective voltage of 1.6 V. The deflection angle at the effective voltage of 1.6 V was reversely sought from R=3×10$^{-16}$ m$^2$/V$^2$ and n=2.49 which were previously obtained, and d=900 nm, W=100 $\mu$m, L=1000 $\mu$m being served as the design values, which found 4.19 degrees being almost the same as the measured.

The measurement of the deflection speed found 180 kHz in terms of the frequency response. From the measured value 300 of the relative dielectric constant of the SrTiO$_3$ buffer layer grown on the Nb-doped SrTiO$_3$ substrate according to this embodiment and the measured value 1900 of the relative dielectric constant of the PLZT thin film optical waveguide, the combined capacitance was calculated; and further, considering the resistance 50 $\Omega$ of the measurement system as to the RC time constant, the frequency was calculated to be 174 kHz, which was virtually coincident with the measured. Further, from the leakage current density 9×10$^{-8}$ A/cm$^2$, the voltage drop $\Delta$V across the substrate was calculated to be 1×10$^{-7}$ V, which showed a negligible level.

Next, the optical waveguide device according to the embodiment 4-(4) of this invention will be described. In this embodiment, as shown in Table 4-(4), an epitaxial PLZT (9/65/35) buffer layer of 500 nm thick was grown on a lower electrode substrate of a single crystal conductive La-1.0% doped SrTiO$_3$ (100) having a resistivity 0.002·$\Omega$cm, next an epitaxial PZT (52/48) thin film optical waveguide of 1000 nm thick was grown thereon, and further a prism-type electrode same as the one in the embodiment 4-(1) was formed thereon, thus fabricating a prism-type EO deflection device.
[Table 4-(4)]

The PLZT (9/65/35) buffer layer and the PZT (52/48) thin film optical waveguide were obtained by the solid phase epitaxy method using the sol-gel method, in the same manner as the embodiment 4-(1), by stacking the PLZT (9/65/35) buffer layer, and thereafter stacking the PZT (52/48) thin film optical waveguide thereon. The crystallographical relation obtained a structure of a single orientational PZT (100)//PLZT (100)//Nb-SrTiO$_3$ (100), and an in-plane orientation PZT [001]//PLZT [001]//Nb-SrTiO$_3$ [001]. On the PZT thin film optical waveguide was formed a prism-type upper electrode of which base was 100 $\mu$m and height was 1000 $\mu$m, made of Al-12% doped ZnO thin film of 200 nm thick.

The laser beams of the wavelength 633 nm were guided by means of a prism coupling into the PZT thin film optical waveguide according to this embodiment, and the propagation loss of the TE$_0$ mode was measured to show 5.5 dB/cm, which was a satisfactory value. From a measured value 1900 of the relative dielectric constant of the PLZT buffer layer, and a measured value 900 of the relative dielectric constant of the PZT thin film optical waveguide, the effective voltage across the PZT thin film optical waveguide was calculated to be 81% of the applied voltage.

In the same manner as the embodiment 4-(1), the laser beams of the wavelength 633 nm were guided through a prism into the PZT thin film optical waveguide of the prism-type EO deflection device according to this embodiment. And in this state, a voltage was applied between the Nb-doped SrTiO$_3$ lower substrate electrode and the Al-doped ZnO prism-type upper electrode, and thereby the incident laser beams were deflected. The deflected laser beams went out from the end face, and the deflection angle was sought from a displacement of laser spots on the plane of projection, which confirmed a deflection angle of 1.10 degrees at the applied voltage of 5 V, namely, the effective voltage of 4.5 V. The deflection angle at the effective voltage of 4.5 V was reversely sought from r=50 pm/V and n=2.56 which were previously obtained, and d=1000 nm, W=100 $\mu$m, L=1000 $\mu$m being served as the design values, which found 1.08 degrees being almost the same as the measured.

The measurement of the deflection speed found 7.7 MHz in terms of the frequency response. From the measured value 1900 of the relative dielectric constant of the PLZT buffer layer grown on the La-doped SrTiO$_3$ substrate according to this embodiment and the measured value 900 of the relative dielectric constant of the PZT thin film optical waveguide, the combined capacitance was calculated; and further, considering the resistance 50 $\Omega$ of the measurement system as to the RC time constant, the frequency was calculated to be 7.7 MHz, which was coincident with the measured. Further, from the leakage current density 3×10$^{-7}$ A/cm$^2$, the voltage drop $\Delta$V across the substrate was calculated to be 3×10$^{-11}$ V, which showed a negligible level.

Next, the optical waveguide device according to the embodiment 4-(5) of this invention will be described. In this embodiment, as shown in Table 4-(5), an epitaxial PZT (85/15) buffer layer of 500 nm thick was grown on a lower electrode substrate of a single crystal conductive La-0.1% doped SrTiO$_3$ (100), next an epitaxial PZT (52/48) thin film optical waveguide of 1000 nm thick was grown thereon, and further the channels were formed by patterning the thin film optical waveguide and the electrodes were disposed by patterning the same, thereby fabricating a Mach-Zehender interference switch.
[Table 4-(5)]

The PLZT (85/15) buffer layer and the PZT (52/48) thin film optical waveguide were obtained by the solid phase epitaxy method using the sol-gel method, in the same manner as the embodiment 4-(1), by stacking the PZT (85/15) buffer layer, and thereafter stacking the PZT (52/48) thin film optical waveguide thereon. The crystallographical relation obtained a structure of a single orientational PZT (100)//PZT (100)//Nb-SrTiO$_3$ (100), and an in-plane orientation PZT [001]//PZT [001]//Nb-SrTiO$_3$ [001]; thereby obtaining an optical waveguide structure having a satisfactory characteristic in termes of the low propagation loss as well as the low drive voltage, and the high speed switching.

Next, the optical waveguide device according to the embodiment 4-(6) of this invention will be described. In this embodiment, in the same manner as the embodiment 4-(5), as shown in Table 4-(5), an epitaxial PZT (85/15) buffer layer of 500 nm thick was grown on a lower electrode substrate of a single crystal conductive La-0.1% doped SrTiO$_3$ (100), next an epitaxial PZT (52/48) thin film optical waveguide of 1000 nm thick was grown thereon, and further the channels were formed by patterning the thin film optical waveguide and the electrodes were disposed by patterning the same, thereby fabricating a directional coupling switch. Thus, an optical waveguide structure can be obtained which has a satisfactory characteristic in terms of the low propagation loss as well as the low drive voltage, and the high speed switching.

Further, Table 4-(6) through Table 4-(11) illustrate the other embodiments each having a structure that a buffer layer is disposed on a SrTiO$_3$ single crystal substrate transformed into being conductive or semiconductive by doping an impurity element in the same manner as the embodiment 4-(1) through the embodiment4-(6), and a thin film optical waveguide is provided thereon. However, such a structure is not limited to these.

[Table 4-(6)]
[Table 4-(7)]
[Table 4-(8)]
[Table 4-(9)]
[Table 4-(10)]
[Table 4-(11)]

Next, the optical waveguide device according to the embodiment 4-(7) of this invention will be described. In this embodiment, as shown in Table 4-(12), an epitaxial Nb-0.5% doped SrTiO$_3$ (100) conductive layer of 200 nm thick was grown on a MgO single crystal substrate, next a SrTiO$_3$ buffer layer of 300 nm thick was grown thereon, next an epitaxial PZT (52/48) thin film optical waveguide of 1000 nm thick was grown thereon, and further the channels were formed by patterning the thin film optical waveguide and the electrodes were disposed by patterning the same, thereby fabricating a total reflection-type switch.

[Table 4-(12)]

The conductive layer, buffer layer, and optical waveguide layer each can be grown by the eximer laser deposition method that instantaneously heats a target surface by the UV laser pulse to deposit. The crystallographical relation obtained a structure of a single orientational PZT (100)// SrTiO$_3$ (100)//Nb-SrTiO$_3$ (100)//MgO (100); thereby obtaining an optical waveguide structure having a satisfactory characteristic in terms of the low propagation loss as well as the low drive voltage, and the high speed switching.

Further, Table 4-(13) illustrates the other embodiment having, in the same manner as this embodiment, a structure that an SrTiO$_3$ conductive layer and a buffer layer transformed into being conductive or semiconductive by doping an impurity element are disposed on a substrate, and a thin film optical waveguide is provided thereon. However, such a structure is not limited to these.

[Table 4-(13)]

Further, in the foregoing embodiments, the prism-type EO deflection device, Mach-Zehender interference switch, directional coupling switch, and total reflection-type switch were dealt with. However, naturally the invention is equally applicable to all the optical waveguide devices employing the EO effect, such as Bragg reflection-type switch, digital-type switch, phase modulation device, mode transformation device, wavelength filter device, etc. The application of this invention to these thin film optical waveguide devices will provide a structure that satisfies the low drive voltage characteristic and the low propagation loss characteristic at the same time.

Embodiment 5-(1)

The optical waveguide device according to the embodiment 5-(1) will be described with reference to FIG. 17 and FIG. 18. FIG. 17 is a top view of the optical waveguide device according to this embodiment, and FIG. 18 is a side view thereof. In this embodiment, as shown in Table 5-(1), an epitaxial PLZT (9/65/35) buffer layer 4 of 500 nm thick was grown on a lower electrode substrate 2 of a single crystal conductive Nb-0.5% doped SrTiO$_3$ (100) having a resistivity 0.05 Ω·cm and an absorption coefficient 174, next an epitaxial PZT (52/48) thin film optical waveguide 1 of 1000 nm thick was grown thereon, next an epitaxial PlZT (9/65/35) cladding layer 3 of 500 nm thick was grown thereon, and finally a Pt prism-type electrode 7 was formed thereon, thus fabricating a prism-type EO deflection device.

[Table 5-(1)]

The PLZT (9/65/35) buffer layer, the PZT (52/48) thin film optical waveguide, and PLZT (9/65/35) cladding layer were obtained by the solid phase epitaxy method using the sol-gel method, by stacking the PLZT (9/65/35) buffer layer, and thereafter stacking the PZT (52/48) thin film optical waveguide and PLZT (9/65/35) cladding layer. The crystallographical relation obtained a structure of a single orientational PLZT (100)//PZT (100)//PLZT (100)//Nb-SrTiO$_3$ (100), and an in-plane orientation PLZT [001]//PZT [001]// PLZT [001]//Nb-SrTiO$_3$ [001]. A prism-type upper electrode of which base was 100 µm and height was 1000 µm, made of the Pt thin film of 100 nm thick grown by the Rf spattering, was formed on the PLZT cladding layer by the lift-off method, thus fabricating a prism-type EO deflection device. Further, ohmic contacts with the Nb-doped SrTiO$_3$ substrate were obtained by In.

In this embodiment, a laser beam source 9 generated laser beams 6 of the wavelength 633 nm, and a lens 10 collimated the laser beams 6 into parallel beams of 100 µm in width. The collimated laser beams were guided through an incident prism 5 into the PZT thin film optical waveguide of the prism-type EO deflection device. And, in this state, a voltage was applied between the Nb-doped SrTiO$_3$ lower substrate electrode 2 and the Pt prism-type upper electrode 7, and thereby the incident laser beams 6 were deflected. The deflected laser beams 6 went out from the end face as outgoing beams 8. The deflection angle was sought from a displacement of laser spots on the plane of projection, which confirmed a deflection angle of 0.83 degrees at the applied voltage of 5 V, namely, the effective voltage of 3.4 V. The deflection angle at the effective voltage of 3.4 V was reversely sought from r=50 pm/V and n=2.56 which were previously obtained, and d=1000 nm, W=100 µm, L=1000 µm being served as the design values, which found 0.82 degrees being virtually the same as the measured.

The measurement of the deflection speed gave 10.1 MHz in terms of the frequency response. From the measured value 1900 of the relative dielectric constant of the PLZT buffer layer grown on the Nb-doped SrTiO$_3$ substrate according to this embodiment and the measured value 900 of the relative dielectric constant of the PZT thin film optical waveguide, and the measured value 1900 of the relative dielectric constant of the PLZT cladding layer, the combined capacitance was calculated by using the equation [16]; and further, considering the resistance 50 Ω of the measurement system as to the RC time constant, the frequency was calculated by using the equation [21], which gave 10.7 MHz, being virtually equal to the measured. Further, the leakage current density was 8×10$^{-8}$ A/cm$^2$, and the voltage drop ΔV across the substrate calculated by the equation [22] was 2×10$^{-10}$ V, being a negligible level.

Next, a first comparison example to this embodiment will be described. In this comparison example, in the same manner as the embodiment 5-(1), an epitaxial PlZT (9/65/ 35) buffer layer of 500 nm thick was grown on a lower electrode substrate of a single crystal conductive Nb-0.005% doped SrTiO$_3$ (100) having a resistivity 5×10$^4$ Ω·cm and a thickness 500 µm, next an epitaxial PZT (52/48) thin film optical waveguide of 1000 nm thick was grown thereon, further an epitaxial PlZT (9/65/35) cladding layer of 500 nm thick was grown, and finally a prism-type electrode same as the one in the embodiment 5-(1) was formed thereon, thus fabricating a prism-type EO deflection device.

The light propagation loss was sought in the same manner as the embodiment 5-(1), and the light propagation loss of the PZT thin film optical waveguide of this comparison example was 3.5 dB/cm, showing a level applicable to a practical use. And, in the same manner as the embodiment 5-(1), the collimated laser beams of the wavelength 633 nm were guided through the prism into the PZT thin film optical waveguide of the prism-type EO deflection device of this comparison example; and in that state, a voltage was applied between the Nb-doped $SrTiO_3$ lower substrate electrode and the Pt prism-type upper electrode, and thereby the incident laser beams 6 were deflected. The deflection angle was sought from a displacement of spots on the plane of projection by the laser beams emitted from the end face, which confirmed a deflection angle of 0.77 degrees at the applied voltage of 5 V.

On the other hand, the measurement of the deflection speed gave 122 Hz in terms of the frequency response, which was a very low value. From the measured value 1900 of the relative dielectric constant of the PLZT buffer layer grown on the Nb-doped $SrTiO_3$ substrate according to this comparison example, the measured value 900 of the relative dielectric constant of the PZT thin film optical waveguide, and the measured value 1900 of the relative dielectric constant of the PLZT cladding layer, the combined capacitance was calculated; and further, considering the resistance 50 Ω of the measurement system as to the RC time constant, the frequency was calculated to be 118 Hz, which was virtually the same as the measured. Further, the voltage drop ΔV across the substrate calculated from the leakage current density $7×10^{-8}$ A/cm$^2$ was $2×10^{-4}$ V, which was a considerably high value as compared to the embodiment 5-(1)

Embodiment 5-(2)

Next, the optical waveguide device according to the embodiment 5-(2) of this invention will be described. In this embodiment, as shown in Table 5-(2), an epitaxial $SrTiO_3$ buffer layer of 300 nm thick was grown on a lower electrode substrate of a single crystal conductive Nb-0.5% doped $SrTiO_3$ (100) having a resistivity 0.05 Ω·cm and an absorption coefficient 174, next an epitaxial PZT (52/48) thin film optical waveguide of 900 nm thick was grown thereon, next an $SrTiO_3$ cladding layer of 300 nm thick was grown thereon, and further a Al prism-type electrode was formed thereon, thus fabricating a prism-type EO deflection device.
[Table 5-(2)]

The $SrTiO_3$ buffer layer and cladding layer were grown by means of the Rf spattering. After the $SrTiO_3$ buffer layer of 300 nm thick was grown, the epitaxial PZT thin film of 900 nm thick in total was obtained by the solid phase epitaxy method using the sol-gel method, in the same manner as the embodiment 5-(1). The crystallographical relation obtained a structure of a single orientational PZT (100)//$SrTiO_3$ (100)//Nb-$SrTiO_3$ (100), and an in-plane orientation PZT [001]//$SrTiO_3$ [001]//Nb-$SrTiO_3$ [001]. On the $SrTiO_3$ cladding layer was formed a prism-type upper electrode of which base was 100 μm and height was 1000 μm, made of Al thin film of 100 nm formed by the spattering method; thus fabricating a prism-type EO deflection device.

The laser beams of the wavelength 633 nm were guided by means of the prism coupling into the PZT thin film optical waveguide according to this embodiment, and the propagation loss of the $TE_0$ mode was measured to show 4.0 dB/cm, which was a satisfactory value. On the other hand, in the state that only the $SrTiO_3$ buffer layer according to this embodiment was grown on the Nb-doped $SrTiO_3$ substrate, the relative dielectric constant of the $SrTiO_3$ buffer layer of 300 nm thick was measured, which gave 250 slightly lower than 300 as estimated. Further, in the state that only the $SrTiO_3$ cladding layer was grown directly on the Nb-doped $SrTiO_3$ substrate, the relative dielectric constant of the $SrTiO_3$ cladding layer of 300 nm thick was measured, which gave 250 as well. On the other hand, the relative dielectric constant of the PZT thin film optical waveguide grown directly on the Nb-doped $SrTiO_3$ substrate was measured to exhibit 900. Accordingly, the effective voltage across the PZT thin film optical waveguide was estimated as 33% of the applied voltage.

In the same manner as the embodiment 5-(1), the laser beams of the wavelength 633 nm were guided through a prism into the PZT thin film optical waveguide of the prism-type EO deflection device according to this embodiment. And in this state, a voltage was applied between the Nb-doped $SrTiO_3$ lower substrate electrode and the Al prism-type upper electrode, and thereby the incident laser beams were deflected. The deflected laser beams went out from the end face, and the deflection angle was sought from a displacement of laser spots on the plane of projection, which confirmed a deflection angle of 4.40 degrees at the applied voltage of 50 V, namely, the effective voltage of 16.5 V. The deflection angle at the effective voltage of 16.5 V was reversely sought from r=50 pm/V and n=2.56 which were previously obtained, and d=900 nm, W=100 μm, L=1000 μm being served as the design values, which found 4.40 degrees being the same as the measured.

The measurement of the deflection speed found 21.0 MHz in terms of the frequency response. From the measured value 250 of the relative dielectric constant of the $SrTiO_3$ buffer layer grown on the Nb-doped $SrTiO_3$ substrate according to this embodiment, the measured value 900 of the relative dielectric constant of the PZT thin film optical waveguide, and the measured value 250 of the relative dielectric constant of the $SrTiO_3$ cladding layer, the combined capacitance was calculated; and further, considering the resistance 50 Ω of the measurement system as to the RC time constant, the frequency was calculated to be 22.2 MHz, which was virtually coincident with the measured. Further, from the leakage current density $1×10^{-7}$ A/cm$^2$, the voltage drop ΔV across the substrate was calculated to be $2×10^{-10}$ V, which showed a negligible level.

Next, a second comparison example to this embodiment will be described. In this comparison example, in the same manner as the embodiment 5-(2), an epitaxial $SrTiO_3$ buffer layer of 12 nm thick was grown on a lower electrode substrate of a single crystal conductive Nb-0.5% doped $SrTiO_3$ (100) having a resistivity 0.05 Ω·cm and an absorption coefficient 174, next an epitaxial PZT (52/48) thin film optical waveguide of 900 nm thick was grown thereon, next an $SrTiO_3$ buffer layer of 12 nm thick was grown thereon, and further an Al prism-type electrode same as the one in the embodiment 5-(2) was formed thereon, thus fabricating a prism-type EO deflection device.

The $SrTiO_3$ buffer layer and cladding layer were grown by means of the Rf spattering. After the $SrTiO_3$ buffer layer of 12 nm thick was grown, the epitaxial PZT optical waveguide layer obtained the epitaxial PZT thin film of 900 nm thick in total by the solid phase epitaxy method using the sol-gel method, in the same manner as the embodiment 5-(1). The crystallographical relation obtained a structure of a single orientational PZT (100)//$SrTiO_3$ (100)//Nb-$SrTiO_3$ (100), and an in-plane orientation PZT [001]//$SrTiO_3$ [001]//Nb-$SrTiO_3$ [001]. Thereafter further, the $SrTiO_3$ buffer layer of 12 nm thick was grown by the Rf spattering.

The laser beams of the wavelength 633 nm were guided by means of the prism coupling into the PZT thin film optical waveguide of this comparison example, and the propagation loss of the $TE_0$ mode was measured to show 42 dB/cm, which did not find almost any effect of the buffer layer being inserted. As expected from the simulation, in the range where the thickness ratio of the buffer layer against the optical waveguide layer is less than 0.05, it is found that the insertion of the buffer layer does not effect a propagation loss applicable to a practical use.

Further, a prism-type upper electrode was formed on the $SrTiO_3$ cladding layer by the lift-off method, of which base was 100 μm and height was 1000 μm, which was made of the Al thin film of 100 nm thick formed by the Rf spattering method. And, the laser beams of the wavelength 633 nm were guided into the PZT thin film optical waveguide of this comparison example by means of the prism coupling, and the propagation loss of the $TE_0$ mode was measured. However, there was a great loss by the Al electrode in addition to the loss by the Nb-doped $SrTiO_3$ substrate, and the propagation loss could not be measured.

Next, a third comparison example to this embodiment will be described. In this comparison example, in the same manner as the embodiment 5-(1), an epitaxial PZT (52/48) thin film optical waveguide of 900 nm thick was grown on a lower electrode substrate of a transparent single crystal conductive Nb-0.005% doped $SrTiO_3$ (100) having a resistivity $5 \times 10^4$ Ω·cm, next an $SiO_2$ cladding layer of 300 nm thick having the refractive index 1.46 and relative dielectric constant 3.9 was grown thereon, and further an Al prism-type upper electrode same as the one in the embodiment 5-(2) was formed thereon, thus fabricating a prism-type EO deflection device.

The PZT (52/48) optical waveguide layer obtained, in the same manner as the embodiment 5-(1), the epitaxial PZT thin film of 900 nm thick in total fabricated by the solid phase epitaxy method using the sol-gel method. Thereafter, the $SiO_2$ cladding layer was formed by means of the sol-gel method. The laser beams of the wavelength 633 nm were guided by means of the prism coupling into the PZT thin film optical waveguide of this comparison example, and the propagation loss of the $TE_0$ mode was measured. In this case, the influence of absorption by the Al upper electrode was reduced, and the propagation loss became 3.9 dB/cm, which was a satisfactory value. However, the effective voltage across the PZT thin film optical waveguide was reduced extremely to 1.3% of the applied voltage, from the film thickness 900 nm and relative dielectric constant 900 of the PZT (52/48) thin film optical waveguide, and the film thickness 300 nm and relative dielectric constant 3.9 of the $SiO_2$ buffer layer. It shows that only 1.3 V is applied as the effective voltage when the applied voltage is 100 V.

Embodiment 5-(3)

Next, the optical waveguide device according to the embodiment 5-(3) of this invention will be described. In this embodiment, in virtually the same manner as the embodiment 5-(1), as shown in Table 5, an epitaxial $SrTiO_3$ buffer layer of 300 nm thick was grown on a lower electrode substrate of a single crystal conductive Nb-0.05% doped $SrTiO_3$ (100) having a resistivity 30 Ω·cm, next an epitaxial PLZT (9/65/35) thin film optical waveguide of 900 nm thick was grown on the buffer layer, next an epitaxial $SrTiO_3$ cladding layer of 300 nm thick was grown thereon, and further a Pt prism-type upper electrode same as the one in the embodiment 5-(1) was formed thereon, thus fabricating a prism-type EO deflection device.

[Table 5-(3)]

The $SrTiO_3$ buffer layer and cladding layer were grown by means of the Rf spattering. After the $SrTiO_3$ buffer layer of 300 nm thick was grown, the epitaxial PLZT thin film of 900 nm thick in total was obtained by the solid phase epitaxy method using the sol-gel method, in the same manner as the embodiment 5-(1). The crystallographical relation obtained a structure of a single orientational PLZT (100)//$SrTiO_3$ (100)//Nb-$SrTiO_3$ (100), and an in-plane orientation PLZT [001]//$SrTiO_3$ [001]//Nb-$SrTiO_3$ [001]. Thereafter, further an $SrTiO_3$ buffer layer of 300 nm thick was grown, and on the $SrTiO_3$ buffer layer was formed a prism-type upper electrode of a Pt thin film.

The laser beams of the wavelength 780 nm were guided by means of the prism coupling into the PLZT thin film optical waveguide according to this embodiment, and the propagation loss of the $TE_0$ mode was measured to show 2.5 dB/cm, which was a satisfactory value. The measured values of relative dielectric constants of the $SrTiO_3$ buffer layer and cladding layer became 300 by varying the condition of the Rf spattering; and from the measured value 300 and a measured value 1900 of the relative dielectric constant of the PLZT thin film optical waveguide, the effective voltage across the PLZT thin film optical waveguide was calculated to be 20% of the applied voltage. Further, the electo-optic coefficient and the refractive index of the PLZT thin film optical waveguide were measured, which confirmed the second order coefficient $R=3\times10^{-16}$ $m^2/V^2$, and $n=2.49$.

In the same manner as the embodiment 5-(1), the laser beams of the wavelength 633 nm were guided through a prism into the PLZT thin film optical waveguide of the prism-type EO deflection device according to this embodiment. And in this state, a voltage was applied between the Nb-doped $SrTiO_3$ lower substrate electrode and the Pt prism-type upper electrode, and thereby the incident laser beams were deflected. The deflected laser beams went out from the end face, and the deflection angle was sought from a displacement of laser spots on the plane of projection, which confirmed a deflection angle of 1.70 degrees at the applied voltage of 5 V, namely, the effective voltage of 1.0 V. The deflection angle at the effective voltage of 1.0 V was reversely sought from $R=3\times10^{-16}$ $m^2/V^2$ and $n=2.49$ which were previously obtained, and $d=900$ nm, $W=100$ μm, $L=1000$ μm being served as the design values, which found 1.64 degrees being almost the same as the measured.

The measurement of the deflection speed found 300 kHz in terms of the frequency response. From the measured value 300 of the relative dielectric constant of the $SrTiO_3$ buffer layer grown on the Nb-doped $SrTiO_3$ substrate according to this embodiment and the measured value 1900 of the relative dielectric constant of the PLZT thin film optical waveguide, the combined capacitance was calculated; and further, considering the resistance 50 Ω of the measurement system as to the RC time constant, the frequency was calculated to be 292 kHz, which was virtually coincident with the measured. Further, from the leakage current density $7\times10^{-8}$ $A/cm^2$, the voltage drop ΔV across the substrate was calculated to be $1\times10^{-7}$ V, which showed a negligible level.

Embodiment 5-(4)

Next, the optical waveguide device according to the embodiment 5-(4) of this invention will be described. In this embodiment, in virtually the same manner as the embodiment 5-(1), as shown in Table 5-(4), an epitaxial PLZT (9/65/35) buffer layer of 500 nm thick was grown on a lower electrode substrate of a single crystal conductive La-1.0% doped $SrTiO_3$ (100) having a resistivity 0.002·Ωcm, next an epitaxial PZT (52/48) thin film optical waveguide of 1000 nm thick was grown thereon, next an epitaxial PZT (85/15) cladding layer of 500 nm thick was grown thereon, and further a prism-type ITO electrode was formed thereon, thus fabricating a prism-type EO deflection device.

[Table 5-(4)]

The PLZT (9/65/35) buffer layer, the PZT (52/48) thin film optical waveguide, and the PZT (85/15) cladding layer were obtained by the solid phase epitaxy method using the sol-gel method, in the same manner as the embodiment 5-(1), by stacking the PLZT (9/65/35) buffer layer, and thereafter stacking the PZT (52/48) thin film optical waveguide and further stacking the PZT (85/15) cladding layer. The crystallographical relation obtained a structure of a single orientational PZT (100)//PZT (100)//PLZT (100)//Nb-SrTiO$_3$ (100), and an in-plane orientation PZT [001]//PZT [001]//PLZT [001]//Nb-SrTiO$_3$ [001]. On the PZT thin film optical waveguide was formed a prism-type upper electrode of which base was 100 μm and height was 1000 μm, made of the ITO thin film of 100 nm thick. The laser beams of the wavelength 633 nm were guided by means of a prism coupling into the PZT thin film optical waveguide according to this embodiment, and the propagation loss of the TE$_0$ mode was measured to show 5.0 dB/cm, which was a satisfactory value. Further, the deflection angle as well as the deflection speed showed satisfactory characteristics in the same manner as the foregoing embodiments.

Embodiment 5-(5)

Next, the optical waveguide device according to the embodiment 5-(5) of this invention will be described. In this embodiment, in the same manner as the embodiment 5-(4), as shown in Table 5-(4), an epitaxial PLZT (9/65/35) buffer layer of 500 nm thick was grown on a lower electrode substrate of a single crystal conductive La-1.0% doped SrTiO$_3$ (100) having a resistivity 0.002·Ωcm, next an epitaxial PZT (52/48) thin film optical waveguide of 1000 nm thick was grown thereon, next an epitaxial PZT (85/15) cladding layer of 500 nm thick was grown thereon, and thereafter the channels were formed by patterning the thin film optical waveguide and the electrodes were disposed by patterning the same, thereby fabricating a Mach-Zehender interference switch. Thus, it is possible to obtain an optical waveguide structure having a satisfactory characteristic in terms of the low propagation loss as well as the low drive voltage, and the high speed switching.

Embodiment 5-(6)

Next, the optical waveguide device according to the embodiment 5-(6) of this invention will be described. In this embodiment, in the same manner as the embodiment 5-(4), as shown in Table 5-(4), an epitaxial PLZT (9/65/35) buffer layer of 500 nm thick was grown on a lower electrode substrate of a single crystal conductive La-1.0% doped SrTiO$_3$ (100) having a resistivity 0.002·Ωcm, next an epitaxial PZT (52/48) thin film optical waveguide of 1000 nm thick was grown thereon, next an epitaxial PZT (85/15) cladding layer of 500 nm thick was grown thereon, and thereafter the channels were formed by patterning the thin film optical waveguide and the electrodes were disposed by patterning the same, thereby fabricating a directional coupling switch. Thus, it is possible to obtain an optical waveguide structure having a satisfactory characteristic in terms of the low propagation loss as well as the low drive voltage, and the high speed switching.

Further, Table 5-(5) through Table 5-(10) illustrate the other embodiments each having a structure that a buffer layer is disposed on a SrTiO$_3$ single crystal substrate transformed into being conductive or semiconductive by doping an impurity element, in the same manner as the embodiment 5-(1) through the embodiment 5-(6), and a thin film optical waveguide is provided thereon, and further a cladding layer was provided thereon. However, such a structure is not limited to these.

[Table 5-(5)]
[Table 5-(6)]
[Table 5-(7)]
[Table 5-(8)]
[Table 5-(9)]
[Table 5-(10)]

Embodiment 5-(7)

Next, the optical waveguide device according to the embodiment 5-(7) of this invention will be described. In this embodiment, as shown in Table 5-(11), an epitaxial Nb-0.5% doped SrTiO$_3$ (100) conductive layer of 200 nm thick was grown on a MgO single crystal substrate, next an SrTiO$_3$ buffer layer of 300 nm thick was grown thereon, next an epitaxial PZT (52/48) thin film optical waveguide of 1000 nm thick was grown thereon, next a SrTiO$_3$ cladding layer of 300 nm thick was grown thereon, and further the channels were formed by patterning the thin film optical waveguide and the electrodes to the X-intersections were disposed by patterning the same, thereby fabricating a total reflection-type switch.

[Table 5-(11)]

The conductive layer, buffer layer, optical waveguide layer, and cladding layer each can be grown by the eximer laser deposition method that instantaneously heats a target surface by the UV laser pulse to deposit. The crystallographical relation obtained a structure of a single orientational SrTiO$_3$ (100)//PZT (100)//SrTiO$_3$ (100)//Nb-SrTiO$_3$ (100)//MgO (100); thereby obtaining an optical waveguide structure having a satisfactory characteristic in terms of the low propagation loss as well as the low drive voltage, and the high speed switching.

Table 5-(12) illustrates the other embodiment having, in the same manner as this embodiment, a structure that a SrTiO$_3$ conductive layer and a buffer layer transformed into being conductive or semiconductive by doping an impurity element are disposed on a substrate, and a thin film optical waveguide is provided thereon. However, such a structure is not limited to these.

[Table 5-(12)]

Further, in the foregoing embodiments, the prism-type EO deflection device, Mach-Zehender interference switch, directional coupling switch, and total reflection-type switch were dealt with. However, naturally the invention is equally applicable to all the optical waveguide devices employing the EO effect, such as Bragg reflection-type switch, digital-type switch, phase modulation device, mode transformation device, wavelength filter device, etc. The application of this invention to these thin film optical waveguide devices will provide a structure that satisfies the low drive voltage characteristic and the low propagation loss characteristic at the same time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Equation 1

$$\delta = I_s/I_0 = \int_d^{+\infty}|E_{y2}|^2 dx \div (\int_{-\infty}^{0}|E_{y3}|^2 dx + \int_0^d |E_{y1}|^2 dx + \int_d^{+\infty}|E_{y2}|^2 dx) \quad [14]$$

TABLE I

| | Material | Lattice constant | Refractive index | Relative dielectric constant | Film thickness (nm) |
|---|---|---|---|---|---|
| Optical waveguide | PZT (52/48) | 4.036 Å | 2.56 | 900 | 600 |
| Buffer layer | SrTiO$_3$ | 3.905 Å | 2.40 | 300 | d$_b$ |
| Substrate | Nb 0.5% - SrTiO$_3$ | 3.905 Å | 2.40 | 300 | — |

TABLE II

| Material | Lattice constant | Refractive index | Relative dielectric constant | Film thickness (nm) | |
|---|---|---|---|---|---|
| Upper electrode | Al | | | | |
| Cladding layer | SrTiO$_3$ | 3.905 Å | 2.40 | 300 | $d_c$ |
| Optical waveguide | PZT (52/48) | 4.036 Å | 2.56 | 900 | 600 |
| Substrate | Nb 0.005% - SrTiO$_3$ | 3.905 Å | 2.40 | 300 | |

TABLE 1-(1)

| Material | Lattice constant | Refractive index | Relative dielectric constant | Film thickness (nm) | |
|---|---|---|---|---|---|
| Optical waveguide | PZT (52/48) | 4.036 Å | 2.56 | 900 | 900 |
| Buffer layer | SrTiO$_3$ | 3.905 Å | 2.40 | 300 | 130 |
| Substrate | Nb 0.5% - SrTiO$_3$ | 3.905 Å | 2.40 | 300 | — |

TABLE 1-(2)

| | Material | Lattice constant | Refractive index | Relative dielectric constant |
|---|---|---|---|---|
| Optical waveguide | PLZT (9/65/35) | 4.08 Å | 2.49 | 1900 |
| Buffer layer | SrTiO$_3$ | 3.905 Å | 2.40 | 300 |
| Conductive substrate | Nb 0.5% - SrTiO$_3$ | 3.905 Å | 2.40 | 300 |

TABLE 1-(3)

| | Material | Lattice constant | Refractive index | Relative dielectric constant |
|---|---|---|---|---|
| Optical waveguide | PZT (52/48) | 4.036 Å | 2.56 | 900 |
| Buffer layer | PLZT (9/65/35) | 4.08 Å | 2.49 | 1900 |
| Conductive substrate | Nb 0.5% - SrTiO$_3$ | 3.905 Å | 2.40 | 300 |

TABLE 1-(4)

| | Material | Lattice constant | Refractive index | Relative dielectric constant |
|---|---|---|---|---|
| Optical waveguide | Sr$_{0.75}$Ba$_{0.25}$Nb$_2$O$_6$ | ~12.465 Å ~3.952 Å | no = 2.414 ne = 2.385 | ~3400 |
| Buffer layer | Sr$_{0.60}$Ba$_{0.40}$Nb$_2$O$_6$ | ~12.465 Å ~3.952 Å | no = 2.414 ne = 2.281 | ~3400 |
| Substrate | La 1.0% - SrTiO$_3$ | 3.905 Å | 2.40 | 300 |

TABLE 1-(5)

| | Material | Lattice constant | Refractive index | Relative dielectric constant |
|---|---|---|---|---|
| Optical waveguide | PZT (52/48) | 4.036 Å | 2.56 | 900 |
| Buffer layer | PZT (85/15) | 4.13 Å | 2.49 | 300 |
| Conductive substrate | Nb 0.5% - SrTiO$_3$ | 3.905 Å | 2.40 | 300 |

TABLE 1-(6)

| | Material | Lattice constant | Refractive index | Relative dielectric constant |
|---|---|---|---|---|
| Optical waveguide | BaTiO$_3$ | a = 3.994 Å c = 4.038 Å | no = 2.437 ne = 2.365 | $\epsilon_1 = \epsilon_2 = 3600$ $\epsilon_3 = 135$ |
| Buffer layer | MgO | 4.213 Å | 1.735 | 9.65 |
| Conductive substrate | Nb 0.5% - SrTiO$_3$ | 3.905 Å | 2.40 | 300 |

TABLE 1-(7)

| | Material | Lattice constant | Refractive index | Relative dielectric constant |
|---|---|---|---|---|
| Optical waveguide | Bi$_4$Ti$_3$O$_{12}$ | a = 5.449 Å b = 32.815 Å c = 5.410 Å | ~1.88 | ~110 |
| Buffer layer | MgO | 4.213 Å | 1.735 | 9.65 |
| Conductive Substrate | Nb 0.5% - SrTiO$_3$ | 3.905 Å | 2.40 | 300 |

TABLE 1-(8)

| | Material | Lattice constant | Refractive index | Relative dielectric constant |
|---|---|---|---|---|
| Optical waveguide | KNbO$_3$ | a = 5.595 Å b = 5.72 Å c = 3.974 Å | $n_1$ = 2.280 $n_2$ = 2.329 $n_3$ = 2.169 | 900~4200 |
| Buffer layer | MgO | 4.213 Å | 1.735 | 9.65 |
| Conductive substrate | Nb 0.5% - SrTiO$_3$ | 3.905 Å | 2.40 | 300 |

TABLE 1-(9)

| | Material | Lattice constant | Refractive index | Relative dielectric constant |
|---|---|---|---|---|
| Optical waveguide | LiNbO$_3$ | a = 5.149 Å c = 13.862 Å | no = 2.296 ne = 2.208 | a = 44 c = 28 |
| Buffer layer | LiTaO$_3$ | a = 5.153 Å c = 13.755 Å | no = 2.176 ne = 2.180 | a = 41 c = 43 |
| Conductive Substrate | Nb 0.5% - SrTiO$_3$ | 3.505 Å | 2.40 | 300 |

TABLE 1-(10)

| Material | | Lattice constant | Refractive index | Relative dielectric constant |
|---|---|---|---|---|
| Optical waveguide | $Sr_xBa_{1-x}Nb_2O_6$ | 12.465 Å 3.952 Å | no =2.414 ne =2.385 | 3400 |
| Buffer layer | MgO | 4.213 Å | 1.735 | 9.65 |
| Substrate | Nb 0.5% - $SrTiO_3$ | 3.905 Å | 2.40 | 300 |

TABLE 1-(11)

| Material | | Lattice constant | Refractive index | Relative dielectric constant |
|---|---|---|---|---|
| Optical waveguide | $BaTiO_3$ | a = 3.994 Å c = 4.038 Å | no = 2.437 ne = 2365 | $\epsilon_1 = \epsilon_2 = 3600$ $\epsilon_3 = 135$ |
| Buffer layer | MgO | 4.213 Å | 1.735 | 9.65 |
| Conductive substrate | GaAs | 5.6534 Å | 3.59 | 13.1 |

TABLE 1-(12)

| Material | | Lattice constant | Refractive index | Relative dielectric constant |
|---|---|---|---|---|
| Optical waveguide | PZT (52/48) | 4.036 Å | 2.56 | 900 |
| Buffer layer | $SrTiO_3$ | 3.905 Å | 2.40 | 300 |
| Conductive substrate | Si | 5.4301 Å | 3.448 | 11.9 |

TABLE 1-(3)

| Material | | Lattice constant | Refractive index | Relative dielectric constant |
|---|---|---|---|---|
| Optical waveguide | PZT (52/48) | 4.036 Å | 2.56 | 600 |
| Buffer layer | $SrTiO_3$ | 3.905 Å | 2.40 | 300 |
| Conductive layer | Pt | 3.9231 Å | | |
| Substrate | MgO | | | 9.65 |

TABLE 1-(14)

| Material | | Lattice constant | Refractive index | Relative dielectric constant |
|---|---|---|---|---|
| Optical waveguide | PLZT (52/42) | 4.036 Å | 2.56 | 900 |
| Buffer layer | PLZT (9/65/35) | 4.08 Å | 2.49 | 1900 |
| Conductive layer | $SrRuO_1$ | 3.93 Å | | |
| Substrate | $SrTiO_3$ | 3.905 Å | 2.40 | 300 |

TABLE 1-(15)

| Material | | Lattice constant | Refractive index | Relative dielectric constant |
|---|---|---|---|---|
| Optical waveguide | $Sr_{0.75}Ba_{0.25}Nb_2O_6$ | ~12.465 Å ~3.352 Å | no = 2.414 ne = 2.385 | ~3400 |

TABLE 1-(15)-continued

| Material | | Lattice constant | Refractive index | Relative dielectric constant |
|---|---|---|---|---|
| Buffer layer | $Sr_{0.60}Ba_{0.40}Nb_2O_6$ | ~12.465 Å ~3.952 Å | no = 2.309 ne = 2.281 | ~3400 |
| Conductive layer | $SrRuO_3$ | 3.93 Å | | |
| Substrate | $SrTiO_3$ | 3.905 Å | 2.40 | 300 |

TABLE 1-(16)

| Material | | Lattice constant | Refractive index | Relative dielectric constant |
|---|---|---|---|---|
| Optical waveguide | PLZT (9/65/35) | 4.08 Å | 2.49 | 1900 |
| Buffer layer | $SrTiO_3$ | 3.905 Å | 2.40 | 300 |
| Conductive layer | $ZnGa_2O_4$ | 8.33 Å | | |
| Substrate | MgO | 4.213 Å | 1.735 | 9.65 |

TABLE 1-(17)

| Material | | Lattice constant | Refractive index | Relative dielectric constant |
|---|---|---|---|---|
| Optical waveguide | $LiNbO_3$ | a = 5.149 Å c = 13.862 Å | no = 2.296 ne = 2.208 | a = 44 c = 26 |
| Buffer layer | ZnO | a = 3.250 Å b = 5.207 Å | no = 1.990 ne = 2.006 | 8.15 |
| Conductive layer | Al—ZnO | a = 3.250 Å b = 5.207 Å | no = 1.990 ne = 2.006 | 8.15 |
| Substrate | $Al_2O_3$ | a = 4.758 Å c = 12.991 Å | no = 1.766 ne = 1.760 | |

TABLE 1-(18)

| Material | | Lattice constant | Refractive index | Relative dielectric constant |
|---|---|---|---|---|
| Optical waveguide | PLZT (9/65/35) | 4.08 Å | 2.49 | 1900 |
| Buffer layer | $SrTiO_3$ | 3.905 Å | 2.40 | 300 |
| Conductive layer | $La_{0.5}Sr_{0.5}CoO_3$ | 3.82 Å | | |
| Substrate | $SrTiO_3$ | 3.905 Å | 2.40 | 300 |

TABLE 1-(19)

| Material | | Lattice constant | Refractive index | Relative dielectric constant |
|---|---|---|---|---|
| Optical waveguide | PLZT (9/65/35) | 4.08 Å | 2.49 | 1900 |
| Buffer layer | $SrTiO_3$ | 3.905 Å | 2.40 | 300 |
| Conductive layer | $LaNiO_3$ | 3.83 Å | | |
| Substrate | $SrTiO_3$ | 3.905 Å | 2.40 | 300 |

TABLE 1-(20)

| | Material | Lattice constant | Refractive index | Relative dielectric constant |
|---|---|---|---|---|
| Optical waveguide | PLZT (9/65/35) | 4.08 Å | 2.49 | 1900 |
| Buffer layer | SrTiO$_3$ | 3.905 Å | 2.40 | 300 |
| Conductive layer | SrVO$_3$ | 3.84 Å | | |
| Substrate | SrTiO$_3$ | 3.905 Å | 2.40 | 300 |

TABLE 1-(21)

| | Material | Lattice constant | Refractive index | Relative dielectric constant |
|---|---|---|---|---|
| Optical waveguide | PLZT (9/65/35) | 4.08 Å | 2.49 | 1900 |
| Buffer layer | SrTiO$_3$ | 3.905 Å | 2.40 | 300 |
| Conductive layer | YBa$_2$Cu$_3$O$_{7-x}$ | 3.8856 Å<br>3.8185 Å<br>11.6804 Å | | |
| Substrate | SrTiO$_3$ | 3.905 Å | 2.40 | 300 |

TABLE 1-(22)

| | Material | Lattice constant | Refractive index | Relative dielectric constant |
|---|---|---|---|---|
| Optical waveguide | PLZT (9/65/35) | 4.08 Å | 2.49 | 1900 |
| Buffer layer | SrTiO$_3$ | 3.905 Å | 2.40 | 300 |
| Conductive layer | SrRuO$_3$ | 3.93 Å | | |
| Substrate | SrTiO$_3$ | 3.905 Å | 2.40 | 300 |

TABLE 1-(23)

| | Material | Lattice constant | Refractive index | Relative dielectric constant |
|---|---|---|---|---|
| Optical waveguide | PLZT (9/65/35) | 4.08 Å | 2.49 | 1900 |
| Buffer layer | SrTiO$_3$ | 3.905 Å | 2.40 | 300 |
| Conductive layer | BaPbO$_3$ | 4.265 Å | | |
| Substrate | SrTiO$_3$ | 3.905 Å | 2.40 | 300 |

TABLE 2-(1)

| | Material | Lattice constant | Refractive index | Relative dielectric constant | Film thickness (nm) |
|---|---|---|---|---|---|
| Upper electrode | Al | | | | |
| Cladding layer | SrTiO$_3$ | 3.905 Å | 2.40 | 300 | 300 |
| Optical waveguide | PZT (52/48) | 4.036 Å | 2.56 | 900 | 900 |
| Buffer layer | SrTiO$_3$ | 3.905 Å | 2.40 | 300 | 300 |
| Substrate | Nb 0.5% - SrTiO$_3$ | 3.905 Å | 2.40 | 300 | — |

TABLE 2-(2)

| | Material | Lattice constant | Refractive index | Relative dielectric constant |
|---|---|---|---|---|
| Upper electrode | Au | | | |
| Cladding layer | PLZT (9/65/35) | 4.08 Å | 2.49 | 1900 |
| Optical waveguide | PZT (52/48) | 4.036 Å | 2.56 | 900 |
| Buffer layer | PLZT (9/65/35) | 4.08 Å | 2.49 | 1900 |
| Conductive substrate | Nb 0.5% - SrTiO$_3$ | 3.905 Å | 2.40 | 300 |

TABLE 2-(3)

| | Material | Lattice constant | Refractive index | Relative dielectric constant |
|---|---|---|---|---|
| Upper electrode | Pt | | | |
| Cladding layer | Sr$_{0.60}$Ba$_{0.40}$Nb$_2$O$_6$ | a, b ~ 12.465 Å<br>c ~ 3.952 Å | no = 2.309<br>ne = 2.281 | ~3400 |
| Optical waveguide | Sr$_{0.75}$Ba$_{0.25}$Nb$_2$O$_6$ | a, b ~ 12.465 Å<br>c ~ 3.952 Å | no = 2.414<br>ne = 2.385 | ~3400 |
| Buffer layer | Sr$_{0.60}$Ba$_{0.40}$Nb$_2$O$_6$ | a, b ~ 12.465 Å<br>c ~ 3.952 Å | no = 2.309<br>ne = 2.281 | ~3400 |
| Substrate | La 1.0% - SrTiO$_3$ | 3.905 Å | 2.40 | 300 |

TABLE 2-(4)

| | Material | Lattice constant | Refractive index | Relative dielectric constant |
|---|---|---|---|---|
| Upper electrode | Pt | | | |
| Cladding layer | SrTiO$_3$ | 3.905 Å | 2.40 | 300 |
| Optical waveguide | PLZT (9/65/35) | 4.08 Å | 2.49 | 1900 |
| Buffer layer | SrTiO$_3$ | 3.905 Å | 2.40 | 300 |
| Conductive substrate | Nb 0.5% - SrTiO$_3$ | 3.905 Å | 2.40 | 300 |

TABLE 2-(5)

| | Material | Lattice constant | Refractive index | Relative dielectric constant |
|---|---|---|---|---|
| Upper electrode | Pt | | | |
| Cladding layer | PZT (85/15) | 4.13 Å | 2.49 | 300 |
| Optical waveguide | PZT (52/48) | 4.038 Å | 2.56 | 600 |
| Buffer layer | PZT (85/15) | 4.13 Å | 2.49 | 300 |
| Conductive substrate | Nb 0.5% - SrTiO$_3$ | 3.905 Å | 2.40 | 300 |

TABLE 2-(6)

| Material | Lattice constant | Refractive index | Relative dielectric constant |
|---|---|---|---|
| Upper electrode | Au | | | |
| Cladding layer | MgO | 4.213 Å | 1.735 | 9.65 |
| Optical waveguide | $BaTiO_3$ | a = 3.994 Å<br>c = 4.038 Å | $n_o$ = 2.437<br>$n_e$ = 2.365 | $\epsilon_1 = \epsilon_2$ = 3600<br>$\epsilon_3$ = 135 |
| Buffer layer | MgO | 4.213 Å | 1.735 | 9.65 |
| Conductive substrate | Nb 0.5% - $SrTiO_3$ | 3.905 Å | 2.40 | 300 |

TABLE 2-(7)

| Material | Lattice constant | Refractive index | Relative dielectric constant |
|---|---|---|---|
| Upper electrode | Au | | | |
| Cladding layer | MgO | 4.213 Å | 1.735 | 9.65 |
| Optical waveguide | $Bi_4Ti_3O_{12}$ | a = 5449 Å<br>b = 32.815 Å<br>c = 5.410 Å | ~1.88 | ~110 |
| Buffer layer | MgO | 4.213 Å | 1.735 | 9.65 |
| Conductive substrate | Nb 0.5% - $SrTiO_3$ | 3.905A | 2.40 | 300 |

TABLE 2-(8)

| Material | Lattice constant | Refractive index | Relative dielectric constant |
|---|---|---|---|
| Upper electrode | Pt | | | |
| Cladding layer | MgO | 4.213 Å | 1.735 | 9.65 |
| Optical waveguide | $KNbO_3$ | a = 5.695 Å<br>b = 5.721 Å<br>c = 3.974 Å | $n_1$ = 2.280<br>$n_2$ = 2.329<br>$n_3$ = 2.169 | 900 ~ 4200 |
| Buffer layer | MgO | 4.213 Å | 1.735 | 9.65 |
| Conductive substrate | Nb 0.5% - $SrTiO_3$ | 3.905 Å | 2.40 | 300 |

TABLE 2-(9)

| Material | Lattice constant | Refractive index | Relative dielectric constant |
|---|---|---|---|
| Upper electrode | Al | | | |
| Cladding layer | $LiTaO_3$ | a = 5.153 Å<br>c = 13.755 Å | $n_o$ = 2.176<br>$n_e$ = 2.180 | a = 41<br>c = 43 |
| Optical waveguide | $LiNbO_3$ | a = 5.149 Å<br>c = 13.862 Å | $n_o$ = 2.296<br>$n_e$ = 2.208 | a = 44<br>c = 28 |
| Buffer layer | $LiTaO_3$ | a = 5.153 Å<br>c = 13.755 Å | $n_o$ = 2.176<br>$n_e$ = 2.180 | a = 41<br>c = 43 |
| Conductive substrate | Nb 0.5% - $SrTiO_3$ | 3.905 Å | 2.40 | 300 |

TABLE 2-(10)

| Material | Lattice constant | Refractive index | Relative dielectric constant |
|---|---|---|---|
| Upper electrode | Al | | | |
| Cladding layer | MgO | 4.213 Å | 1.735 | 9.65 |
| Optical waveguide | $Sr_xBa_{1-x}Nb_2O_6$ | 12.465 Å<br>3.952 Å | $n_o$ = 2.414<br>$n_e$ = 2.385 | 3400 |
| Buffer layer | MgO | 4.213 Å | 1.735 | 9.65 |
| Conductive substrate | Nb 0.5% - $SrTiO_3$ | 3.905 Å | 2.40 | 300 |

TABLE 2-(11)

| Material | Lattice constant | Refractive index | Relative dielectric constant |
|---|---|---|---|
| Upper electrode | Al | | | |
| Cladding layer | MgO | 4.213 Å | 1.735 | 9.65 |
| Optical waveguide | $BaTiO_3$ | a = 3.994 Å<br>c = 4.038 Å | $n_o$ = 2.437<br>$n_e$ = 2.365 | $\epsilon_1 = \epsilon_2$ = 3600<br>$\epsilon_3$ = 135 |
| Buffer layer | MgO | 4.213 Å | 1.735 | 9.65 |
| Conductive substrate | GaAs | 5.6534 Å | 3.59 | 13.1 |

TABLE 2-(12)

| Material | Lattice constant | Refractive index | Relative dielectric constant |
|---|---|---|---|
| Upper electrode | Pt | | | |
| Cladding layer | $SrTiO_3$ | 3.905 Å | 2.40 | 300 |
| Optical waveguide | PZT (52/48) | 4.036 Å | 2.56 | 600 |
| Buffer layer | $SrTiO_3$ | 3.905 Å | 2.40 | 300 |
| Conductive substrate | Si | 5.4301 Å | 3.448 | 11.9 |

TABLE 2-(13)

| Material | Lattice constant | Refractive index | Relative dielectric constant |
|---|---|---|---|
| Upper electrode | Pt | | | |
| Cladding layer | $SrTiO_3$ | 3.905 Å | 2.40 | 300 |
| Optical waveguide | PZT (52/48) | 4.036 Å | 2.56 | 600 |
| Buffer layer | $SrTiO_3$ | 3.905 Å | 2.40 | 300 |
| Conductive layer | Pt | 3.9231 Å | | |
| Substrate | MgO | | | 9.65 |

TABLE 2-(14)

| | Material | Lattice constant | Refractive index | Relative dielectric constant |
|---|---|---|---|---|
| Upper electrode | Pt | | | |
| Cladding layer | PLZT (9/65/35) | 4.08 Å | 2.49 | 1900 |
| Optical waveguide | PLZT (52/48) | 4.036 Å | 2.56 | 900 |
| Buffer layer | PLZT (9/65/35) | 4.08 Å | 2.49 | 1900 |
| Conductive layer | $SrRuO_3$ | 3.93 Å | | |
| Substrate | $SrTiO_3$ | 3.905 Å | 2.40 | 300 |

TABLE 2-(15)

| | Material | Lattice constant | Refractive index | Relative dielectric constant |
|---|---|---|---|---|
| Upper electrode | Al | | | |
| Cladding layer | $Sr_{0.60}Ba_{0.40}Nb_2O_6$ | a, b ~ 12.465 Å<br>c ~ 3.952 Å | no = 2.309<br>ne = 2.281 | ~3400 |
| Optical waveguide | $Sr_{0.15}Ba_{0.25}Nb_7O_4$ | a, b ~ 12.465 Å<br>c ~ 3.952 Å | no = 2.414<br>ne = 2.385 | ~3400 |
| Buffer layer | $Sr_{0.40}Ba_{0.40}Nb_7O_4$ | a, b ~ 12.465 Å<br>c ~ 3.952 Å | no = 2.309<br>ne = 2.281 | ~3400 |
| Conductive layer | $SrRuO_3$ | 3.93 Å | | |
| Substrate | $SrTiO_3$ | 3.905 Å | 2.40 | 300 |

TABLE 2-(16)

| | Material | Lattice constant | Refractive index | Relative dielectric constant |
|---|---|---|---|---|
| Upper electrode | Pt | | | |
| Cladding layer | $SrTiO_3$ | 3.905 Å | 2.40 | 300 |
| Optical waveguide | PLZT (9/65/35) | 4.08 Å | 2.49 | 1900 |
| Buffer layer | $SrTiO_3$ | 3.905 Å | 2.40 | 300 |
| Conductive layer | $ZnGa_2O_4$ | 8.33 Å | | |
| Substrate | MgO | 4.213 Å | 1.735 | 9.65 |

TABLE 2-(17)

| | Material | Lattice constant | Refractive index | Relative dielectric constant |
|---|---|---|---|---|
| Upper electrode | Pt | | | |
| Cladding layer | ZnO | a = 3.250 Å<br>b = 5.207 Å | no = 1.990<br>ne = 2.006 | 8.15 |
| Optical waveguide | $LiNbO_3$ | a = 5.149 Å<br>c = 13.862 Å | no = 2.296<br>ne = 2.208 | a = 44<br>c = 28 |
| Conductive layer | Al—ZnO | a = 3.250 Å<br>b = 5.207 Å | no = 1.990<br>ne = 2.006 | 8.15 |
| Substrate | $Al_2O_3$ | a = 4.758 Å<br>c = 12.991 Å | no = 1.768<br>ne = 1.760 | |

TABLE 2-(18)

| | Material | Lattice constant | Refractive index | Relative dielectric constant |
|---|---|---|---|---|
| Upper electrode | Pt | | | |
| Cladding layer | $SrTiO_3$ | 3.905 Å | 2.40 | 300 |
| Optical waveguide | PLZT (9/65/35) | 4.08 Å | 2.49 | 1900 |
| Buffer layer | $SrTiO_3$ | 3.905 Å | 2.40 | 300 |
| Conductive layer | $La_{0.5}Sr_{0.5}CoO_3$ | 3.82 Å | | |
| Substrate | $SrTiO_3$ | 3.905 Å | 2.40 | 300 |

TABLE 2-(19)

| | Material | Lattice constant | Refractive index | Relative dielectric constant |
|---|---|---|---|---|
| Upper electrode | Pt | | | |
| Cladding layer | $SrTiO_3$ | 3.905 Å | 2.40 | 300 |
| Optical waveguide | PLZT (9/65/35) | 4.08 Å | 2.49 | 1900 |
| Buffer layer | $SrTiO_3$ | 3.905 Å | 2.40 | 300 |
| Conductive layer | $LaNiO_3$ | 3.83 Å | | |
| Substrate | $SrTiO_3$ | 3.905 Å | 2.40 | 300 |

TABLE 2-(20)

| | Material | Lattice constant | Refractive index | Relative dielectric constant |
|---|---|---|---|---|
| Upper electrode | Pt | | | |
| Cladding layer | $SrTiO_3$ | 3.905 Å | 2.40 | 300 |
| Optical waveguide | PLZT (9/65/35) | 4.08 Å | 2.49 | 1900 |
| Buffer layer | $SrTiO_3$ | 3.905 Å | 2.40 | 300 |
| Conductive layer | $SrVO_3$ | 3.84 Å | | |
| Substrate | $SrTiO_3$ | 3.905 Å | 2.40 | 300 |

TABLE 2-(21)

| | Material | Lattice constant | Refractive index | Relative dielectric constant |
|---|---|---|---|---|
| Upper electrode | Pt | | | |

TABLE 2-(21)-continued

| Material | | Lattice constant | Refractive index | Relative dielectric constant |
|---|---|---|---|---|
| Cladding layer | SrTiO₃ | 3.905 Å | 2.40 | 300 |
| Optical waveguide | PLZT (9/65/35) | 4.08 Å | 2.49 | 1900 |
| Buffer layer | SrTiO₃ | 3.905 Å | 2.40 | 300 |
| Conductive layer | YBa₂Cu₃O₇₋ₓ | 3.8856 Å<br>3.8185 Å<br>11.6804 Å | | |
| Substrate | SrTiO₃ | 3.905 Å | 2.40 | 300 |

TABLE 2-(22)

| Material | | Lattice constant | Refractive index | Relative dielectric constant |
|---|---|---|---|---|
| Upper electrode | Pt | | | |
| Cladding layer | SrTiO₃ | 3.905 Å | 2.40 | 300 |
| Optical waveguide | PLZT (9/65/35) | 4.08 Å | 2.49 | 1900 |
| Buffer layer | SrTiO₃ | 3.905 Å | 2.40 | 300 |
| Conductive layer | SrRuO₃ | 3.93 Å | | |
| Substrate | SrTiO₃ | 3.905 Å | 2.40 | 300 |

TABLE 2-(23)

| Material | | Lattice constant | Refractive index | Relative dielectric constant |
|---|---|---|---|---|
| Upper electrode | Pt | | | |
| Cladding layer | SrTiO₃ | 3.905 Å | 2.40 | 300 |
| Optical waveguide | PLZT (9/65/35) | 4.08 Å | 2.49 | 1900 |
| Buffer layer | SrTiO₃ | 3.905 Å | 2.40 | 300 |
| Conductive layer | BaPbO₃ | 4.265 Å | | |
| Substrate | SrTiO₃ | 3.905 Å | 2.40 | 300 |

TABLE 3-(1)

| Material | | Lattice constant | Refractive index | Relative dielectric constant | Film thickness (nm) |
|---|---|---|---|---|---|
| Upper electrode | Pt | | | | |
| Cladding layer | SrTiO₃ | 3.905 Å | 2.40 | 300 | 300 |
| Optical waveguide | PZT (52/48) | 4.036 Å | 2.56 | 900 | 900 |
| Substrate | Nb—SrTiO₃ | 3.905 Å | 2.40 | 300 | — |

TABLE 3-(2)

| Material | | Lattice constant | Refractive index | Relative dielectric constant |
|---|---|---|---|---|
| Upper electrode | Au | | | |

TABLE 3-(2)-continued

| Material | | Lattice constant | Refractive index | Relative dielectric constant |
|---|---|---|---|---|
| Cladding layer | PLZT (9/65/35) | 4.08 Å | 2.49 | 1900 |
| Optical waveguide | PZT (52/48) | 4.036 Å | 2.56 | 900 |
| Conductive substrate | Nb-SrTiO₃ | 3.905 Å | 2.40 | 300 |

TABLE 3-(3)

| Material | | Lattice constant | Refractive index | Relative dielectric constant |
|---|---|---|---|---|
| Upper electrode | Pt | | | |
| Cladding layer | SrTiO₃ | 3.905 Å | 2.40 | 300 |
| Optical waveguide | PLZV (9/65/35) | 4.08 Å | 2.49 | 1900 |
| Conductive substrate | Nb—SrTiO₃ | 3.905 Å | 2.40 | 300 |

TABLE 3-(4)

| Material | | Lattice constant | Refractive index | Relative dielectric constant |
|---|---|---|---|---|
| Upper electrode | Pt | | | |
| Cladding layer | PZT (85/15) | 4.13 Å | 2.49 | 300 |
| Optical waveguide | PZT (52/48) | 4.036 Å | 2.56 | 600 |
| Conductive substrate | Nb—SrTiO₃ | 3.905 Å | 2.40 | 300 |

TABLE 3-(5)

| Material | | Lattice constant | Refractive index | Relative dielectric constant |
|---|---|---|---|---|
| Upper electrode | Pt | | | |
| Cladding layer | ZnO | a = 3.250 Å<br>b = 5.207 Å | no = 1.990<br>ne = 2.006 | 8.15 |
| Optical waveguide | LiNbO₃ | a = 5.149 Å<br>c = 13.862 Å | no = 2.296<br>ne = 2.208 | a = 44<br>c = 28 |
| Conductive layer | Al—ZnO | a = 3.250 Å<br>b = 5.207 Å | no = 1.990<br>ne = 2.006 | 8.15 |
| Substrate | Al₂O₃ | a = 4.758 Å<br>c = 12.991 Å | no = 1.768<br>ne = 1.760 | |

TABLE 3-(6)

| Material | | Lattice constant | Refractive index | Relative dielectric constant |
|---|---|---|---|---|
| Upper electrode | Pt | | | |
| Cladding layer | SrTiO₃ | 3.905 Å | 2.40 | 300 |
| Optical waveguide | PLZT (9/65/35) | 4.08 Å | 2.49 | 1900 |

TABLE 3-(6)-continued

| Material | | Lattice constant | Refractive index | Relative dielectric constant |
|---|---|---|---|---|
| Conductive layer | ZnGa$_2$O$_4$ | 8.33 Å | | |
| Substrate | MgO | 4.213 Å | 1.735 | 9.65 |

TABLE 4-(1)

| Material | | Lattice constant (Å) | Refractive index | Relative dielectric constant |
|---|---|---|---|---|
| Optical waveguide | PZT (52/48) | 4.036 | 2.55 | 900 |
| Buffer layer | PLZT (9/65/35) | 4.08 | 2.49 | 1900 |
| Conductive substrate | Nb 0.5% - SrTiO$_3$ | 3.905 | 2.40 | 300 |

TABLE 4-(2)

| Material | | Lattice constant (Å) | Refractive index | Relative dielectric constant |
|---|---|---|---|---|
| Optical waveguide | PZT (52/48) | 4.036 | 2.55 | 900 |
| Buffer layer | SrTiO$_3$ | 3.905 | 2.40 | 300 |
| Substrate | Nb 0.5% - SrTiO$_3$ | 3.905 | 2.40 | 300 |

TABLE 4-(3)

| Material | | Lattice constant (Å) | Refractive index | Relative dielectric constant |
|---|---|---|---|---|
| Optical waveguide | PLZT (9/65/35) | 4.08 | 2.49 | 1900 |
| Buffer layer | SrTiO$_3$ | 3.905 | 2.40 | 300 |
| Conductive substrate | Nb 0.05% - SrTiO$_3$ | 3.905 | 2.40 | 300 |

TABLE 4-(4)

| Material | | Lattice constant (Å) | Refractive index | Relative dielectric constant |
|---|---|---|---|---|
| Optical waveguide | PZT (52/48) | 4.036 | 2.56 | 900 |
| Buffer layer | PLZT (9/65/35) | 4.08 | 2.49 | 1900 |
| Conductive substrate | La 1.0% - SrTiO$_3$ | 3.905 | 2.40 | 300 |

TABLE 4-(5)

| Material | | Lattice constant (Å) | Refractive index | Relative dielectric constant |
|---|---|---|---|---|
| Optical waveguide | PZT (52/48) | 4.036 | 2.56 | 900 |
| Buffer layer | PZT (85/15) | 4.13 | 2.49 | 300 |
| Conductive substrate | La 1.0% - SrTiO$_3$ | 3.905 | 2.40 | 300 |

TABLE 4-(6)

| Material | | Lattice constant (Å) | Refractive index | Relative dielectric constant |
|---|---|---|---|---|
| Optical waveguide | BaTiO$_3$ | a = 3.994<br>c = 4.038 | no = 2.437<br>ne = 2.365 | $\epsilon_1 = \epsilon_2 = 3600$<br>$\epsilon_3 = 135$ |
| Buffer layer | MgO | 4.213 | 1.735 | 9.65 |
| Conductive substrate | La 0.5% - SrTiO$_3$ | 3.905 | 2.40 | 300 |

TABLE 4-(7)

| Material | | Lattice constant (Å) | Refractive index | Relative dielectric constant |
|---|---|---|---|---|
| Optical waveguide | Bi$_4$Ti$_3$O$_{12}$ | a = 5.449<br>b = 32.615<br>c = 5.410 | ~1.88 | ~110 |
| Buffer layer | | 4.213 | 1.735 | 9.65 |
| Conductive substrate | La 0.01% - SrTiO$_3$ | 3.905 | 2.40 | 300 |

TABLE 4-(8)

| Material | | Lattice constant (Å) | Refractive index | Relative dielectric constant |
|---|---|---|---|---|
| Optical waveguide | KNbO$_3$ | a = 5.695<br>b = 5.721<br>c = 3.974 | $n_2$ = 2.280<br>$n_2$ = 2.329<br>$n_2$ = 2.169 | 900 ~ 4200 |
| Buffer layer | MgO | 4.213 | 1.735 | 9.65 |
| Conductive substrate | Nb 1.0% - SrTiO$_3$ | 3.905 | 2.40 | 300 |

TABLE 4-(9)

| Material | | Lattice constant (Å) | Refractive index | Relative dielectric constant |
|---|---|---|---|---|
| Optical waveguide | LiNbO$_3$ | a = 5.149<br>c = 13.862 | no = 2.296<br>ne = 2.208 | a = 44<br>c = 28 |
| Buffer layer | LiTaO$_3$ | a = 5.153<br>c = 13.755 | no = 2.176<br>ne = 2.180 | a = 41<br>c = 43 |
| Conductive substrate | Nb 0.01% - SrTiO$_3$ | 3.905 | 2.40 | 300 |

TABLE 4-(10)

| Material | | Lattice constant (Å) | Refractive index | Relative dielectric constant |
|---|---|---|---|---|
| Optical waveguide | Sr$_x$Ba$_{1-x}$Nb$_2$O$_6$ | 12.465<br>3.952 | no = 2.414<br>ne = 2.385 | 3400 |
| Buffer layer | MgO | 4.213 | 1.735 | 9.65 |
| Substrate | Nb 0.5% - SrTiO$_3$ | 3.905 | 2.40 | 300 |

TABLE 4-(11)

| Material | | Lattice constant (Å) | Refractive index | Relative dielectric constant |
|---|---|---|---|---|
| Optical waveguide | $Sr_{0.75}Ba_{0.25}Nb_2O_6$ | a, b ~ 12.465 | no = 2.414 | ~3400 |
| | | c ~ 3.952 | ne = 2.385 | |
| Buffer layer | $Sr_{0.60}Ba_{0.40}Nb_2O_6$ | a, b ~ 12.465 | no = 2.309 | ~3400 |
| | | c ~ 3.952 | ne = 2.385 | |
| Substrate | Nb 0.5% - $SrTiO_3$ | 3.905 | 2.40 | 300 |

TABLE 4-(12)

| Material | | Lattice constant (Å) | Refractive index | Relative dielectric constant |
|---|---|---|---|---|
| Optical waveguide | PZT (52/48) | 4.036 | 2.56 | 900 |
| Buffer layer | $SrTiO_3$ | 3.905 | 2.40 | 300 |
| Conductive layer | Nb 0.5% - $SrTiO_3$ | 3.905 | 2.40 | 300 |
| Substrate | MgO | 4.213 | 1.735 | 9.65 |

TABLE 4-(13)

| Material | | Lattice constant (Å) | Refractive index | Relative dielectric constant |
|---|---|---|---|---|
| Optical waveguide | PZT (52/48) | 4.036 | 2.56 | 900 |
| Buffer layer | PLZT (9/65/35) | 4.08 | 2.49 | 1900 |
| Conductive layer | Nb 0.5% - $SrTiO_3$ | 3.905 | 2.40 | 300 |
| Substrate | $SrTiO_3$ | 3.905 | 2.40 | 300 |

TABLE 5-(1)

| Material | | Lattice constant (Å) | Refractive index | Relative dielectric constant |
|---|---|---|---|---|
| Upper electrode | Pt | | | |
| Cladding layer | PLZT (9/65/35) | 4.08 | 2.49 | 1900 |
| Optical waveguide | PZT (52/48) | 4.036 | 2.56 | 900 |
| Buffer layer | PLZT (9/65/35) | 4.08 | 2.49 | 1900 |
| Conductive substrate | Nb 0.5% - $SrTiO_3$ | 3.905 | 2.40 | 300 |

TABLE 5-(2)

| Material | | Lattice constant (Å) | Refractive index | Relative dielectric constant |
|---|---|---|---|---|
| Upper electrode | Al | | | |
| Cladding layer | $SrTiO_3$ | 3.905 | 2.40 | 300 |
| Optical waveguide | PZT (52/48) | 4.036 | 2.56 | 900 |
| Buffer layer | $SrTiO_3$ | 3.905 | 2.40 | 300 |
| Substrative | Nb 0.5% - $SrTiO_3$ | 3.905 | 2.40 | 300 |

TABLE 5-(3)

| Material | | Lattice constant (Å) | Refractive index | Relative dielectric constant |
|---|---|---|---|---|
| Upper electrode | Pt | | | |
| Cladding layer | $SrTiO_3$ | 3.905 | 2.40 | 300 |
| Optical waveguide | PLZT (9/65/35) | 4.08 | 2.49 | 1900 |
| Buffer layer | $SrTiO_3$ | 3.905 | 2.40 | 300 |
| Conductive substrate | Nb 0.5% - $SrTiO_3$ | 3.905 | 2.40 | 300 |

TABLE 5-(4)

| Material | | Lattice constant (Å) | Refractive index | Relative dielectric constant |
|---|---|---|---|---|
| Upper electrode | ITO | | | |
| Cladding layer | PZT (85/15) | 4.13 | 2.49 | 300 |
| Optical waveguide | PZT (52/48) | 4.036 | 2.56 | 600 |
| Buffer layer | PLZT (9/65/35) | 4.08 | 2.49 | 1900 |
| Conductive substrate | La 1.0% - $SrTiO_3$ | 3.905 | 2.40 | 300 |

TABLE 5-(5)

| Material | | Lattice constant (Å) | Refractive index | Relative dielectric constant |
|---|---|---|---|---|
| Upper electrode | Al | | | |
| Cladding layer | MgO | 4.213 | 1.735 | 9.65 |
| Optical waveguide | $BaTiO_3$ | a = 3.994 | no = 2.437 | $\epsilon_1$ = |
| | | c = 4.038 | ne = 2.355 | $\epsilon_2$ = 3600 |
| | | | | $\epsilon_3$ = 135 |
| Buffer layer | MgO | 4.213 | 1.735 | 9.65 |
| Conductive substrate | La 0.1% - $SrTiO_3$ | 3.905 | 2.40 | 300 |

TABLE 5-(6)

| Material | | Lattice constant (Å) | Refractive index | Relative dielectric constant |
|---|---|---|---|---|
| Upper electrode | Au | | | |
| Cladding layer | MgO | 4.213 | 1.735 | 9.65 |
| Optical waveguide | $Bi_4Ti_3O_{12}$ | a = 5.449 | ~1.88 | ~110 |
| | | b = 32.815 | | |
| | | c = 5.410 | | |
| Buffer layer | MgO | 4.213 | 1.735 | 9.65 |

TABLE 5-(6)-continued

| Material | | Lattice constant (Å) | Refractive index | Relative dielectric constant |
|---|---|---|---|---|
| Conductive substrate | La 0.01% - SrTiO$_3$ | 3.905 | 2.40 | 300 |

TABLE 5-(7)

| Material | | Lattice constant (Å) | Refractive index | Relative dielectric constant |
|---|---|---|---|---|
| Upper electrode | Pt | | | |
| Cladding layer | MgO | 4.213 | 1.735 | 9.65 |
| Optical waveguide | KNbO$_3$ | a = 5.695<br>b = 5.721<br>c = 3.974 | n$_1$ = 2.280<br>n$_1$ = 2.329<br>n$_i$ = 2.169 | 900 ~ 4200 |
| Buffer layer | MgO | 4.213 | 1.735 | 9.65 |
| Conductive substrate | Nb 0.1% - SrTiO$_3$ | 3.905 | 2.40 | 300 |

TABLE 5-(8)

| Material | | Lattice constant (Å) | Refractive index | Relative dielectric constant |
|---|---|---|---|---|
| Upper electrode | Al | | | |
| Cladding layer | LiTaO$_3$ | a = 5.153<br>c = 13.755 | no = 2.176<br>ne = 2.180 | a = 41<br>c = 43 |
| Optical waveguide | LiNbO$_3$ | a = 5.149<br>c = 13.862 | no = 2.296<br>ne = 2.208 | a = 44<br>c = 28 |
| Buffer layer | LiTaO$_3$ | a = 5.153<br>c = 13.755 | no = 2.176<br>ne = 2.180 | a = 41<br>c = 43 |
| Conductive substrate | Nb 0.01% - SrTiO$_3$ | 3.905 | 2.40 | 300 |

TABLE 5-(9)

| Material | | Lattice constant (Å) | Refractive index | Relative dielectric constant |
|---|---|---|---|---|
| Upper electrode | Al | | | |
| Cladding layer | MgO | 4.213 | 1.735 | 9.65 |
| Optical waveguide | Sr$_x$Ba$_{1-x}$Nb$_2$O$_6$ | 12.465<br>3.952 | no = 2.414<br>ne = 2.385 | 3400 |
| Buffer layer | MgO | 4.213 | 1.735 | 9.65 |
| Substrate | Nb 0.5% - SrTiO$_3$ | 3.905 | 2.40 | 300 |

TABLE 5-(10)

| Material | | Lattice constant (Å) | Refractive index | Relative dielectric constant |
|---|---|---|---|---|
| Upper electrode | Al | | | |
| Cladding layer | Sr$_{0.60}$Ba$_{0.40}$Nb$_2$O$_6$ | a, b ~ 12.465<br>c ~ 3.952 | no = 2.309<br>ne = 2.281 | ~3400 |
| Optical waveguide | Sr$_{0.75}$Ba$_{0.25}$Nb$_2$O$_6$ | a, b ~ 12.465 | no = 2.414 | ~3400 |

TABLE 5-(10)-continued

| Material | | Lattice constant (Å) | Refractive index | Relative dielectric constant |
|---|---|---|---|---|
| | | c ~ 3.952 | ne = 2.385 | |
| Buffer layer | Sr$_{0.60}$Ba$_{0.40}$Nb$_2$O$_6$ | a, b ~ 12.465<br>c ~ 3.952 | no = 2.309<br>ne = 2.281 | ~3400 |
| Conductive substrate | Nb 0.5% - SrTiO$_3$ | 3.905 | 2.40 | 300 |

TABLE 5-(11)

| Material | | Lattice constant (Å) | Refractive index | Relative dielectric constant |
|---|---|---|---|---|
| Upper electrode | Pt | | | |
| Cladding layer | SrTiO$_3$ | 3.905 | 2.40 | 300 |
| Optical waveguide | PZT (52/48) | 4.035 | 2.56 | 600 |
| Buffer layer | SrTiO$_3$ | 3.905 | 2.40 | 300 |
| Conductive layer | Nb 0.5% - SrTiO$_3$ | 3.905 | 2.40 | 300 |
| Substrate | MgO | | | 9.65 |

TABLE 5-(12)

| Material | | Lattice constant (Å) | Refractive index | Relative dielectric constant |
|---|---|---|---|---|
| Upper electrode | Pt | | | |
| Cladding layer | PLZT (9/65/35) | 4.08 | 2.49 | 1900 |
| Optical waveguide | PZT (52/48) | 4.036 | 2.56 | 900 |
| Buffer layer | PLZT (9/65/35) | 4.08 | 2.49 | 1900 |
| Conducive layer | Nb 0.5% - SrTiO$_3$ | 3.905 | 2.40 | 300 |
| Substrate | SrTiO$_3$ | 3.905 | 2.40 | 300 |

What is claimed is:

1. An optical waveguide device comprising:
   a conductive or semiconductive lower electrode;
   an epitaxial or single orientational buffer layer provided on said lower electrode;
   an epitaxial or single orientational thin film optical waveguide provided on said buffer layer; and
   an upper electrode of a conductive or semiconductive thin film, provided on said optical waveguide.

2. An optical waveguide device as claimed in claim 1, wherein the buffer layer is made of an oxide having a lower refractive index than the optical waveguide.

3. An optical waveguide device as claimed in claim 1, wherein the ratio of a relative dielectric constant of the buffer layer against a relative dielectric constant of the optical waveguide is equal to or more than 0.002.

4. An optical waveguide device as claimed in claim 1, wherein the relative dielectric constant of the buffer layer is equal to or more than 8.

5. An optical waveguide device as claimed in claim 1, wherein the ratio of a film thickness of the buffer layer against a film thickness of the optical waveguide is equal to or more than 0.1.

6. An optical waveguide device as claimed in claim 1, wherein a film thickness of the buffer layer is equal to or more than 10 nm.

7. An optical waveguide device as claimed in claim 1, wherein the lower electrode is made of a single crystal substrate.

8. An optical waveguide device as claimed in claim 1, wherein the lower electrode is made of an epitaxial or single orientational thin film formed on a single crystal substrate.

9. An optical waveguide device as claimed in claim 1, wherein the lower electrode is made of an oxide.

10. An optical waveguide device as claimed in claim 1, wherein a resistivity of the lower electrode is equal to or less than $10^8$ $\Omega$cm.

11. An optical waveguide device as claimed in claim 1, wherein the optical waveguide is made of an oxide.

12. An optical waveguide device as claimed in claim 1, wherein the optical waveguide is made of a ferroelectric.

13. An optical waveguide device as claimed in claim 1, wherein the upper electrode is made of an oxide having a lower refractive index than the optical waveguide.

14. An optical waveguide device as claimed in claim 1, wherein the optical waveguide device modulates, switches, or deflects light beams guided into the optical waveguide by applying a voltage between the upper electrode and the lower electrode.

15. An optical waveguide device comprising:
a single crystal conductive or semiconductive lower electrode;
an epitaxial or single orientational buffer layer formed on a plane of said lower electrode;
a ferroelectric epitaxial or single orientational thin film optical waveguide formed on said buffer layer;
a cladding layer formed on said optical waveguide; and
a metal thin film served as an upper electrode formed on said cladding layer.

16. An optical waveguide device as claimed in claim 15, wherein the buffer layer or the cladding layer is made of an oxide having a lower refractive index than the optical waveguide.

17. An optical waveguide device as claimed in claim 15, wherein the ratio of a relative dielectric constant of the buffer layer or the cladding layer
against a relative dielectric constant of the optical waveguide is equal to or more than 0.002.

18. An optical waveguide device as claimed in claim 15, wherein the relative dielectric constant of the buffer layer or the cladding layer is equal to or more than 8.

19. An optical waveguide device as claimed in claim 15, wherein the ratio of a film thickness of the buffer layer or the cladding layer against a film thickness of the optical waveguide is equal to or more than 0.1.

20. An optical waveguide device as claimed in claim 15, wherein a film thickness of the buffer layer or the cladding layer is equal to or more than 10 nm.

21. An optical waveguide device comprising:
a lower electrode made of a single crystal conductive or semiconductive $SrTiO_3$ in which an impurity element is doped by 0.01 wt. % through 5.0 wt. %;
an epitaxial or single orientational oxide buffer layer formed on a plane of said lower electrode;
an epitaxial or single orientational oxide thin film optical waveguide displaying the electo-optic effect, formed on said buffer layer; and
an upper electrode of a conductive thin film or a semiconductive thin film formed on said optical waveguide.

22. An optical waveguide device as claimed in claim 21, wherein the lower electrode contains a substrate and a semiconductive thin film of an epitaxial or single orientational $SrTiO_3$ in which an impurity element is doped on a plane of the substrate by 0.01 wt. % through 5.0 wt. %.

23. An optical waveguide device as claimed in claim 21, wherein the impurity element is an elelement of the III-group or the V-group.

24. An optical waveguide device as claimed in claim 21, wherein the impurity element is Nb.

25. An optical waveguide device as claimed in claim 21, wherein the impurity element is La.

26. An optical waveguide device as claimed in claim 21, wherein a resistivity of the single crystal semiconductor substrate is equal to or less than $10^4$ $\Omega$·cm.

27. An optical waveguide device as claimed in claim 21, wherein the buffer layer is made of an oxide having a lower refractive index than the optical waveguide.

28. An optical waveguide device as claimed in claim 21, wherein the buffer layer is made of a material expressed by a formula:

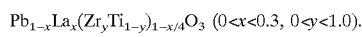
$Pb_{1-x}La_x(Zr_yTi_{1-y})_{1-x/4}O_3$ (0<x<0.3, 0<y<1.0).

29. An optical waveguide device as claimed in claim 21, wherein the thin film optical waveguide is made of an oxide ferroelectric.

30. An optical waveguide device as claimed in claim 21, wherein the ferroelectric thin film optical waveguide is made of a material expressed by a formula:

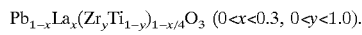
$Pb_{1-x}La_x(Zr_yTi_{1-y})_{1-x/4}O_3$ (0<x<0.3, 0<y<1.0).

31. An optical waveguide device as claimed in claim 21, wherein the upper electrode is made of a transparent conductive oxide having a lower refractive index than the optical waveguide.

32. An optical waveguide device as claimed in claim 21, wherein the upper electrode is made of an ITO (indium tin oxide).

33. An optical waveguide device as claimed in claim 21, wherein the upper electrode is made of an Al-doped ZnO.

34. An optical waveguide device as claimed in claim 21, wherein an oxide cladding layer is provided between the oxide thin film optical waveguide and the upper electrode.

35. An optical waveguide device as claimed in claim 34, wherein the cladding layer is made of an oxide having a lower refractive index than the optical waveguide.

36. An optical waveguide device as claimed in claim 34, wherein the cladding layer is made of a material expressed by a formula:

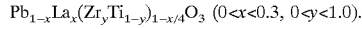
$Pb_{1-x}La_x(Zr_yTi_{1-y})_{1-x/4}O_3$ (0<x<0.3, 0<y<1.0).

37. An optical waveguide device as claimed in claim 34, wherein the upper electrode is made of a metal.

38. An optical waveguide device comprising:
a single crystal conductive or semiconductive lower electrode;
a ferroelectric epitaxial or single orientational thin film optical waveguide formed on a plane of the single crystal substrate;
a cladding layer formed on said optical waveguide; and
a metal thin film served as an upper electrode formed on said cladding layer.

39. An optical waveguide device as claimed in claim 38, wherein a resistivity of the lower electrode is equal to or less than $10^8$ $\Omega$·cm.

40. An optical waveguide device as claimed in claim 38, wherein the lower electrode contains a substrate and a conductive or semiconductive, epitaxial or single orientational thin film.

41. An optical waveguide device as claimed in claim 38, wherein the lower electrode is made of an oxide.

42. An optical waveguide device as claimed in claim 38, wherein the optical waveguide is made of an oxide.

43. An optical waveguide device as claimed in claim 38, wherein the cladding layer is made of an oxide having a lower refractive index than the optical waveguide.

44. An optical waveguide device as claimed in claim 38, wherein the ratio of a relative dielectric constant of the cladding layer against a relative dielectric constant of the optical waveguide is equal to or more than 0.002.

45. An optical waveguide device as claimed in claim 38, wherein the relative dielectric constant of the cladding layer is equal to or more than 8.

46. An optical waveguide device as claimed in claim 38, wherein the ratio of a film thickness of the cladding layer against a film thickness of the optical waveguide is equal to or more than 0.1.

47. An optical waveguide device as claimed in claim 38, wherein a film thickness of the cladding layer is equal to or more than 10 nm.

* * * * *